(12) United States Patent　(10) Patent No.: US 9,300,592 B2
Macchiano et al.　(45) Date of Patent: Mar. 29, 2016

(54) PHYSICAL PORT SHARING IN A LINK AGGREGATION GROUP

(71) Applicant: International Business Machines Corporation, Armonk, NY (US)

(72) Inventors: Angelo Macchiano, Apalachin, NY (US); Bruce H. Ratcliff, Red Hook, NY (US); Richard P. Tarcza, Kingston, NY (US); Susan M. Farrell, Binghamton, NY (US); Mary E. Carollo, Ithaca, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 98 days.

(21) Appl. No.: 14/212,228

(22) Filed: Mar. 14, 2014

(65) Prior Publication Data
US 2015/0263991 A1　Sep. 17, 2015

(51) Int. Cl.
*H04L 12/933* (2013.01)
*H04L 12/931* (2013.01)
*H04L 12/891* (2013.01)
*H04L 12/24* (2006.01)
*H04L 12/709* (2013.01)

(52) U.S. Cl.
CPC ............ *H04L 47/41* (2013.01); *H04L 41/0654* (2013.01); *H04L 45/245* (2013.01); *H04L 49/10* (2013.01); *H04L 49/354* (2013.01); *H04L 49/70* (2013.01)

(58) Field of Classification Search
CPC ....... H04L 45/245; H04L 45/28; H04L 49/70; H04L 12/4641; H04L 45/586; H04L 49/10; H04L 49/354; H04L 47/41; H04L 41/0654
See application file for complete search history.

(56) References Cited

U.S. PATENT DOCUMENTS

| 8,619,771 | B2 * | 12/2013 | Lambeth et al. | 370/389 |
| 8,929,255 | B2 * | 1/2015 | Hernandez et al. | 370/259 |
| 9,013,986 | B2 * | 4/2015 | Yu et al. | 370/228 |

(Continued)

FOREIGN PATENT DOCUMENTS

| WO | 2005018174 A1 | 2/2005 |
| WO | 2010111142 A1 | 9/2010 |
| WO | 2012099858 A1 | 7/2012 |
| WO | 2012099946 A1 | 7/2012 |

OTHER PUBLICATIONS

Office Action in U.S. Appl. No. 14/561,750, dated Oct. 7, 2015, pp. 1-22.

(Continued)

*Primary Examiner* — Ayaz Sheikh
*Assistant Examiner* — Debebe Asefa
(74) *Attorney, Agent, or Firm* — Steven Chiu, Esq.; Matthew M. Hulihan, Esq.; Heslin Rothenberg Farley & Mesiti P.C.

(57) ABSTRACT

Virtual switches are established in a host system of a computing environment. Each virtual switch of the virtual switches includes a respective virtual switch port grouped within a shared port group of virtual switch ports. The virtual switch ports of the shared port group are in communication with a common physical network adapter of the host system. The virtual switch ports of the shared port group share a single physical port of the physical network adapter as part of a common physical link aggregation group (LAG).

19 Claims, 34 Drawing Sheets

(56) References Cited

U.S. PATENT DOCUMENTS

| | | |
|---|---|---|
| 2005/0060427 A1 | 3/2005 | Phillips et al. |
| 2007/0183313 A1 | 8/2007 | Narayanan et al. |
| 2008/0151916 A1 | 6/2008 | Jetcheva et al. |
| 2012/0287785 A1 | 11/2012 | Kamble et al. |
| 2013/0194914 A1 | 8/2013 | Agarwal et al. |
| 2013/0250951 A1 | 9/2013 | Koganti |
| 2013/0308649 A1 | 11/2013 | Cheng et al. |
| 2013/0315097 A1 | 11/2013 | Yang et al. |
| 2013/0315234 A1 | 11/2013 | Kamble et al. |
| 2013/0336317 A1 | 12/2013 | Mithyantha et al. |
| 2013/0343395 A1 | 12/2013 | Kamble et al. |
| 2015/0263937 A1 | 9/2015 | Macchiano et al. |
| 2015/0263970 A1 | 9/2015 | Macchiano et al. |
| 2015/0263971 A1 | 9/2015 | Macchiano et al. |

OTHER PUBLICATIONS

Qian, Hangwei, et al., "Exploring the Network Scale-out in Virtualized Servers", InProceeding of International Conference on Soft Computing and Software Engineering (SCSE 2013).

Azodolmolky, Siamak, et al., "SDN-based cloud computing networking", In Transparent Optical Networks (ICTON), 2013 15th International Conference on, pp. 1-4. IEEE, 2013.

Joseph M. Blanquer et al., "Fair Queuing for Aggregated Multiple Links", 2001 ACM.

Dhananjay S. Phatak et al., "A Novel Mechanism for Data Streaming Across Multiple IP Links for Improving Throughput and Reliability in Mobile Environments", 2002 IEEE.

\* cited by examiner

PHYSICAL PORT SHARING IN A LINK AGGREGATION GROUP

BACKGROUND

Link aggregation provides an industry standard means of aggregating multiple switch ports along with their directly connected network interface cards (NICs) to form a Link Aggregation Group (LAG), such that networking interfaces connected through these NICs can treat the LAG as if it were a single port. This configuration provides a High Available network connection with increased bandwidth. Example Link Aggregation Control Protocols (LACPs) for Ethernet are defined in the 802.3ad and 802.1ax standards promulgated by the Institute of Electrical and Electronics Engineers (IEEE).

Current IEEE LAG architecture does not permit a NIC port to be configured in multiple LAGs or shared outside of a LAG at the same time. This is due to the direct peer-to-peer control interlock requirement of LACP to maintain a port within a LAG. The requirement dictates that all NICs within a LAG be configured to a single switch (virtual switch or physical switch). In other words, there is no sharing of a NIC configured in a LAG with multiple switches.

SUMMARY

Current LAG protocol restrictions described above are costly and difficult to manage in large information technology shops where workloads are manually balanced across multiple virtual switches within, and across, logical partitions (LPARs) within a Central Execution Complex (CEC). In addition, workload balancing across many virtual switch LAGs within, and across, multiple LPARs is problematic due to the manual nature of the effort. In cases where 10 Gb NICs, as an example, are deployed in a LAG, the conventional practice quickly becomes cost prohibitive. In accordance with aspects described herein, a LAG encompassing multiple virtual switches each have a virtual switch port configured to share a single physical NIC port is provided. Further provided are facilities for taking-over network frame handling when, for instance, a network connection of a participant virtual switch within the LAG fails.

Shortcomings of the prior art are overcome and additional advantages are provided through the provision of a computer program product which includes a computer readable storage medium readable by a processing circuit and storing instructions for execution by the processing circuit for performing a method that includes establishing a plurality of virtual switches in a host system of a computing environment, each virtual switch of the plurality of virtual switches including a respective virtual switch port grouped within a shared port group of virtual switch ports, wherein the virtual switch ports of the shared port group are in communication with a common physical network adapter of the host system; and sharing, by the virtual switch ports of the shared port group, a single physical port of the physical network adapter as part of a common physical link aggregation group (LAG).

Further, a system is provided. The system includes a memory and a processor in communications with the memory. The computer system is configured to perform a method, the method including establishing a plurality of virtual switches in a host system of a computing environment, each virtual switch of the plurality of virtual switches including a respective virtual switch port grouped within a shared port group of virtual switch ports, wherein the virtual switch ports of the shared port group are in communication with a common physical network adapter of the host system; and sharing, by the virtual switch ports of the shared port group, a single physical port of the physical network adapter as part of a common physical link aggregation group (LAG).

Yet further, a method is provided, which includes establishing a plurality of virtual switches in a host system of a computing environment, each virtual switch of the plurality of virtual switches including a respective virtual switch port grouped within a shared port group of virtual switch ports, wherein the virtual switch ports of the shared port group are in communication with a common physical network adapter of the host system; and sharing, by the virtual switch ports of the shared port group, a single physical port of the physical network adapter as part of a common physical link aggregation group (LAG).

Additional features and advantages are realized through the concepts of aspects of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

In accordance with aspects described herein, capabilities are provided to create and use a link aggregation group encompassing multiple virtual switches each having a virtual switch port configured to share a single physical NIC port. Further capabilities are provided for taking-over network frame handling when, for instance, a network connection of a participant virtual switch within the link aggregation group fails.

Computing environments of different architectures may incorporate and use one or more aspects provided herein. For instance, environments based on the PowerPC architecture, also referred to as Power ISA, offered by International Business Machines Corporation (IBM®) and described in the Power ISA™ Version 2.06 Revision B specification, Jul. 23, 2010, hereby incorporated by reference herein in its entirety, may include one or more aspects, as well as computing environments of other architectures, such as the z/Architecture, offered by International Business Machines Corporation, and described in z/Architecture—Principles of Operation, Publication No. SA22-7932-09, 10th Edition, September 2012, which is hereby incorporated by reference herein in its entirety.

Z/ARCHITECTURE, IBM, Z/OS and Z/VM (referenced herein) are registered trademarks of International Business Machines Corporation, Armonk, N.Y. Other names used herein may be registered trademarks, trademarks or product names of International Business Machines Corporation or other companies.

Figure 1:
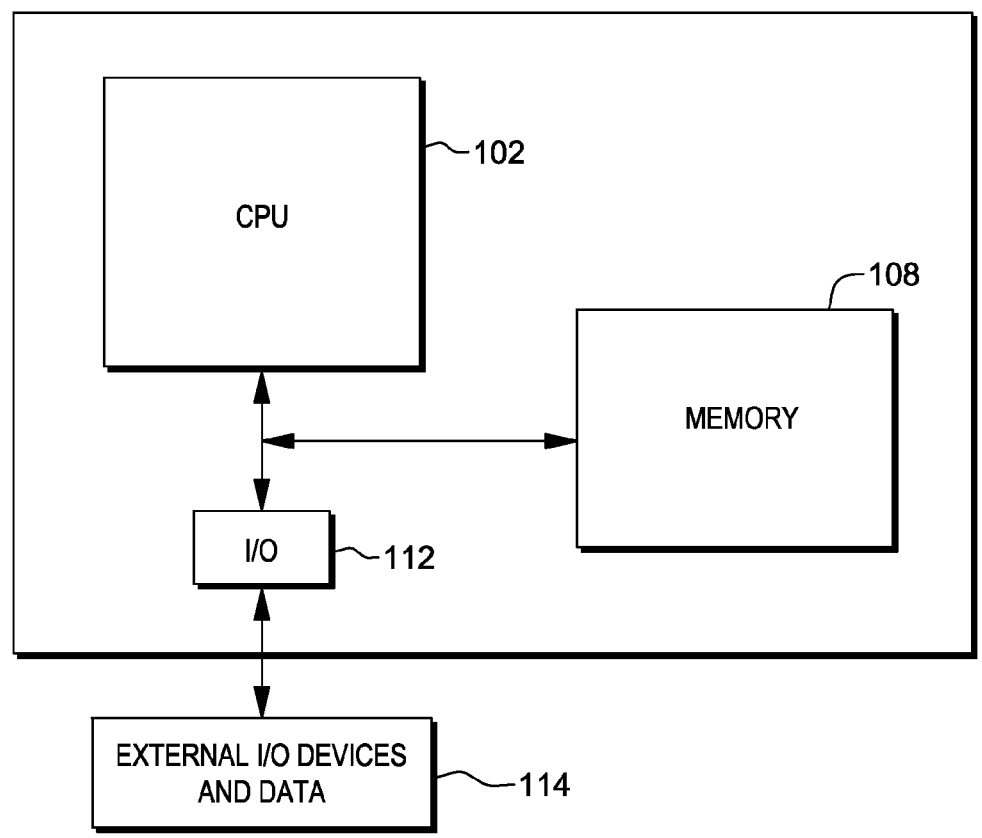
FIG. 1 depicts one example of a computing environment to incorporate and use one or more aspects described herein.

One example of a computing environment to incorporate and use one or more aspects described herein is provided with reference to FIG. 1. In one example, a computing environment 100 includes a processor (central processing unit—CPU) 102. Processor 102 is communicatively coupled to a memory portion 108 having, for instance, a cache (not pictured), and to an input/output (I/O) portion 112. I/O portion 112 is communicatively coupled to external I/O devices 114 that may include, for example, data input devices, sensors and/or output devices, such as displays.

Figure 2:
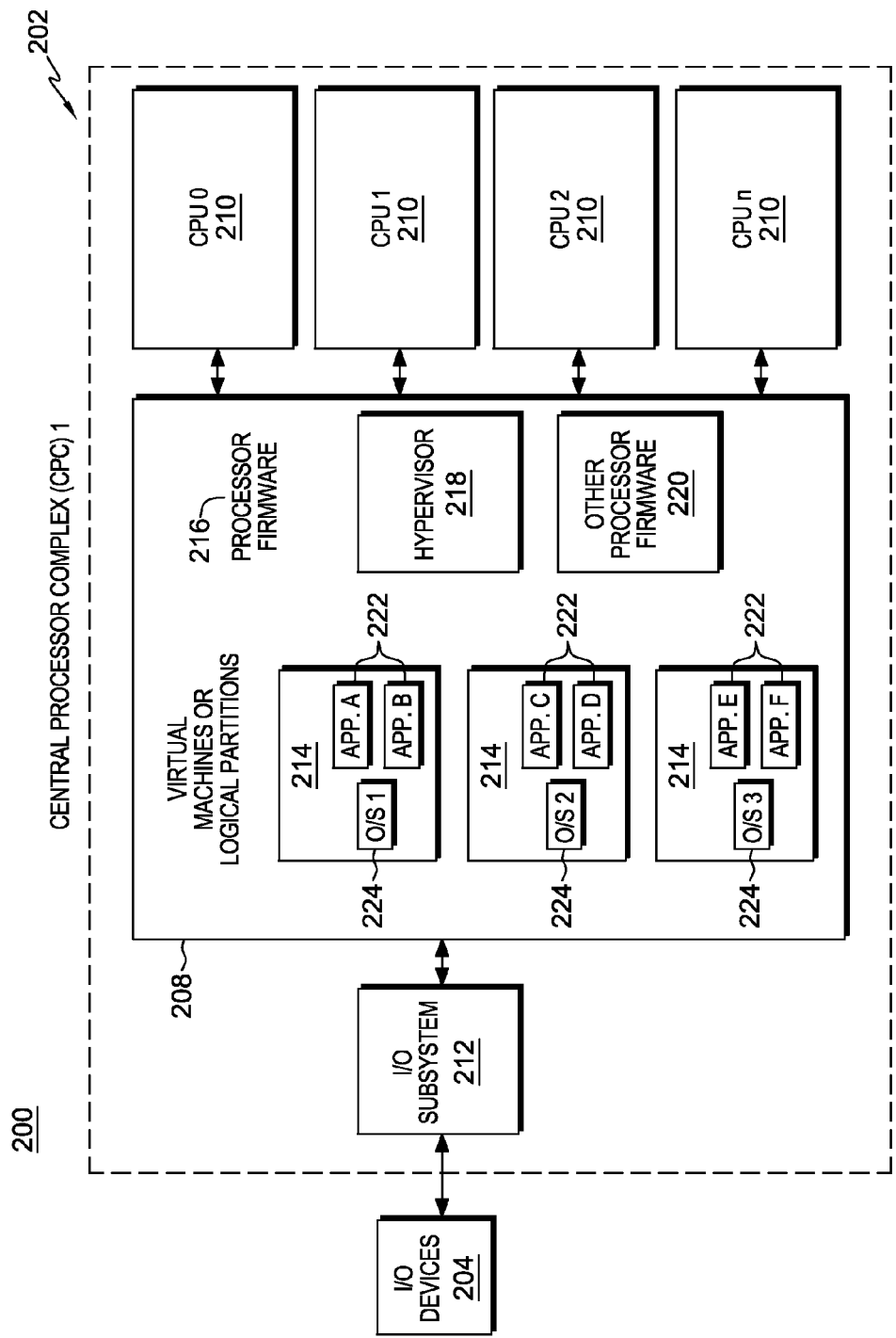
FIG. 2 depicts another example of a computing environment to incorporate and use one or more aspects described herein.

A further embodiment of a computing environment to incorporate and use one or more aspects described herein is depicted in FIG. 2. Referring to FIG. 2, in one example, a computing environment 200 includes a central processor complex (CPC) 202 (also referred to as a Central Execution Complex or Central Electronics Complex—"CEC)" coupled to one or more input/output (I/O) devices 204 through I/O subsystem 212. Central processor complex 202 includes processor memory 208 (a.k.a., main memory, main storage, central storage) coupled to one or more central processors (a.k.a., central processing units (CPUs)) 210 and I/O subsystem 212, each of which is further described below.

Processor memory 208 includes one or more virtual machines 214 (for one example of the PowerPC architecture) or one or more logical partitions 214 (for one example of the z/Architecture), and processor firmware 216, which includes a hypervisor 218 and other processor firmware 220. As used herein, firmware includes, e.g., the microcode and/or millicode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

Each virtual machine or logical partition 214 functions as a separate system and has one or more applications 222, and optionally, a resident operating system 224 therein, which may differ for each virtual machine or logical partition. In one embodiment, the operating system is the z/VM operating system, the z/OS operating system, the z/Linux operating system, or the TPF operating system, offered by International Business Machines Corporation, Armonk, N.Y. The virtual machines are managed by hypervisor 218, such as PowerVM, offered by International Business Machines Corporation, Armonk, N.Y.; and the logical partitions are managed by hypervisor 218, such as the Processor Resource/System Manager (PR/SM), offered by International Business Machines Corporation, Armonk, N.Y.

The virtual machines are hosted on a host system, i.e. CEC 202, and therefore could be considered guests of that host system. As noted above, each virtual machine may load a guest operating system. In some embodiments, a virtual machine may load a hypervisor or guest operating system that itself hosts one or more guests (one or more other guest operating systems, for instance). In this manner, a "guest" may refer generally to a virtual machine or guest operating system that is running on ("hosted by") a host system. Multiple levels of guests may exist, all supported by a lowest level host system (such as CEC 202). Additionally, in some cases, an operating system may itself be, or implement, a virtual machine. Therefore, in some scenarios, a virtual machine may be considered a guest operating system, and vice versa. In any case, the term "guest" as used herein is used broadly to encompass any of the above possibilities.

Central processors 210 are physical processor resources assignable to the virtual machines or allocated to the logical partitions. For instance, each virtual machine or logical partition 214 includes one or more logical processors, each of which represents all or a share of a physical processor 210 that may be dynamically allocated to the virtual machine or partition. A central processor may include various components not depicted herein, such as a memory management unit, translation lookaside buffer, registers, and caches.

Input/output subsystem 212 directs the flow of information between input/output devices 204 and main memory 208 (in some cases via one or more I/O control units, not pictured). I/O subsystem 212 is coupled to the central processing complex in that it can be a part of the central processing complex or separate therefrom. The I/O subsystem relieves the central processors of the task of communicating directly with the input/output devices and permits data processing to proceed concurrently with input/output processing. To provide communications, the I/O subsystem employs I/O communications adapters. There are various types of communications adapters including, for instance, channels, I/O adapters, host bus adapters, PCI cards, Ethernet cards, Small Computer Storage Interface (SCSI) cards, etc. Further, the I/O subsystem uses one or more input/output paths as communication links in managing the flow of information to or from input/output devices 204. In some examples, input/output devices 204 include network components, such as physical partner switches.

Figure 3A:
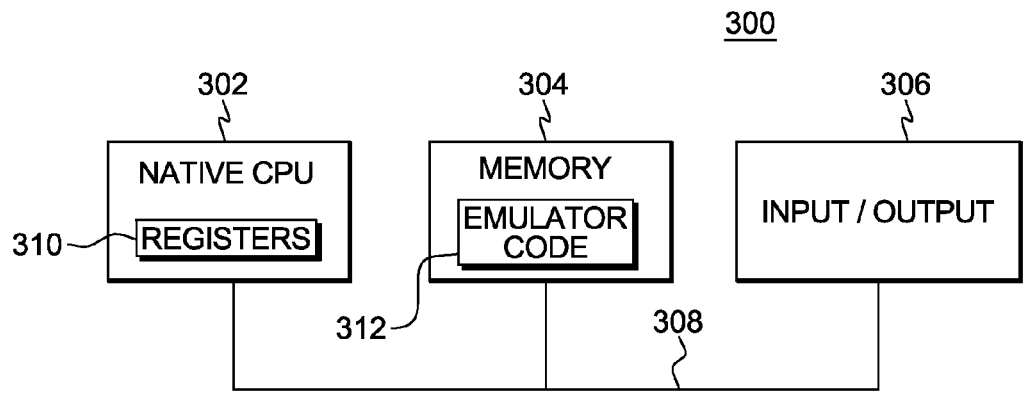
FIG. 3A depicts yet another example of a computing environment to incorporate and use one or more aspects described herein.

Another embodiment of a computing environment to incorporate and use one or more aspects described herein is provided with reference to FIG. 3A. In this example, a computing environment 300 includes, for instance, a native central processing unit (CPU) 302, a memory 304, and one or more input/output devices and/or interfaces 306 coupled to one another via, for example, one or more buses 308 and/or other connections. As examples, computing environment 300 may include a PowerPC processor, or a pSeries server offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel, Oracle, or others.

Native central processing unit 302 includes one or more native registers 310, such as one or more general purpose registers and/or one or more special purpose registers used during processing within the environment. These registers include information that represents the state of the environment at any particular point in time.

Moreover, native central processing unit 302 executes instructions and code that are stored in memory 304. In one particular example, the central processing unit executes emulator code 312 stored in memory 304. This code enables the computing environment configured in one architecture to emulate another architecture. For instance, emulator code 312 allows machines based on architectures other than the z/Architecture, such as PowerPC processors, pSeries servers, HP Superdome servers or others, to emulate the z/Architecture and to execute software and instructions developed based on the z/Architecture.

Figure 3B:
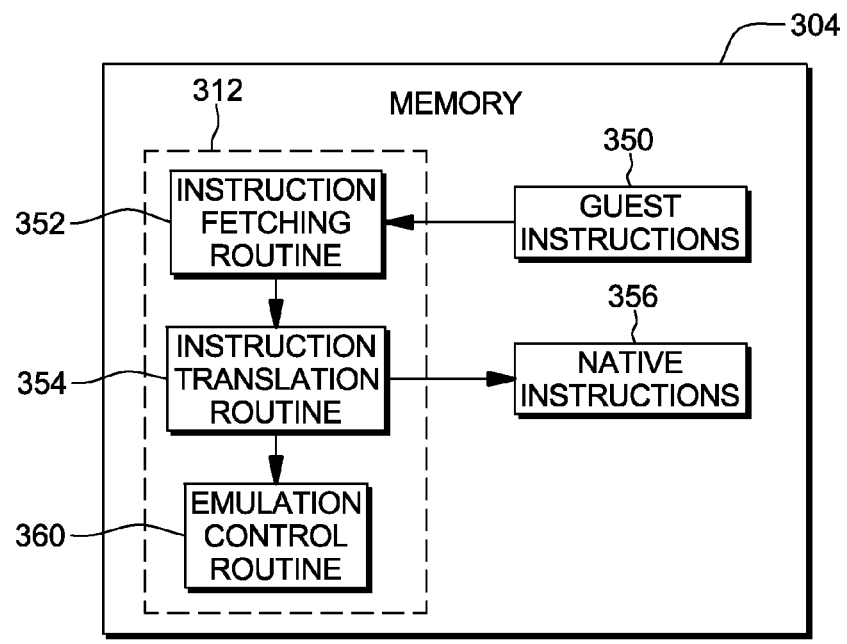
FIG. 3B depicts further details of the memory of FIG. 3A.

Further details relating to emulator code 312 are described with reference to FIG. 3B. Guest instructions 350 stored in memory 304 comprise software instructions (e.g., correlating to machine instructions) that were developed to be executed in an architecture other than that of native CPU 302. For example, guest instructions 350 may have been designed to execute on a z/Architecture processor 102, but instead, are being emulated on native CPU 302, which may be, for example, an Intel Itanium II processor. In one example, emulator code 312 includes an instruction fetching routine 352 to obtain one or more guest instructions 350 from memory 304, and to optionally provide local buffering for the instructions obtained. It also includes an instruction translation routine 354 to determine the type of guest instruction that has been obtained and to translate the guest instruction into one or more corresponding native instructions 356. This translation includes, for instance, identifying the function to be performed by the guest instruction and choosing the native instruction(s) to perform that function.

Further, emulator code 312 includes an emulation control routine 360 to cause the native instructions to be executed. Emulation control routine 360 may cause native CPU 302 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 356 may include loading data into a register from memory 304; storing data back to memory from a register; or performing some type of arithmetic or logic operation, as determined by the translation routine.

Each routine is, for instance, implemented in software, which is stored in memory and executed by native central processing unit 302. In other examples, one or more of the routines or operations are implemented in firmware, hardware, software or some combination thereof. The registers of the emulated processor may be emulated using registers 310 of the native CPU or by using locations in memory 304. In embodiments, guest instructions 350, native instructions 356 and emulator code 312 may reside in the same memory or may be disbursed among different memory devices.

The computing environments described above are only examples of computing environments that can be used. Other environments, including but not limited to, other non-partitioned environments, other partitioned environments, and/or other emulated environments, may be used; embodiments are not limited to any one environment.

Figure 4:
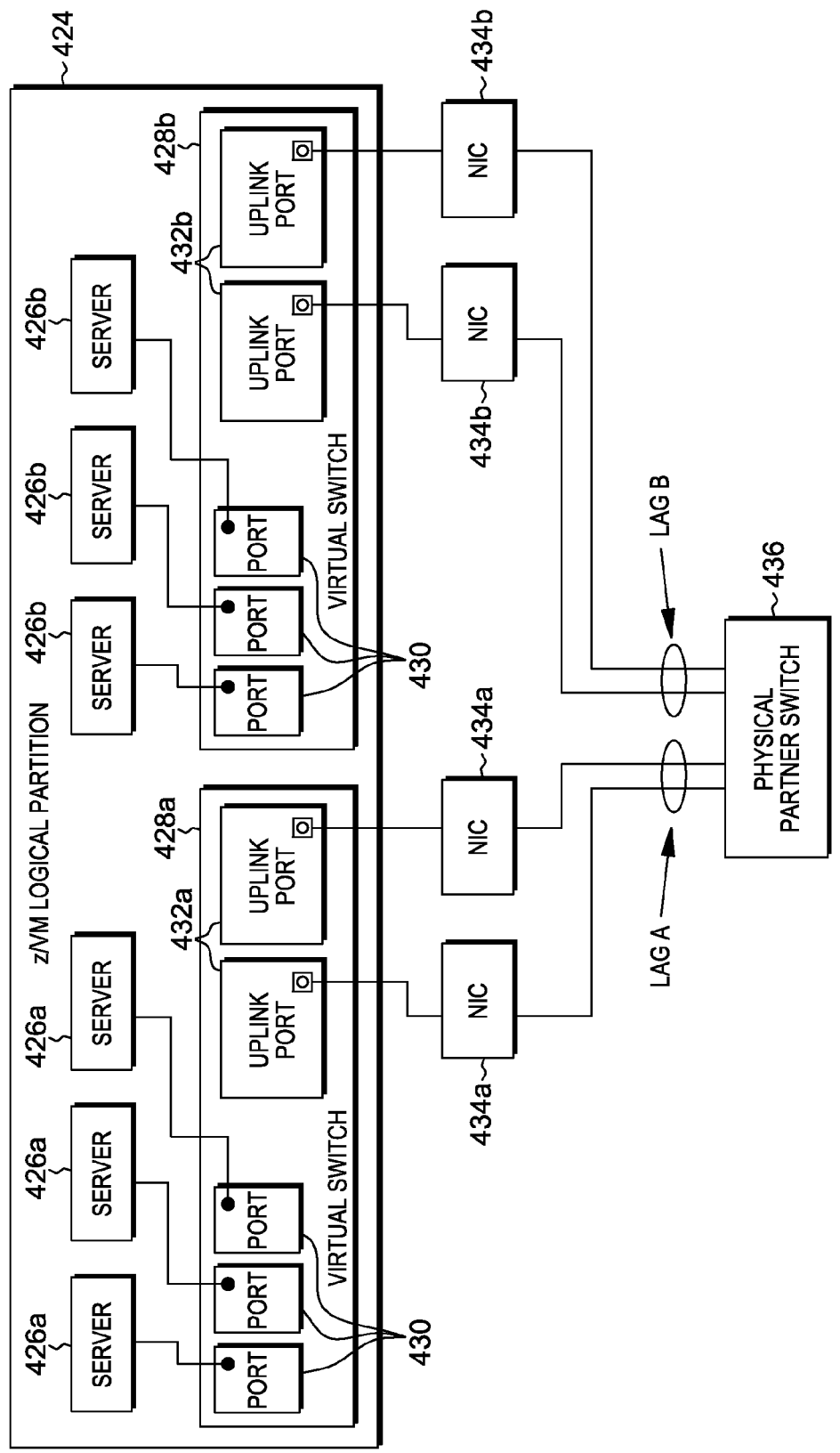
FIG. 4 illustrates an example physical link aggregation group configuration.

FIG. 4 illustrates an example physical link aggregation group (LAG) configuration, for instance a standard IEEE 802.3ad (or IEEE 802.1ax) aggregation of Multiple Link Segments. In the example of FIG. 4, multiple LAG port groups are created because physical port sharing is not supported in this example.

Depicted in FIG. 4 is a logical partition (LPAR) 424 (such as an LPAR of a CEC as described above with reference to FIG. 2). LPAR 424 hosts multiple servers 426a, each of which is assigned to, and communicates with, virtual switch 428a, and more specifically a respective virtual port 430 thereof. Similarly, LPAR 424 hosts multiple servers 426b, each of which is assigned to, and communicates with, virtual switch 428b, and more specifically a respective virtual port 430 thereof. In other embodiments, servers 426a and virtual switch 428a may be hosted on a different LPAR than one hosting servers 426b and virtual switch 428b.

Virtual switch 428a includes two (in this example) uplink ports 432a, each of which utilizes a respective physical adapter (NIC 434a) to communicate with a physical partner switch 436 (or multiple physical partner switches of the LAG). Similarly, virtual switch 428b includes two (in this example) uplink ports 432b, each of which utilizes a respective physical adapter (NIC 434b) to communicate with physical partner switch 436 (or multiple physical partner switches of the LAG).

In the example of FIG. 4, there are two physical LAGs: LAG A and LAG B. Physical NICs 434a are part of physical LAG A, while physical NICs 434b are part of physical LAG B. Consequently, virtual ports 432a each use a physical port of a respective NIC 434a as part of LAG A, and virtual ports 432b each use a physical port of a respective NIC 434b as part of LAG B.

Each physical LAG (LAG A and LAG B) has a discrete set of NICs to service its specific LAG. LAG A's discrete set consists of NICS 434a and while LAG B's discrete set consists of NICs 434b. Each NIC is in use (dedicated) to a single virtual switch (i.e. 428a or 428b). Sharing of a NIC is not permitted across multiple virtual switches or operating systems (a virtual switch may be part of an operating system). As shown in FIG. 4, each virtual switch (428a and 428b) establishes and maintains active LACP communications over a separate LAG consisting of discrete NICs connected with their perspective partner switch. In this scenario, the addition of another virtual switch would require both the consumption of additional NICs and another LAG to be defined in order to provide such connectivity of the other virtual switch to the physical partner switch.

In FIG. 4, each virtual switch must deploy its own LACP Marker Protocol to move traffic from one NIC to the other during load balancing operations. A system administrator balances external network load by deploying servers on the appropriate virtual switches. Manual workload balancing between distinct LAGs is disadvantageously imprecise and reactive rather than proactive.

With current LAG implementations, a customer is required to configure and maintain multiple distinct LAGs on both physical and virtual switches, as shown in FIG. 4. With multiple physical LAGs, the customer is compelled to build high availability uplink port redundancy within each virtual switch. As a result, this configuration requires a minimum of four NICs to be installed for exclusive LAG use. This may not be a significant problem if each virtual switch can drive all of its NICs consistently close to one hundred percent bandwidth. However, it is a waste of network capability if NIC bandwidth is not consistently being driven to one hundred percent. Typically, a customer's network is not set up to run consistently at a hundred percent capacity. Therefore, it is more practical to add or remove network capacity on demand, while providing high availability at all times. Current solutions using the configuration of FIG. 4 result in both management and financial burdens for the customer.

A physical switch port connected to a NIC (i.e. a switch port of physical partner switch 436 connected to a NIC 434a or 434b) has an additional sharing limitation in these configurations. A physical switch port can be configured to act either as a member of a single LAG or as an independent port. It cannot do both concurrently. As a result, a physical switch port configured in a LAG cannot be shared unless all the network connections established are within the same physical LAG. Current IEEE LAG architecture does not allow a port to be in multiple (virtual) LAGs.

A result of the limitations above is that a system administrator typically must define and maintain multiple physical LAG configurations—essentially one for each virtual switch defined in the CEC, as above in FIG. 4. The maintenance of this type of configuration is complex, especially in large-scale operations where servers are added and moved based on workload requirements.

Aspects described herein present a new virtual LAG paradigm, in which two or more virtual switches are made to appear to a physical partner switch as a single switch. Capability is enabled for multiple virtual switches to be connected to a single physical LAG, and may be achieved, at least in part, via virtualization technology that provides the ability to share a port in a single physical LAG with multiple virtual switches. The sharing of a LAG provided according to aspects described herein may be transparent to the physical partner switch(es) making up the physical LAG. Transparency may be a distinguishing underpinning of this design, since shared NICs and LACP cannot detect the presence of multiple aggregation-aware devices on the same link. LACP bonding between participating switches may be a point-to-point connection using a predefined multicast media access control (MAC) address for controlling LACP Protocol between each port. Aspects described herein present, for instance, a single point-to-point control plan between the partner physical switch(es) and the multiple logical virtual switches within the same LAG, while remaining compatible with the IEEE LAG specification.

Figure 5:
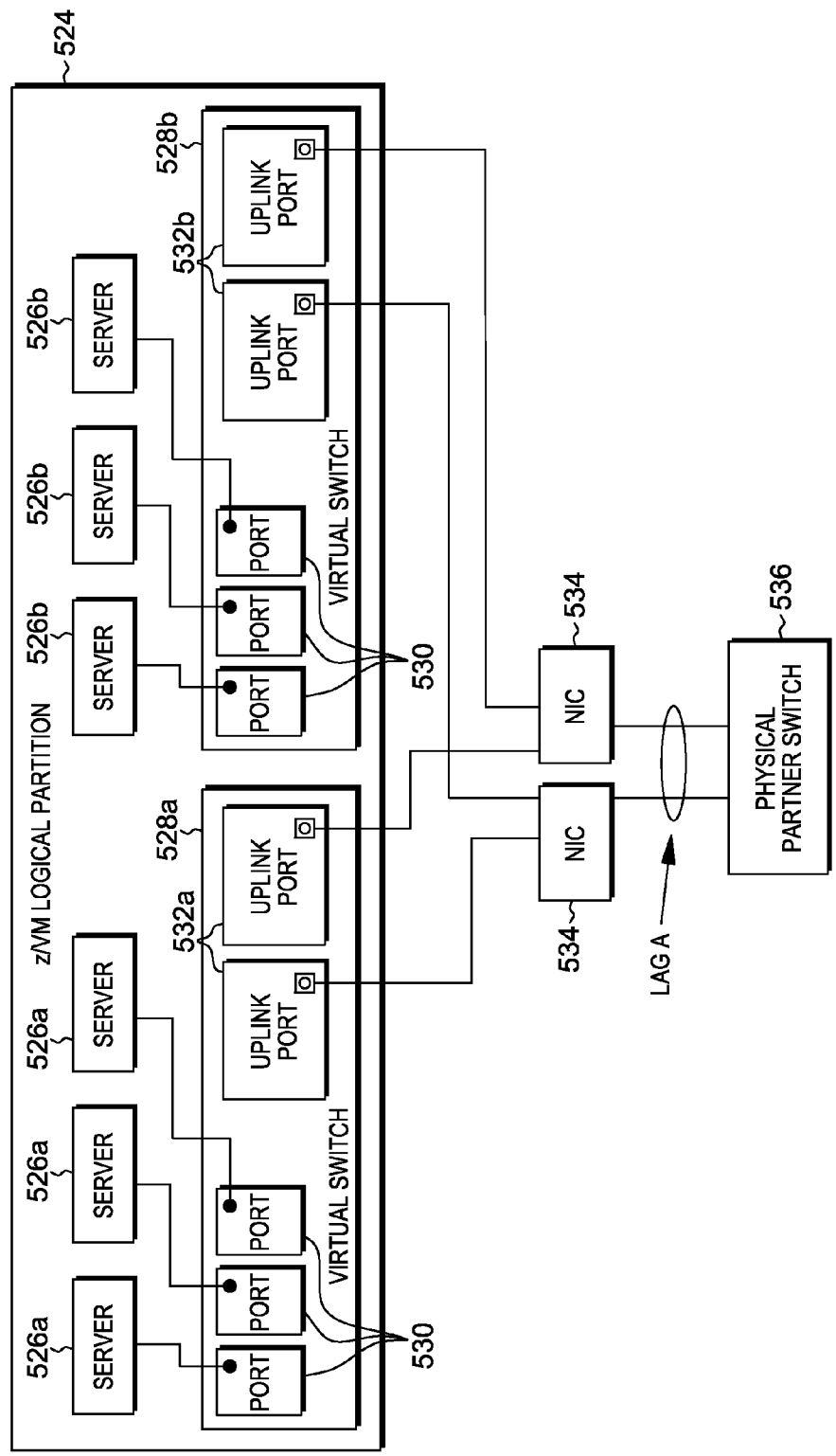
FIG. 5 illustrates an example link aggregation group configuration in accordance with aspects described herein.

Accordingly, FIG. 5 illustrates an example link aggregation group configuration in accordance with aspects described herein. FIG. 5, as in FIG. 4, includes an LPAR 524 hosting multiple servers 526a assigned to virtual ports 530 of virtual switch 528a, and hosting multiple servers 526b assigned to virtual ports 530 of virtual switch 528b. Uplink ports 532a each utilize a different respective physical adapter (NIC 534) to communicate with physical partner switch 536 (or multiple physical partner switches of the LAG). In FIG. 5, in contrast to FIG. 4, uplink ports 532b (of virtual switch 528b) also each utilize the NICs 534 to communicate with physical partner switch 536. Thus, virtual switch 528a and virtual switch 528b each include an uplink port that shares a single physical NIC, and shares a physical port of that NIC in communicating to physical partner switch 536. In the example of FIG. 5, there is only a single physical LAG, LAG A.

Thus provided is a virtual LAG paradigm, where two or more virtual switches (528a, 528b) are made to appear to a physical switch (536) as a single switch with a single link aggregation control plane (LACP). As depicted by FIG. 5, each virtual switch (528a, 528b) is actively sharing a set of NICs (534) that are configured in LAG A. This type of configuration (termed herein a 'Multi-VSwitch LAG configuration') is novel in the networking field.

Provided as part of Multi-VSwitch LAG is an additional virtualization layer to provide support beyond existing LAG port spanning across multiple physical switches, as has been conventionally provided by existing vendors. Example such conventional LAG port spanning across physical partner switches may be known as virtual chassis, virtual port channel, virtual switching system, virtual link agg group, and multi-chassis link agg, among others. With these technologies, a single physical LAG is made up of multiple physical switches with each port of a given physical switch being tied directly to a corresponding port on a partner switch. These technologies merely span a LAG across multiple physical switches; there is no NIC port sharing. Only a single network connection exists between each physical port within the LAG. If an entire physical switch fails, in this configuration, a subset of the original LAG remains viable for data transfer, although the available bandwidth will decrease until the failing switch is repaired.

With Multi-VSwitch LAG as described herein, the physical NIC ports connected within the LAG can still be configured to multiple virtual switches exploiting the aforementioned LAG technology today. An added virtual LAG layer (also termed "LAG virtualization layer" herein) enables each physical port within the LAG to be shared by multiple virtual switches concurrently. A Multi-VSwitch LAG configuration permits each sharing virtual switch in the same or in separate LPARs within a CEC to establish, as an example, its own IEEE 802.3ad LAG connection to the same physical partner switch. From the perspective of the physical switch, it is unknown that there are multiple virtual switches (and therefore multiple virtual LAGs, see below) connected. The added virtual LAG layer may manage a single link aggregation control plane (LACP) with the partner physical switch, to enable an entire CEC's network traffic, or a portion thereof, to be managed within a single LAG. The added LAG virtualization layer may reside at least partially within both the virtual switches and the NIC adapter to complement and support the existing LAG specification (e.g. IEEE 802.3ad).

Multi-VSwitch LAG provides an ability to create a single LACP LAG as defined by IEEE 802.3ad (as an example) with one or more physical switches. All ports within the single LAG may be managed using LACP protocol by one or more of the virtual switches sharing the same physical NIC port. A specific physical port within the LAG may be managed by only one sharing virtual switch at any point in time. All of the physical ports within the LAG may be managed by a single virtual switch or distributed across multiple sharing virtual switches.

A discussion of a Multi-VSwitch LAG environment is now provided. Multi-VSwitch LAG is a collaboration within a single hypervisor or multiple hypervisors, the collaboration being to share physical NIC adapters to enable sharing for the multiple virtual switches to participate in the Multi-VSwitch LAG. A hypervisor may be at least partially responsible for configuration, synchronization, and control of the LAG in conjunction with its peer hypervisors via communication across a communication link. This is depicted and described with reference to FIG. 6, which illustrates communication among hypervisors of a computing environment to facilitate sharing of network adapter ports (NIC adapter ports in this example), in accordance with aspects described herein.

Figure 6:
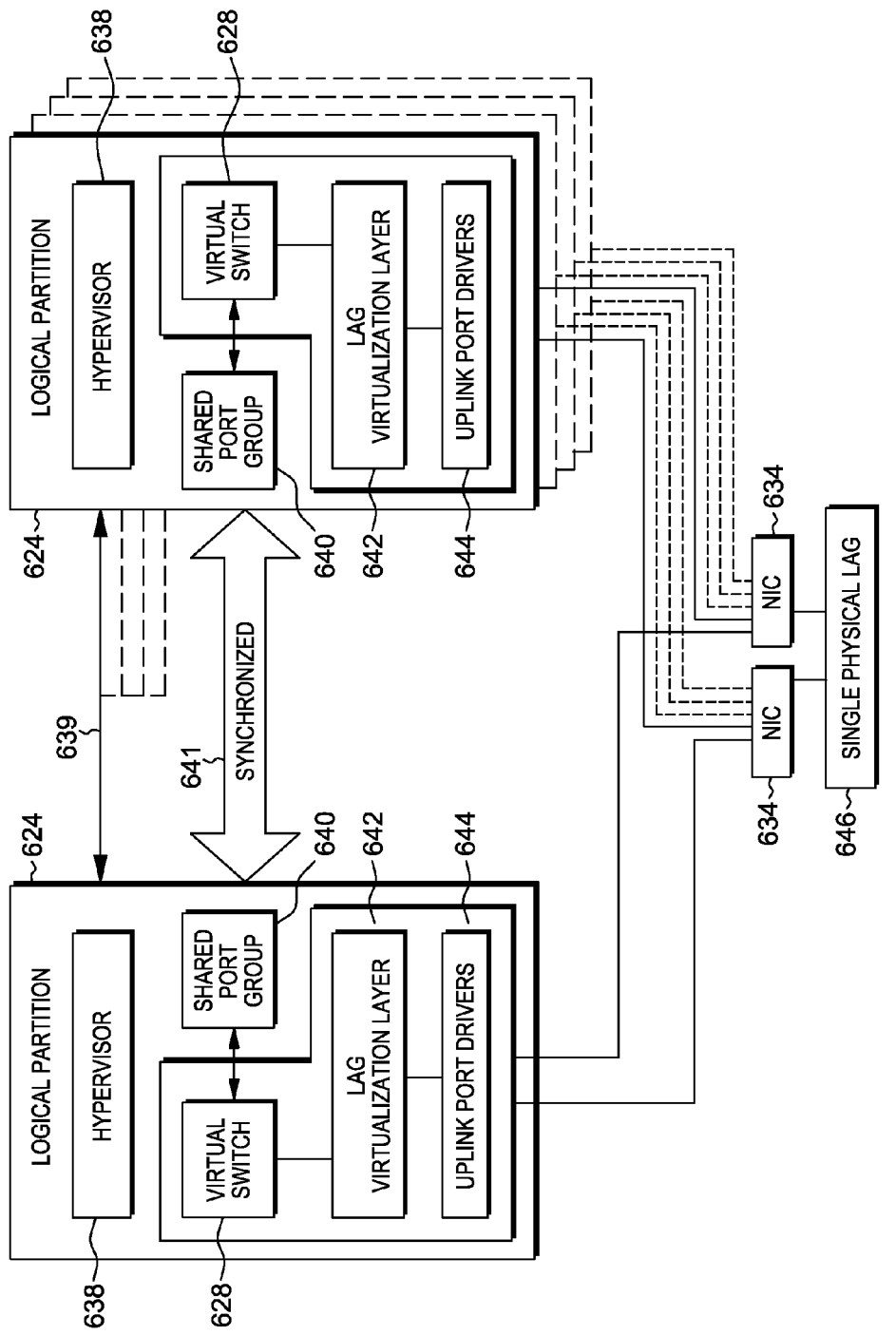
FIG. 6 illustrates communication among hypervisors of a computing environment to facilitate sharing of network adapter ports, in accordance with aspects described herein.

The example of FIG. 6 depicts multiple LPARs 624 (of a single CEC, for instance) sharing NICs 634 as part of single physical LAG 646. Each LPAR executes a respective hypervisor 638. The hypervisors 638 may be in communication via one or more communications paths 639. A user can define a respective virtual switch 628 for each hypervisor 638. The virtual switch and hypervisor are associated with each other, for instance the hypervisor controls the virtual switch. Some or all of these virtual switches may share the same LAG, logically tied together as a global virtual switch (or 'Global VSwitch' herein). A global virtual switch includes therefore a number of independent member virtual switches that can each be associated with a respective different hypervisor, that can be distributed in multiple LPARs, and that may be bound together logically as the single global virtual switch. Effectively, a global switch that spans multiple hypervisors is thereby created. The hypervisors can manage each independent virtual switch as a global virtual switch. Through communication path(s) 639, changes made in one hypervisor can be propagated to all instances of the global virtual switch (e.g. to the other hypervisors), thereby harmonizing multiple independent and distributed virtual switches into a single global virtual switch.

A virtual switch defined as a member of a global virtual switch may be provided the capability to configure a LAG, not just for its associated hypervisor image but also for all of the hypervisors that will share the LAG. This may be accomplished by defining a shared port group 640 of virtual switch ports. Initially, a shared port group 640 is defined on a connected hypervisor image. Once a shared port group 640 is defined, it is the hypervisor's responsibility to propagate the shared port group to all connected hypervisors, at which point the shared port group 640 can be associated with any virtual switch that is a member of a global virtual switch. Changes made in one hypervisor may be synchronized 641 to all instances of the shared port group 640 (i.e. each shared port group 640).

Multi-VSwitch LAG incorporates, for each LPAR, a LAG virtualization layer 642 between the management and configuration function of a virtual switch 628 and its lower level LAG uplink port drivers 644. In this regard, the management functions may include the LACP and MARKER Protocols to be performed by the virtual switch image, and the configuration function may be part of the virtual switch and shared port group components shown in FIG. 6. Conventionally, a LAG uplink port driver is responsible for the LACP protocol required to sustain a viable LAG, while taking input from the virtual switch's management and control functions. In accordance with aspects described herein, the LAG virtualization layer 642 instead is to direct the low level LACP and Marker protocol in concert with the partner switch(es) of the LAG. This moves LAG control from a single virtual switch and its corresponding partner switch(es) to the LAG virtualization layer and its partner switch(es). A function of the LAG virtualization layer 642 is to provide the ability for multiple virtual switches to share the same shared port group 640, transparent to the partner switch, i.e. such that the partner switch behaves as if there is only a single virtual switch and hypervisor behind the NICs.

To facilitate this transparency, the LAG virtualization layer obtains information from all virtual switches sharing the same LAG (i.e. all virtual switches having at least one virtual switch port that is a member of the shared port group). There are two sources from which to collect this information. The first source is the shared port group maintained by the hypervisors associated with the virtual switches of the LAG, and the second source is each shared NIC of the LAG. With respect to the shared NICs, a Port Group Membership Control function is provided to facilitate collection of information therefrom. A hypervisor configures the shared NIC ports and attributes of the group, while the NIC provides low-level status of each virtual switch network connection sharing the NIC. Both sources of information may be used in the administration of the LACP and Marker protocol with the partner switch.

Figure 7:
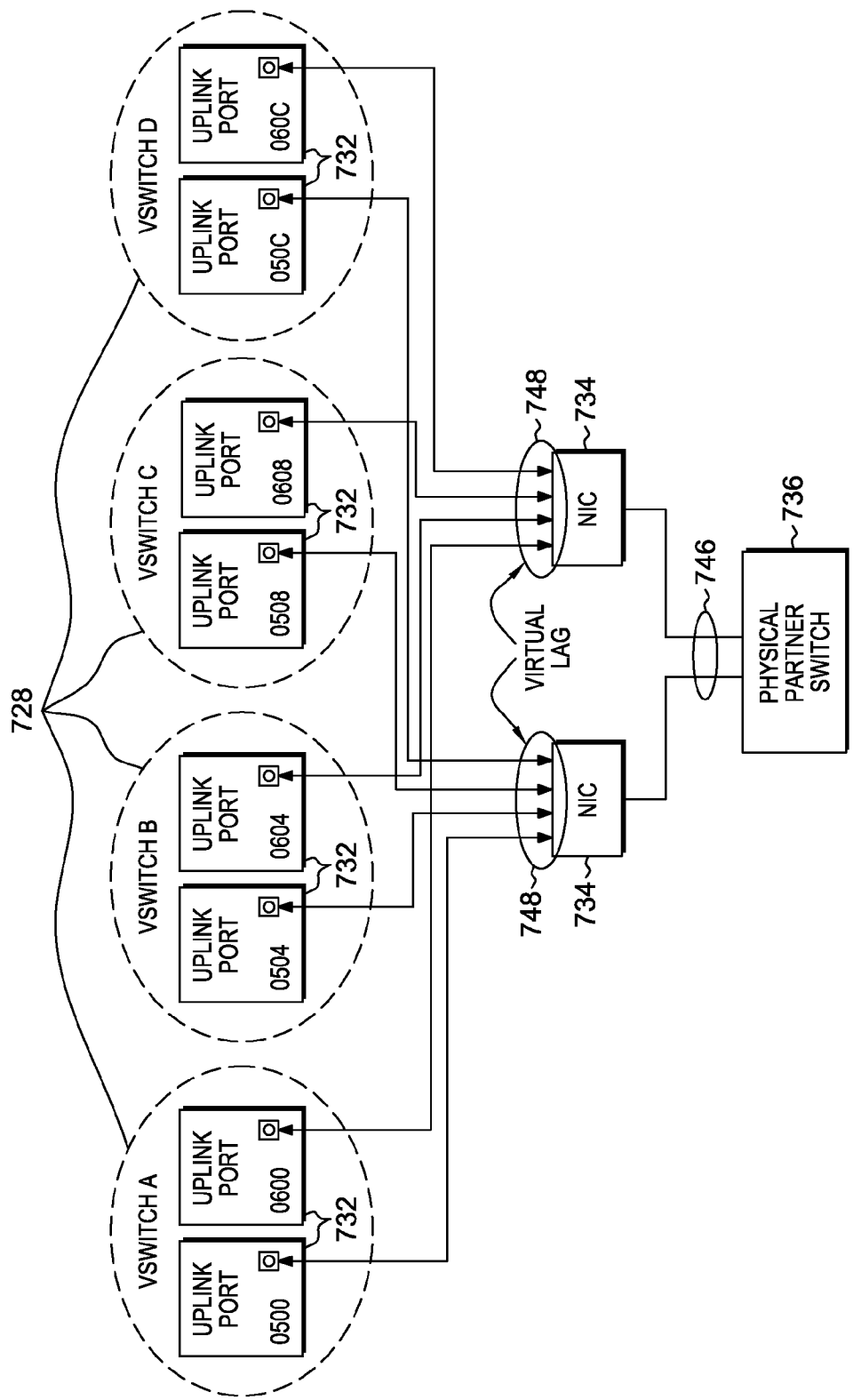
FIG. 7 depicts an example configuration in which a single physical link aggregation group is shared by multiple virtual LAGs, in accordance with aspects described herein.

Various functional areas of the LAG virtualization layer are now described in further detail and categorized into the following sections:
  Port Group Membership Control
  Active and Standby LAG Port Controller roles
  IEEE802.3ad Marker PDU Processing
  Removing an Operational Port from a Multi-VSwitch LAG
  Ability to Remove and Add Virtual Switches in a Multi-VSwitch LAG
  MAC Address Take-Over and Take-Back
  Inter VSwitch Link (IVL) Data Plane Operations
  Port Group Membership Control:
  FIG. 7 depicts an example configuration in which a single physical LAG is shared by multiple virtual LAGs, in accordance with aspects described herein. As shown in FIG. 7, Multi-VSwitch LAG extends the current IEEE LAG support by providing the ability to share the single physical LAG 746 with multiple virtual switches 728. Sharing among the LAG shared port group is conducted while maintaining IEEE 802.3ad design integrity of a single point-to-point communication control plane between the sharing virtual switches 728 and partner switch(es) 736. Each virtual switch 728 includes a pair (in this example) of uplink ports 732. Each uplink port of a virtual switch 728 is in communication with a different physical NIC 734 having a NIC port that is part of the physical LAG 746. In this manner, two groups, i.e. virtual LAGs 748 (each corresponding to a physical NIC 734), are established. For each virtual LAG 748, each virtual switch 728 has a respective uplink port that is part of the virtual LAG. Each virtual switch 728 is connected to the same physical LAG 746 through shared NICs 734 operating in a Port Group Membership Control mode. This new NIC operational mode allows multiple independent LAG capable network connections to be established on the same NIC in a LAG configuration. This provides the ability for a single LAG (746) to be shared across, for instance, multiple z/VM images running within the same CEC. All external network connectivity for the CEC may be provided by the single physical LAG, thus enabling additional capacity to be added or taken away as needed from a single point.

Port Group Membership Control is a function to insure interoperability between virtual switches sharing the same LAG. Part of this new function is the ability for an operating system (as an example) to create a logical group within a physical NIC port. The logical group will keep track of the multiple network connections sharing the same LAG port, whether the network connections are made from the same operating system or LPAR, or from operating systems in multiple LPARs. Only network connections that join the same logical group may be enabled to share the LAG port. Port Group Membership Control can insure the following:

Only a network connection that creates a new, or joins an existing, logical group is allowed to be established on the physical NIC;

All sharing network connections (virtual switches) are compatible in type and function;

Full awareness of all active network connections within the same logical group;

Selection of one of the active network connections as the active LAG Port Controller for the group;

Notification to all group members of any membership changes related to the group; and Selection of another member to take over Ethernet connectivity and/or the active LAG Port Controller function whenever a member leaves the group.

A NIC enters Port Group Membership Control mode based on, for instance, a virtual switch that intends to deploy a LAG creating a logical group on the physical NIC when establishing the virtual switch's network connection, prior to joining a LAG. In some examples, only an idle NIC (devoid of active network connections) is able to transition from its standard operational mode to Port Group Membership Control mode. After a NIC transitions into Port Group Membership Control mode, in some embodiments, only network connections using a same group identifier (group ID) can use the physical NIC. This insures only network connections that are aware of ports within the LAG can use the physical NIC port. The physical NIC may remain in Port Group Membership Control mode until the last member leaves the group.

Active and Standby LAG Port Controller Roles:

From the physical switch's perspective, each port within the LAG is connected to a single virtual switch uplink port. To maintain this point-to-point level of LACP control, Multi-VSwitch LAG may allow, at any given time, only one virtual switch uplink port to perform LACP and Marker management with the physical port, though all sharing uplink ports, including the one performing LACP and Marker management with the physical port, will be able to send and receive data across the LAG.

The virtual switch uplink port that is responsible for LACP and Marker management for a specific physical switch port is termed herein the active LAG Port Controller. By an uplink port being the active LAG Port Controller is meant that the management being performed is done via that uplink port. Some or all of the other uplink ports of the virtual switches sharing the same physical port are standby LAG Port Controllers. A standby LAG Port Controller can send and receive data but not perform LACP and Marker management with the physical port until, and unless, it is selected to become the active LAG Port Controller.

In a Multi-VSwitch LAG configuration, as described and depicted with reference to FIG. 7, a NIC port (such as a physical port of NIC 734 in communication with physical partner switch 736) may be shared by multiple virtual switch uplink ports. Once a NIC enters the Port Group Membership Control mode, membership is controlled though a new NIC command primitive issued by a joining virtual switch. In some embodiments, only a virtual switch that is aware of the same LAG will be able to establish a network connection on the physical NIC. The entire group of network connections activated on the NIC operate together to provide the illusion of a single switch port to its partner switch.

Figure 8:
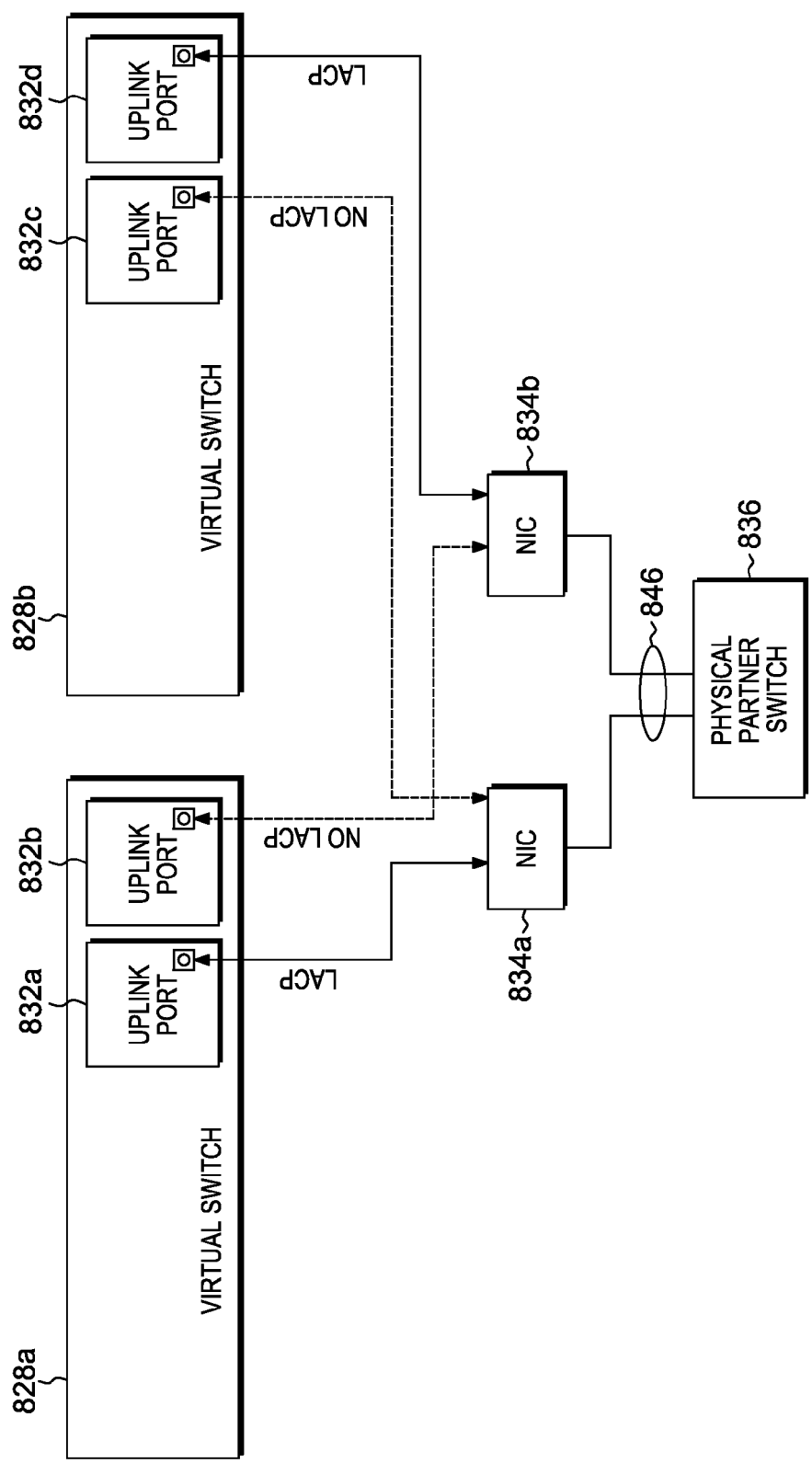
FIG. 8 depicts example link aggregation group port controller assignments in an example link aggregation group configuration according to aspects described herein.

FIG. 8 depicts example LAG Port Controller assignments in an example LAG configuration in accordance with aspects described herein. In FIG. 8, there is one active LAG Port Controller for each physical port within shared LAG 846. In FIG. 8, two NICs 834a and 834b each have a physical port that is part of LAG 846. NIC 834a has active network connections with two uplink ports: uplink port 832a of virtual switch 828a, and uplink port 832c of virtual switch 828b. Similarly, NIC 834b has active network connections with two other uplink ports: uplink port 832b of virtual switch 828a, and uplink port 832d of virtual switch 828b. For each physical port of the LAG, there is an active LAG Port Controller. With respect to NIC 834a's physical port, uplink port 832a of virtual switch 828a serves as the active LAG Port Controller for the shared port group that includes uplink ports 832a and 832c. Each other uplink port of that group (i.e. uplink port 832c of virtual switch 828b) serves as a standby LAG Port Controller. Similarly with respect to NIC 834b, uplink port 832d of virtual switch 828b serves as the active LAG Port Controller for the shared port group that includes uplink ports 832b and 832d, and each other uplink port of that group (i.e. uplink port 832b of virtual switch 828a) serves as a standby LAG Port Controller. Each active LAG Port Controller is of a different virtual switch in this example.

When the network connection between an active LAG Port Controller and an associated NIC becomes inoperable, the associated NIC selects a standby LAG Port Controller from the group and makes it the new active LAG Port Controller. Using the example above, if a network connection failure occurs between NIC 834a and active LAG Port Controller 832a, then NIC 834a may select and assign standby LAG Port Controller 832c to take over as the active LAG Port Controller. At that point, the newly selected active LAG Port Controller (832c) can resume LACP management using the same port ID as the previous active LAG Port Controller (832a). This transition of LACP communications from one LAG Port Controller to another LAG Port Controller may be transparent to the partner switch 836 to insure sustained continuity of the LAG.

Figure 9:
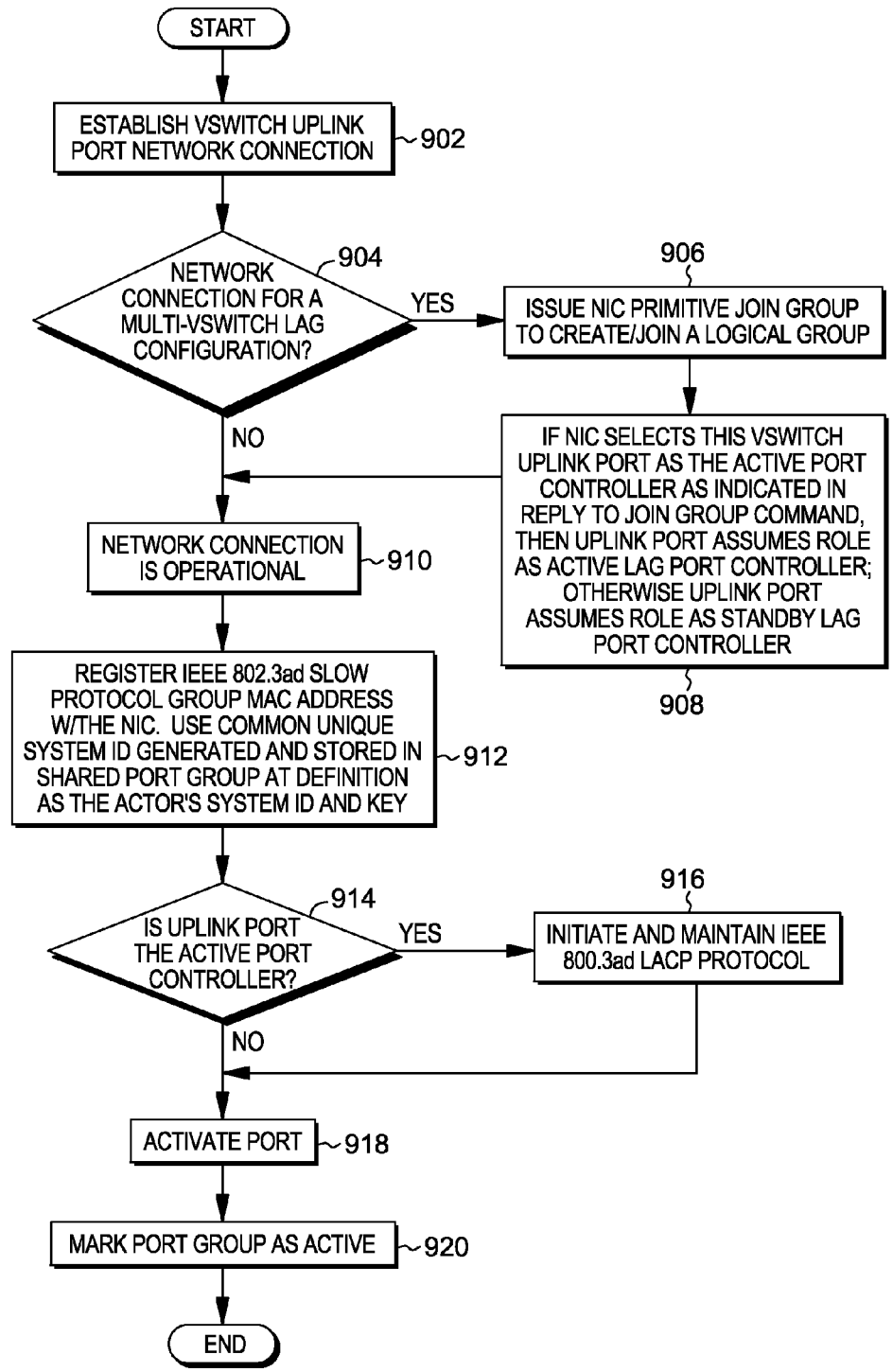
FIG. 9 depicts an example process for activating a virtual switch uplink port, in accordance with aspects described herein.

Two different methods are provided to enable a NIC to notify a virtual switch which LAG Port Controller role (e.g.

active or standby) an uplink port of that virtual switch is to assume. The first is through a reply to a solicited NIC command primitive Join Group or Query Group command issued by the virtual switch. FIG. 9 depicts an example process for activating a virtual switch uplink port, in accordance with aspects described herein. The process of FIG. 9 illustrates changes in the virtual switch uplink port activation logic for handling a solicited active or standby LAG Port Controller assignment for either a Multi-VSwitch LAG or a traditional LAG configuration. In some embodiments, the process is performed by the LAG virtualization layer or a hypervisor of an LPAR hosting the virtual switch that includes the uplink port being activated, though other components of a host system may perform the process of FIG. 9.

The process begins by establishing a virtual switch (VSwitch) uplink port network connection (902). It is determined whether the network connection is for a Multi-VSwitch LAG configuration (904). If not, it is assumed that the network connection is for a traditional configuration, and the network connection becomes operational (910). If instead the network connection is for a Multi-VSwitch LAG configuration, then a NIC primitive Join Group is issued to the NIC to create or join a logical group (906). The Join Group command solicits a reply from the NIC. The reply to the Join Group command will be received from the NIC and indicate which role the virtual switch uplink port is to assume. When the reply is received, if it indicates that the virtual switch uplink port is selected by the NIC to be the active LAG Port Controller, then the virtual switch uplink port assumes the role as active LAG Port Controller, otherwise the virtual switch uplink port assumes the role as standby LAG Port Controller (908). The network connection then becomes operational (910).

After the network connection becomes operational, the IEEE 802.3ad Slow Protocol Group MAC Address is registered with the NIC to enable the network connection to receive LACP and Marker Ethernet frames (912). The common Unique System ID generated and stored in the shared port group at definition is used as the ACTOR's System ID and Key.

Further, it is determined whether this uplink port is the active LAG Port Controller (914) for the shared port group. If so, the IEEE 802.3ad LACP Protocol is initiated and maintained (916) using this uplink port, in accordance with aspects described below. After this initiating, or if at (914) it was determined that the uplink port is not the active LAG Port Controller for the shared port group, the process proceeds by activating the uplink port and setting it up for data transfer (918). Thereafter, the port group used to configure the LAG is marked as active (920) (i.e. the LAG port is now operational for data transfer within the group), and the process ends.

The Query Group command provides the ability for a sharing virtual switch to solicit, at any time, an identification of the virtual switch currently assigned the active LAG port controller from the physical NIC. The Query Group primitive will return an indication all the current VSwitch members in the shared port group, along with an identification of the VSwitch which is the acting LAG Port Controller.

Figure 10:
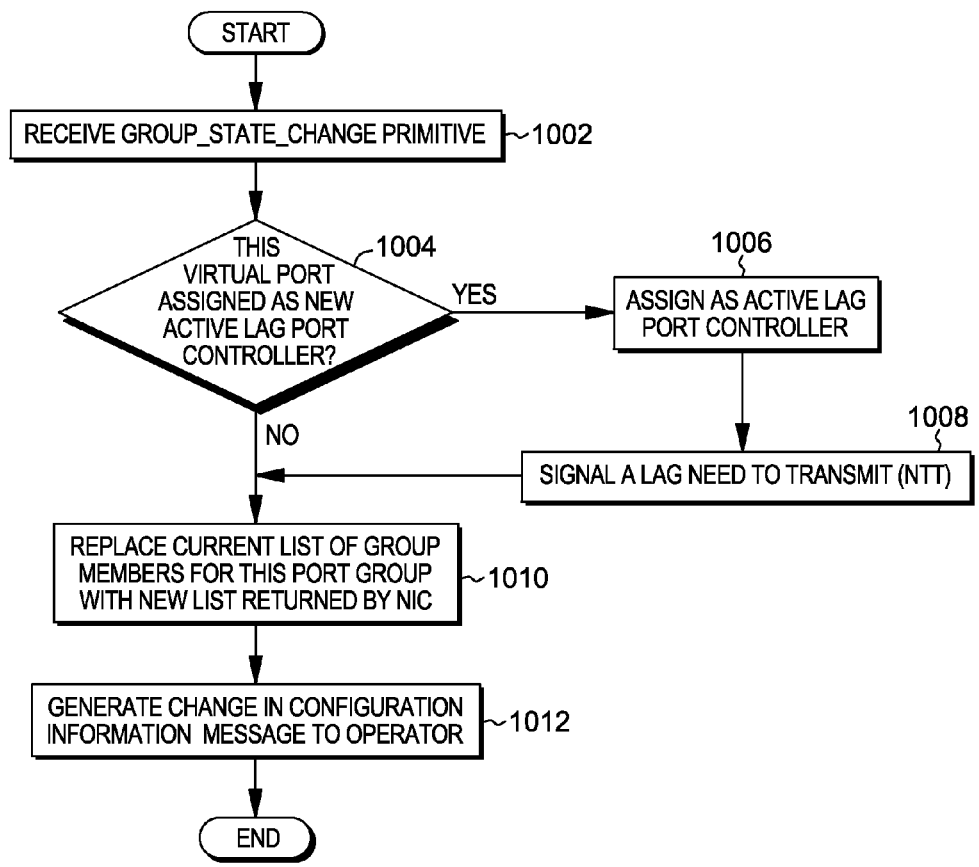
FIG. 10 depicts an example process for handling a link aggregation group port controller state change, in accordance with aspects described herein.

A second way a NIC can notify a virtual switch that its uplink port (for a given shared port group) is either an active or a standby LAG Port Controller is through an unsolicited adapter-initiated Group_State_Change primitive. A LAG Port Controller transition encompasses new LAG management logic for handling an unsolicited active or standby LAG Port Controller change for a Multi-VSwitch LAG configuration. FIG. 10 depicts an example process for handling a LAG Port Controller state change, in accordance with aspects described herein. In some embodiments, the process of FIG. 10 is performed by the LAG virtualization layer or a hypervisor of an LPAR hosting the virtual switch that receives the Group_State_Change primitive from the NIC, though other components of a host system may perform the process of FIG. 10.

The process begins by receiving the Group_State_Change primitive (1002). This is received by a virtual switch from a NIC through an uplink port of the virtual switch. This may be received only when the virtual switch and NIC are in a Multi-VSwitch LAG configuration as described above.

The process proceeds by determining whether the NIC has (by way of the received Group_State_Change primitive) assigned this virtual switch uplink port as the new active LAG Port Controller for the shared port group (1004). If so, then that means the uplink port is a standby LAG Port Controller and is being signaled to take over as active LAG Port Controller. Thus, the uplink port is assigned as being the active LAG Port Controller (1006) for the shared port group, and a LAG Need to Transmit (NTT) is signaled (1008). The NTT is signaled to take over LACP communications by this (new) active LAG Port Controller. To facilitate this take-over, information such as the ACTOR and PARTNER ID to use may already be known by the virtual switch receiving this Group_State_Change primitive. This is because, in accordance with aspects described herein, these are discovered by all uplink ports of a shared port group listening to LACP frames received, including when the port is in standby LAG Port Controller mode. For the network connection of a standby LAG Port Controller to transition to active LAG Port Controller seamlessly with respect to the physical LAG port, the standby LAG Port Controller will listen but not participate in any LACP protocol transmissions, as described below.

Continuing with FIG. 10, after signaling a LAG NTT (1008), or if it was determined that the uplink port was not assigned as the new active LAG Port Controller, then the process proceeds by replacing the current list of group members for this shared port group with the new list returned by the NIC (1010). In this regard, a list of the active and standby LAG Port Controllers are returned with the NIC generated Group State Change primitive. A change in configuration message is then generated and presented to an operator (1012), and the process ends.

Figure 11:
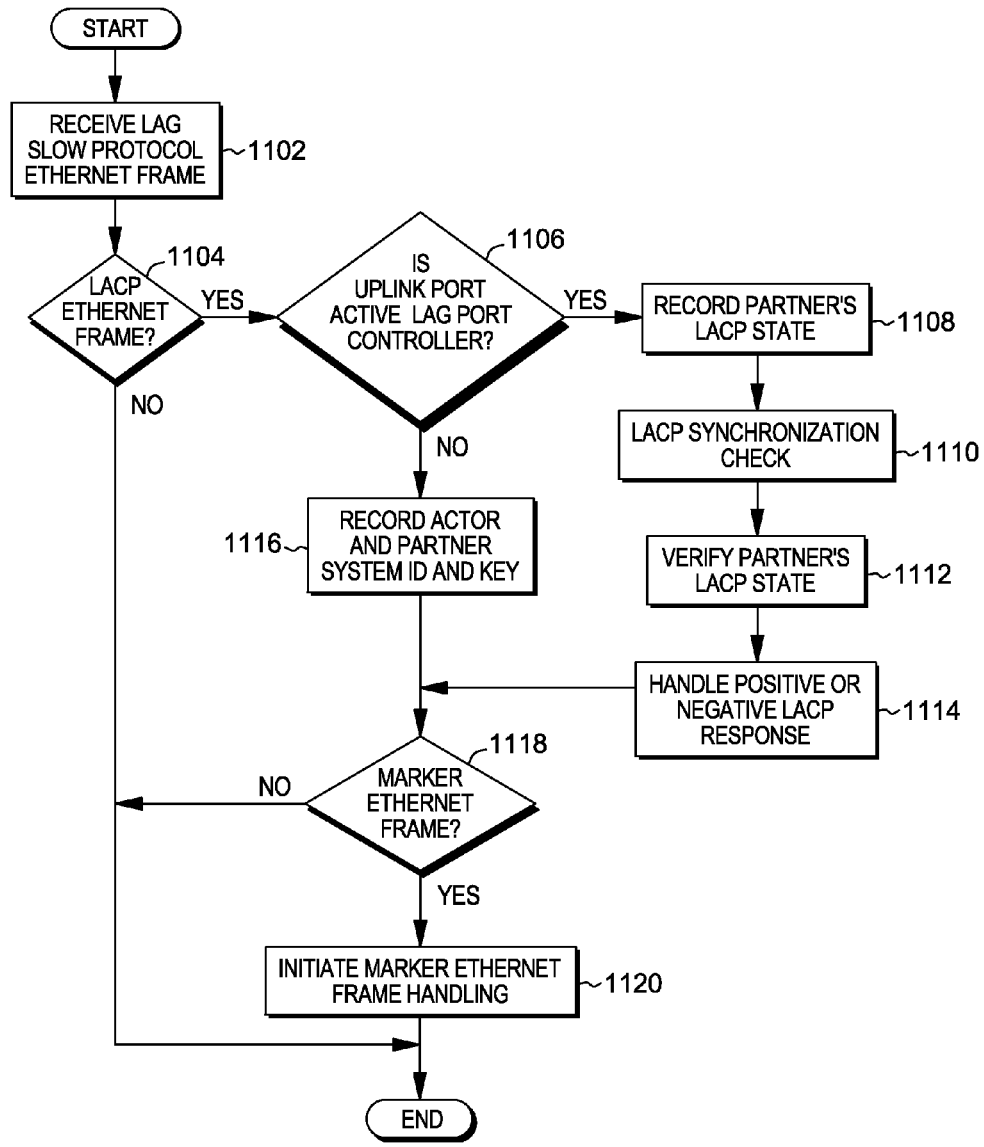
FIG. 11 depicts an example process for link aggregation group slow protocol Ethernet frame handling, in accordance with aspects described herein.

As noted above, for the network connection of a standby LAG Port Controller to transition to active LAG Port Controller seamlessly with respect to the physical LAG port, the standby LAG Port Controller will listen but not participate in LACP protocol transmissions. Both an active and standby LAG Port Controller will activate its network connection using a NIC command with the IEEE 802.3ad Slow Protocol MAC Address. This enables both the active and standby LAG Port Controller to receive a copy of all transmitted LACP Ethernet frames sent from either the physical LAG port or the active LAG Port Controller. Example processing of this LAG slow protocol Ethernet frame handler is described and depicted with reference to FIG. 11. The Multi-VSwitch LAG Slow Protocol Handler of FIG. 11 illustrates changes in LAG Slow Protocol logic. In some embodiments, the process is performed by the LAG virtualization layer or a hypervisor of an LPAR hosting the virtual switch that receives the LACP Ethernet frame, though other components of a host system may perform the process of FIG. 11.

The process of FIG. 11 begins by receiving a LAG Slow Protocol Ethernet frame on the input buffer of a virtual switch uplink port (1102). It is determined whether the received frame is a LAG link aggregation control plane (LACP) Ethernet frame (1104). If not, then no further processing is needed and the process ends.

If the received frame is an LACP Ethernet frame, then it is determined whether the receiving uplink port is the active LAG Port Controller for the shared port group of which the uplink port is a member (1106). If this uplink port is the active LAG Port Controller, then the LACP state of the PARTNER is recorded (1108), a LACP synchronization check is performed (1110), the LACP state of the PARTNER is verified LACP (1112), and a POSITIVE or NEGATIVE LACP response is handled as appropriate (1114).

If instead at (1106) it was determined that the receiving uplink port is not the active LAG Port Controller for this shared port group, then the System ID and Key of both the ACTOR and PARTNER are recorded from the LACP frame (1116). This information may be later used in the situation that this uplink port later becomes assigned as the active LAG Port Controller.

After handling the POSITIVE or NEGATIVE LACP response (1114) in cases where the receiving uplink port is the active LAG Port Controller, or after recording the ACTOR and PARTNER System ID and Key in cases where the receiving uplink port is not the active LAG Port Controller, then the process proceeds by determining whether the received frame is a Marker Ethernet frame (1118). If not, the process ends. Otherwise, the process initiates LAG slow protocol Marker handling (1120), described below with reference to FIG. 12, then ends.

IEEE802.3ad Marker PDU Processing:

IEEE 802.3ad Marker PDU protocol is used by a virtual switch's LAG load balancing and forwarding logic to transparently move outbound data transmissions for a specific destination MAC address from one physical port to another within the LAG. The IEEE Marker protocol is a two-step process that insures all previously virtual-switch-sent Ethernet frames have been received and processed by the partner (physical) switch before switching future data transmissions to another physical port. Flushing all pending outbound transmissions on a physical port prior to switching to another port prevents the destination host from receiving frames out of order.

Virtual Switch Member Initiated Marker PDU—In a Multi-VSwitch LAG configuration, both an active and standby LAG Port Controller may be responsible for load balancing, equally across all ports within the LAG, data transmissions from their respective virtual switch. Therefore, both the active and standby LAG Port Controllers are able to transmit and receive a response to a Marker Ethernet PDU. Doing so allows any sharing virtual switch to flush its outbound transmission queue before switching from one physical port to another physical port. Marker Ethernet PDU processing in accordance with aspects described herein is somewhat different from the way a LACP Ethernet PDU is handled in other configurations.

The slow protocol handler will keep track of a Marker PDU it transmits to a physical switch. Since both active and standby LAG Port Controllers are registered to the slow protocol multicast group, the NIC will send a copy of each Marker Ethernet PDU to every sharing network connection (i.e. each uplink port in a shared port group will receive this Marker Ethernet PDU). It is then up to the receiving virtual switch to determine whether it should process or ignore a Marker Ethernet PDU it receives. In a Multi-VSwitch LAG configuration, a Marker generated by a sharing virtual switch member may be ignored by all the other sharing virtual switches. Only a Marker generated by the physical switch is processed by the target virtual switch, although in accordance with aspects described herein, the action taken by the active LAG Port Controller is different from the action taken by a standby LAG Port Controller.

Sending a Marker PDU—A virtual switch that is in a logical group and generates a Marker creates a transaction ID that is unique to its targeted NIC. This prevents the physical switch port from ever seeing duplicate transaction IDs on Marker PDUs sent from virtual switches sharing the same physical port. Since all sharing network connections see Marker Responses of all other sharing network connections, outstanding Markers with the same transaction ID would erroneously cause sharing network connections to resume marker processing prematurely on receipt of the first Marker Response.

To insure uniqueness across all sharing virtual switches, a one-byte (in this example) NIC command primitive Join Group Connection ID returned by the NIC in response to a successful join request is included in byte one of the Marker Transaction ID generated as shown below:

| Port Number (0-7) | NIC provided connection ID | Virtual Switch Generated Token (0-x'FFFF') |
|---|---|---|
| Byte 0 | Byte 1 | Bytes 2 & 3 |

The NIC insures each active virtual switch of a Join Group logical group is assigned a unique Connection ID. The Connection ID is dynamically assigned by the adapter and, once it is assigned, will not change as long as the network connection remains active. Only when a virtual switch's network connection is restarted might it possibly change.

Receiving a Marker Response PDU—When a Marker Response from a physical switch is received, each virtual switch in the logical group will check the transaction ID to see whether it originated the Marker. Only a Marker Response generated by the issuing virtual switch is processed. All other sharing virtual switches in the logical group will ignore the Marker Response.

Responding to a Physical Switch Initiated Marker PDU— The active LAG Port Controller coordinates standby LAG Port Controller responses before generating the Marker Response to the physical switch port. Although each virtual switch sharing the LAG port has the ability to send and receive a Marker Response, a standby LAG Port Controller is not to respond to an IEEE Marker sent by any of (i) the physical partner switch, (ii) the active LAG Port Controller, or (iii) another standby LAG Port Controller. The active LAG Port Controller responds to a Marker sent by a physical switch port, and the active LAG Port Controller responds with a Marker Response after it receives notification from the standby LAG Port Controllers sharing the physical port.

Whenever a standby LAG Port Controller receives an IEEE Marker from the physical switch port, it creates and sends a LAG Marker Response to the active LAG Port Controller, rather than responding directly to the physical switch port. The unicast LAG Marker Response is sent to the active LAG Port Controller on the same network connection it was received. Once the active LAG Port Controller receives a LAG Marker Response from every standby LAG Port Controller in the logical group, it responds to the Marker sent by the physical switch with an IEEE Marker Response. Waiting for all of the standby LAG Port Controllers to respond with a LAG Marker Response before responding to the physical switch ensures all sharing network connections are flushed.

Thus, after a physical switch sends a Marker PDU to a physical port, the Marker is received at each virtual port of the shared port group. Standby LAG Port Controllers receive the Marker (assume ID 00000001) but will discard it. They will send an encapsulated LAG Marker Response for ID 00000001 to the active LAG Port Controller. The active LAG Port Controller also receives the Marker with ID 00000001. It will wait for all standby LAG Port Controllers to either respond or time-out. If the active LAG Port Controller determines that each standby LAG Port Controller has provided an encapsulated LAG Marker Response to the active LAG Port Controller without timing out, the active LAG Port Controller then sends an IEEE Marker Response to the physical switch in response to the Marker PDU send to the physical port. The physical switch receives the response as an indication that all sharing network connections have been flushed.

Active LAG Port Controller Marker Response Time-Out Processing—As noted above, the active LAG Port Controller tracks responses/time-outs of the standby LAG Port Controllers when Marker Responses are expected from them. The active LAG Port Controller will keep track of an outstanding Marker Transaction ID (0000001 in the above example) it received from a physical switch for a selected maximum time frame, such as four seconds. The time frame may be the same amount of time currently used for a physical switch to respond to a Marker generated by a virtual switch. If a LAG Marker Response is not received from each standby LAG Port Controller within this time, a Marker Response will not be sent to the physical switch port by the active LAG Port Controller. This is no different from current practice when a physical switch port does not respond to a Marker sent by a partner virtual switch.

Figure 12:
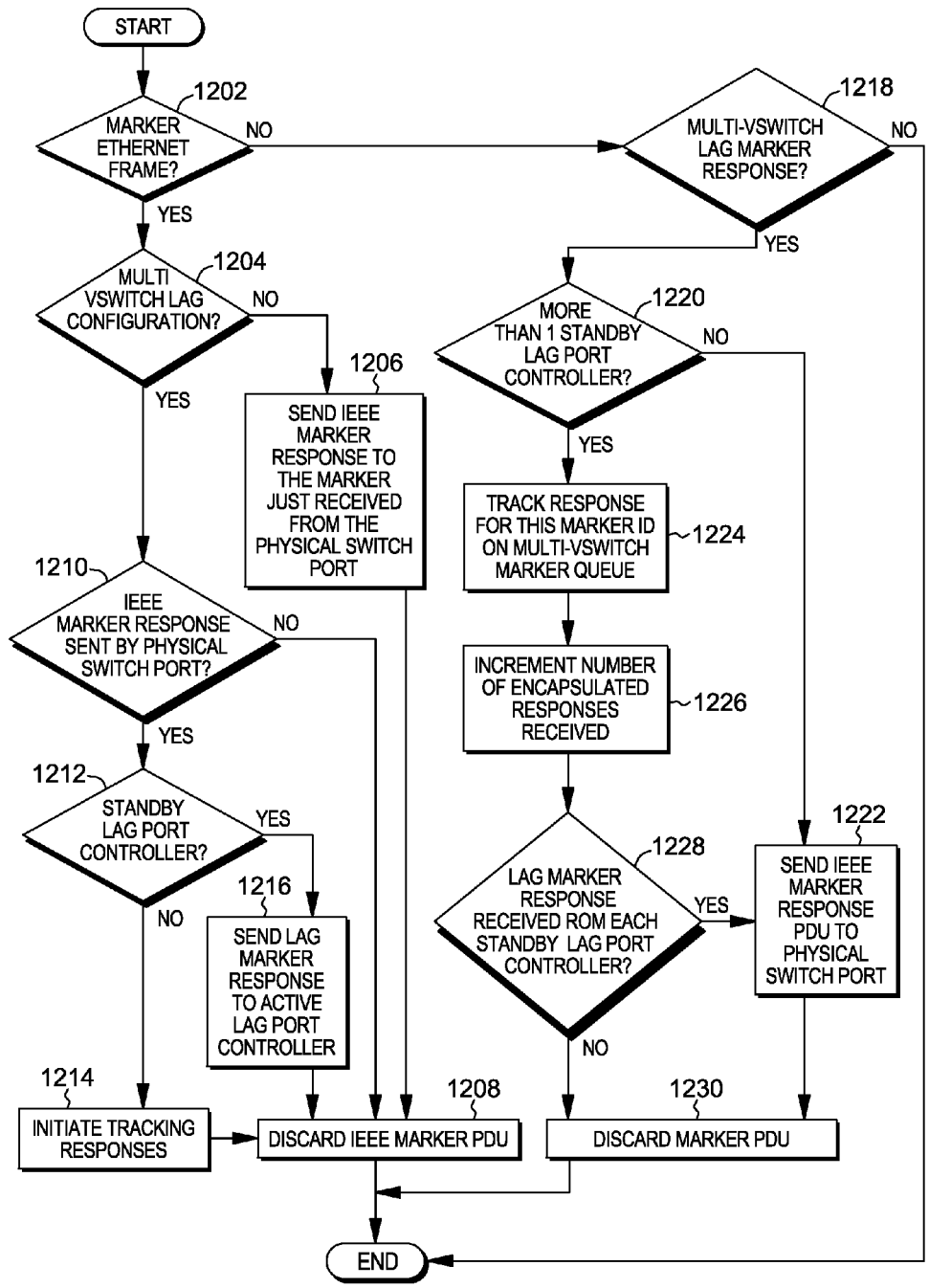
FIG. 12 depicts an example process for link aggregation group slow protocol Marker handling, in accordance with aspects described herein.

Accordingly, FIG. 12 depicts an example process for LAG slow protocol Marker handling, in accordance with aspects described herein. In some embodiments, the process of FIG. 12 is performed by the LAG virtualization layer or a hypervisor of an LPAR hosting the virtual switch that receives the Ethernet frame, though other components of a host system may perform the process of FIG. 12.

The process begins by determining whether the received frame is a Marker Ethernet frame (1202). If so, it is determined whether the present LAG configuration is a Multi-VSwitch LAG configuration (1204). If not, then an IEEE Marker Response to the Marker just received from the physical switch port is sent in response (1206), as is conventionally done, then the IEEE Marker PDU is discarded (1208), and processing of this frame ends. Otherwise, if at (1204) it is determined that the present LAG configuration is a Multi-VSwitch LAG configuration, it is determined whether the IEEE Marker Response PDU was sent by the physical switch port (1210). Given there are multiple virtual switches sharing the same port, there is no guarantee which virtual switch will receive a copy of the physical marker first. Standby LAC Port Controllers may be responsible for sending Marker responses to the active LAG Port Controller, and the active LAG Port Controller can receive Marker Responses from the physical switch or from the standby LAG Port Controllers. It is conceivable, then, that a standby LAG Port Controller can receive and notify the active LAG port controller prior to the active LAG Port Controller actually receiving its copy of the marker. The process of FIG. 12 is performed by each of the virtual switches when a physical marker is received, thereby allowing markers to be received and handled appropriately without respect to order. If the IEEE Marker Response PDU was not sent by the physical switch port, then the IEEE Marker PDU is discarded (1208) and processing of this frame ends.

If instead the IEEE Marker Response was sent by the physical switch port, it is then determined whether the receiving virtual switch port is a standby LAG Port Controller (1212). If the receiving virtual switch port is not a standby LAG Port controller, then by implication it is the active LAG Port Controller. One responsibility of the active LAG Port Controller when receiving a Marker Ethernet frame from the physical switch, as is the case here, is to track the Marker Responses that are to be received by this switch port (as the active LAG Port Controller) from the standby LAG Port Controllers. Thus, the active LAG Port Controller initiates tracking of the responses (1214). In one example, the active LAG Port Controller establishes a Multi-VSwitch Marker queue to keep track of the responses received from the standby LAG Port Controllers (i.e. track which standby LAG Port Controllers have provided a response). After initiating tracking of responses, the IEEE Marker PDU is discarded (1208) and processing of this frame ends.

If instead at (1212) it is determined that the receiving virtual port is a standby LAG Port Controller, then a LAG Marker Response is sent to the active LAG Port Controller via the uplink port network connection through which the Marker Ethernet frame was received (1216). The IEEE Marker PDU is discarded (1208) and processing of this frame ends.

Returning to inquiry (1202), if it was determined that the received frame is not a Marker Ethernet frame, the process proceeds by determining whether the received frame is a Multi-VSwitch LAG Marker Response (1218). As described above, Multi-VSwitch LAG Marker Responses are the encapsulated Marker Responses sent from standby LAG Port Controller(s) in response their receiving a Marker Ethernet frame from a physical switch port (i.e. refer to 1210 and 1216 above). Thus, if at (1218) it is determined that the received frame is a Multi-VSwitch LAG Marker Response, then the receiving LAG Port Controller of this frame is the active LAG Port Controller. Accordingly, it is determined whether more than one standby LAG Port Controller exists in this group (1220). If not, then the Multi-VSwitch LAG Marker Response that was received came from the only standby LAG Port controller that exists in the group, and therefore a Multi-VSwitch LAG Marker Response has been received from all (one) standby LAG Port Controller of the group. Thus, an IEEE Marker Response PDU is sent to the physical switch port (1222), the Marker PDU is discarded (1230) and processing of this frame ends.

If instead at (1220) it is determined that more than one standby LAG Port Controller exists in this group, the received Multi-VSwitch LAG Marker Response is tracked for the Marker ID indicated therein (1224). This is facilitated using the Multi-VSwitch Marker queue that was established when the tracking of responses for the given Marker ID was initiated (1214 above). In some embodiments, the Multi-VSwitch Marker queue tracks which, and how many, standby LAG Port Controllers have provided a Multi-VSwitch Marker Response for the given Marker ID. Based on receiving the present Multi-VSwitch Marker Response, the counter for the number of encapsulated responses received is incremented (1226). It is then determined, based on the data in the Multi-VSwitch Marker queue for instance, whether a Multi-VSwitch Marker Response has been received from each standby LAG Port Controller of the group (1228). If so, then the process proceeds by sending an IEEE Marker Response PDU to the physical switch port (1222). The received Multi-VSwitch Marker Response PDU is discarded (1230), and processing of the received frame ends. Otherwise, a Multi-VSwitch Marker Response has yet to be received from at least one remaining standby LAG Port Controller, thus processing discards the received Marker Response PDU (1230), and terminates, awaiting further Responses or time-out.

Removing an Operational Port from a Multi-VSwitch LAG:

According to aspects described herein, the process to remove an operational LAG port on a virtual switch managed by a hypervisor from a shared port group may not use the three phase commit protocol used when adding a physical port to a LAG. The NIC feature (such as an OSA Express feature of an OSA Express network adapter) for the port being removed may serialize the port removal. When a Leave Port Group (SET PORT GROUP×LEAVE) command is issued by a system administrator on a hypervisor (such as z/VM) image that supports the virtual switch having a standby LAG Port Controller, the port removal request is broadcasted to the hypervisor owning the virtual switch port that is the active LAG Port Controller for handling.

When the active LAG Port Controller receives a port removal request from a provided VSwitch-to-VSwitch communication control plane (termed an Inter-VSwitch link (IVL), or hypervisor network herein), the active LAG Port Controller may issue a SETGROUPPARMS: DELETE GROUP command to the OSA Express feature, which may in turn cause the OSA Express feature to delete the shared port group, thus causing the adapter to terminate the network connection (Activate-QDIO-Queues CCW with a Unit Check). The sense data return will reflect a command reject with code SETGROUPPARMS Port Group Deleted, which informs the active LAG Port Controller to skip device recovery and take down the network connection. The LAG virtualization layer may then inform the hypervisor to detach the devices associated with the network connection and remove the port from its shared port group.

With the OSA Express feature (in the above example) handling the port removal, a number of pathological error and serialization concerns are eliminated. It also insures the OSA Express feature is immediately cleaned up and available for use by any operating system.

Ability to Remove and Add Virtual Switches in a Multi-VSwitch LAG:

A virtual switch can participate in a Multi-VSwitch LAG configuration only when it has network connectivity to all the ports comprising a physical LAG. For this reason the Join Port Group or Leave Port Group command (SET PORT GROUP LEAVE or SET PORT GROUP JOIN commands) for a shared port group has a global rather than a local scope. This prevents any one virtual switch in the group from having partial connectivity to the physical LAG.

On the other hand, it makes perfect sense to have the capability to remove a single sharing virtual switch from a LAG, and a Multi-VSwitch LAG configuration provides this behavior. Existing virtual switch commands for connecting and disconnecting uplink port connectivity may still have a local virtual switch scope. As used today in conventional LAG configurations, these commands can either instantiate or terminate all network connections associated with a LAG, thus removing or adding virtual switch external connectivity to a physical LAN segment for the sharing virtual switch they are issued against.

Although these functions (i.e. SET VSWITCH) of a virtual switch remain a local scope, there is a difference in the manner in which a network connection is terminated when disconnecting from the shared LAG (i.e. SET VSWITCH×DISCON). This is to prevent the NIC (e.g. OSA Express feature) from performing a MAC address take-over recovery action for a sharing virtual switch that is leaving the LAG (see MAC Address Take-over below for more details).

Figure 13:
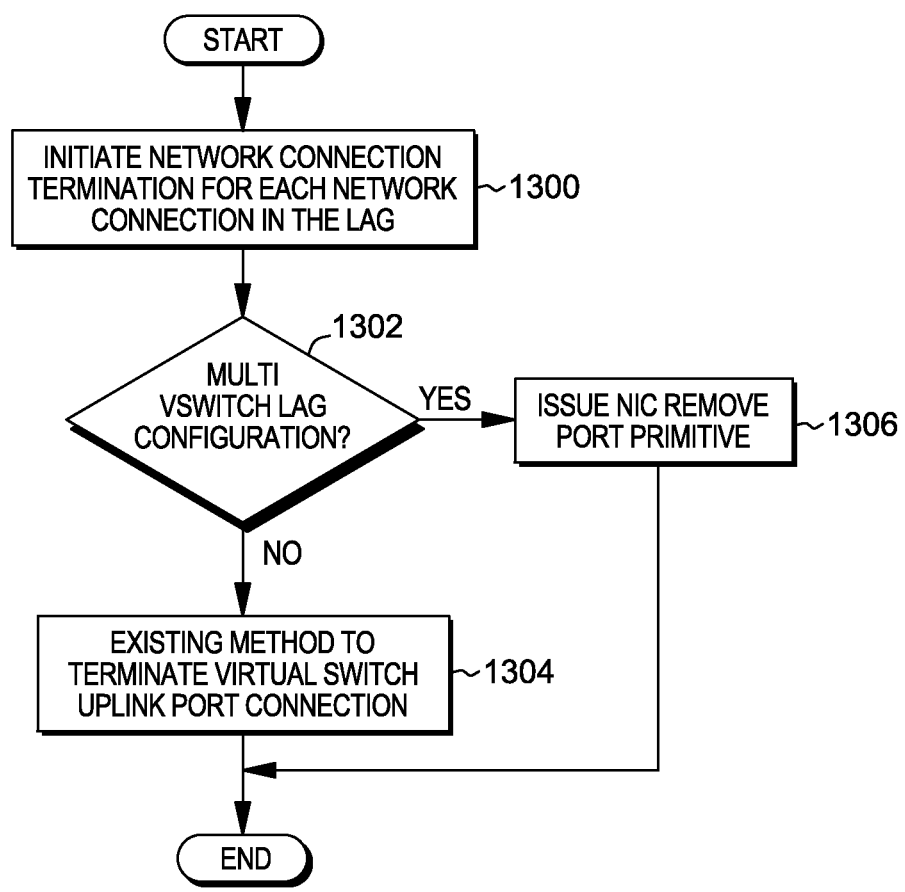
FIG. 13 depicts an example process for a virtual switch uplink disconnect, in accordance with aspects described herein.

FIG. 13 depicts an example process for a virtual switch uplink disconnect, in accordance with aspects described herein, and illustrates changes to, for instance, a hypervisor's uplink port termination logic.

Initially, network connection termination is initiated for each network connection in the LAG (1300). The process continues by determining whether the present LAG Configuration is a Multi-VSwitch LAG configuration (1302). If not, then the existing method (in conventional LAG configurations) for terminating a virtual switch uplink port connection may be deployed (1304). Otherwise, if the present LAG Configuration is a Multi-VSwitch LAG configuration, then a new NIC Remove Port primitive is issued to terminate the network connection (1306). This command informs the NIC to terminate the network connection without performing a MAC Address Take-over recovery action (described below).

MAC Address Take-Over and Take-Back:

With a Multi-VSwitch configuration, the physical switch end of the LAG may have no knowledge that there may be multiple network connections (virtual switches) sharing the same physical NIC port. From the physical switch's perspective, it can forward an Ethernet frame up any physical port within the LAG to reach its intended destination. A Multi-VSwitch configuration maintains this basic LAG design point. Thus, the provided LAG virtualization layer is able to maintain connectivity even if one of the sharing virtual switches looses a network connection to one of the physical ports within the LAG.

If one of the virtual switches sharing the LAG temporarily looses a network connection to one of the physical ports within the LAG, the NIC can automatically select another operational virtual switch to take-over all the media access control (MAC) addresses from the failing virtual switch. The NIC may notify the selected virtual switch taking over the MAC addresses via the network connection between the NIC and the selected virtual switch, and using a new NIC command primitive: Register Local MACs request (such as a SETGROUPPARM: REGISTER_LOCAL_MAC_ADDRESS request). This new NIC-initiated notification informs the virtual switch that it is now responsible for forwarding, to the host (of the virtual switch experiencing the failing network connection), network frames that the take-over virtual switch subsequently receives but which are directed to the specified MAC addresses of that failing host. The means (local networking infrastructure) to send this traffic may be provided by the hosting hypervisor.

Figure 14:
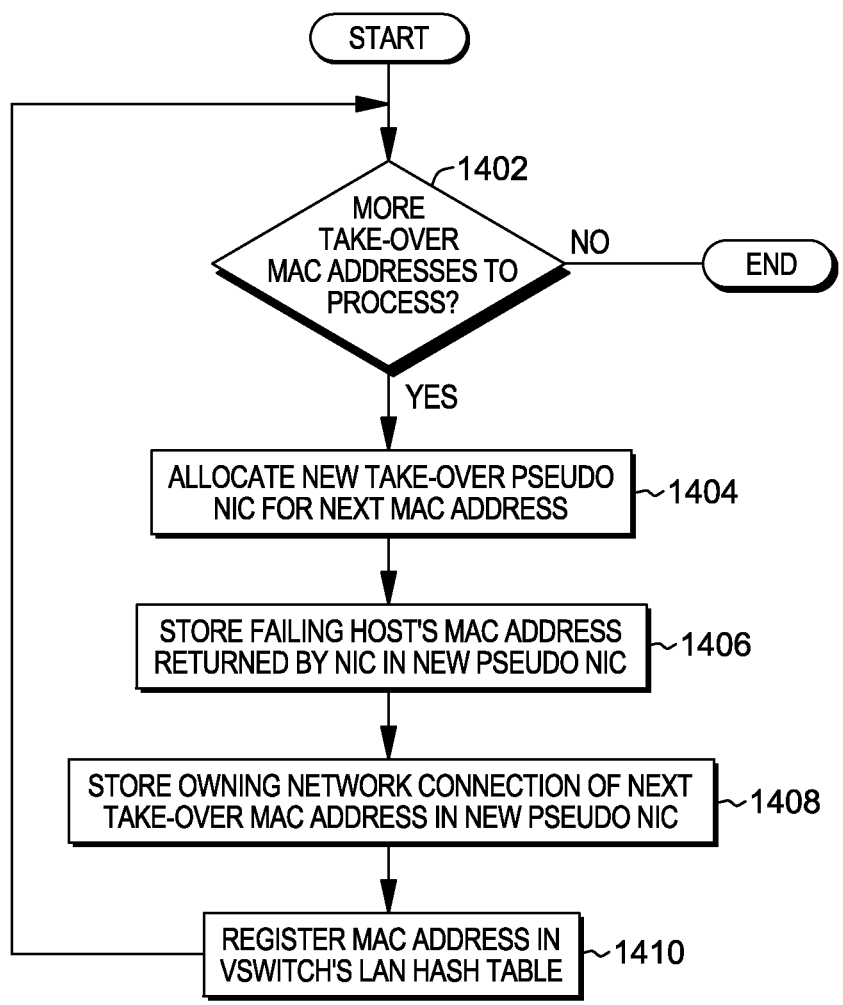
FIG. 14 depicts an example process for handling a request to take over processing of network frames, in accordance with aspects described herein.

FIG. 14 depicts an example process for handling a request to take over processing of network frames, in accordance with aspects described herein. FIG. 14 illustrates LAG management logic processing by a LAG virtualization layer or hypervisor of a take-over virtual switch, for instance, for handling an unsolicited NIC command primitive: Register Local MACs (e.g. SETGROUPPARMS: REGISTER_LOCAL_MAC_ADDRESS) for a Multi-VSwitch LAG configuration.

The processing of FIG. 14 is initiated based on receiving a Register Local MACs command, for instance, from a shared NIC. The process begins by entering a loop beginning with a determination of whether there are more take-over MAC addresses to process (1402). The take-over MAC addresses may be indicated in the command received from the requesting NIC. Assuming there are additional take-over MAC addresses to process, the process continues by allocating a new take-over pseudo NIC for a next take-over MAC address (1404), storing the failing host's (virtual switch's) MAC address, returned by the NIC, in the newly allocated pseudo NIC (1406), storing the owning network connection of this take-over MAC address in the new pseudo NIC (1408), and registering the take-over MAC address in the virtual switch's LAN hash table (1410). Storing the owning network connection may store the identification of the owning hypervisor, so that any frame received for the MAC can be routed to the appropriate hypervisor via the IVL. When the NIC sends up the Register Local MAC Address primitive to the VSwitch Port that the NIC has selected to "takeover" the MAC addresses, it may also include the name of the VSwitch Port which was the original owner of the MAC addresses. The VSwitch receiving the Register Local MAC Address primitive uses this information to store the owning network connection information in the new pseudo NIC. In a configuration utilizing OSA Express network adapters, the SETGROUPPARMS: REGISTER_LOCAL_MAC_ADDRESS command may be received on the controller's READ device and the controller may package the SETGROUPPARMS: REGISTER_LOCAL_MAC_ADDRESS request it receives into a new *VSwitch message and send it down to the hypervisor. The pseudo NIC may be a network interface device control block (NIDBK).

After registering the MAC address in the hash table (1410), the process returns to (1402) to determine whether there are any more take-over MAC addresses to process. In this manner, the process of FIG. 14 repeats to register each take-over MAC address indicated by the NIC as being those for which the selected virtual switch is to take-over processing until the failing virtual switch's network connection is restored. If there are no more take-over MAC addresses to process, the process ends. At that point, the virtual switch that received the command is setup to forward network frames it receives for these take-over MAC addresses to the hypervisor network (IVL network) for distribution to its appropriate destination. The take-over MAC addresses are registered in the virtual switch's LAN hash table, and therefore the virtual switch has the ability to forward any unicast frames it receives from its uplink port's network connection for these MAC addresses to the hypervisor network for provision to the intended destination.

Figure 15:
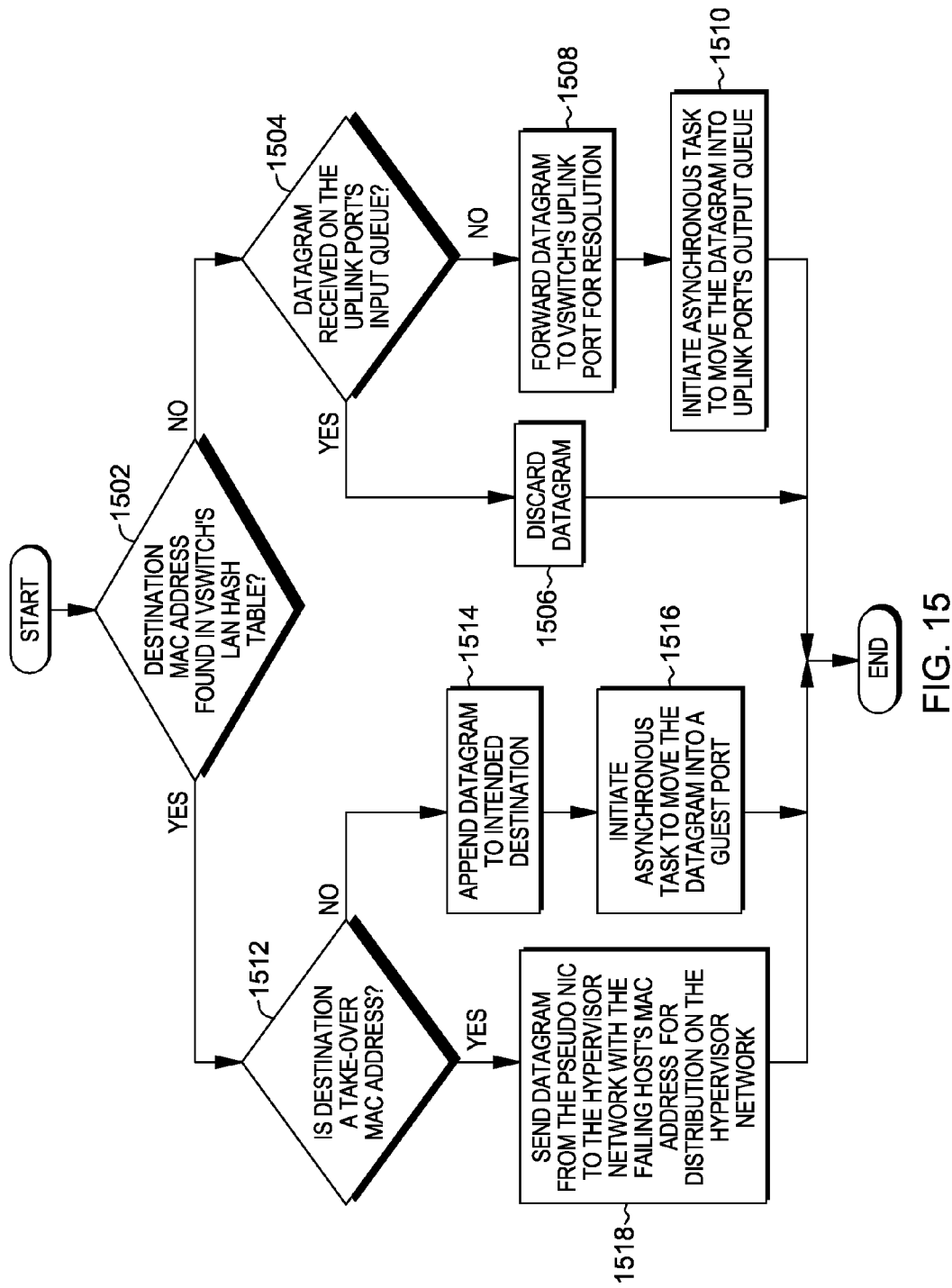
FIG. 15 depicts an example process for handling a received network frame, in accordance with aspects described herein.

FIG. 15 depicts an example process for handling a received network frame, in accordance with aspects described herein. The received network frame is a unicast datagram received for distribution to the virtual switch's LAN segment. In some embodiments, the process of FIG. 15 is performed by the LAG virtualization layer or a hypervisor of an LPAR hosting the virtual switch that receives the network frame, though other components of a host system may perform the process of FIG. 15.

The process begins by determining whether the destination MAC address for this frame is found in the virtual switch's LAN hash table (1502). If not, then it is determined whether the datagram was received on the uplink port's input queue (1504). If so, the destination does not exist on this virtual switch, the datagram is discarded (1506), and the process ends. Otherwise, if the datagram was not received on the uplink port's input queue, then the destination is unknown and the datagram is forwarded to the virtual switch's uplink port for resolution (1508) by initiating an asynchronous task to move the datagram into the uplink port's output queue (1510), such as an output QDIO queue. The process then ends.

Returning to (1502), if it is determined that the destination MAC address for this frame is found in the virtual switch's LAN hash table, then it is next determined whether the destination MAC address is a take-over MAC address (1512) (i.e. whether it is registered as such in the LAN hash table). If not, then the datagram is appended to its intended destination (1514) by initiating an asynchronous task to move the datagram into a guest port (or a bridgeport's QDIO queue, for instance) (1566), and the process ends. Otherwise, i.e. the destination is a take-over MAC address, the datagram is sent from the pseudo NIC to the hypervisor network with the failing host's (switch's) MAC address for distribution on the hypervisor network (1518), and the process ends.

Once a take-over MAC Address is registered in the virtual switch's LAN hash table, it may remain registered therein until the MAC address is either (i) taken back by the original virtual switch that registered the MAC address and based on recovering from its failure, or (ii) the network connection of the uplink port where the take-over MAC address is registered (i.e. the take-over connection) becomes inoperable. In this latter scenario, program logic may be added in the virtual switch uplink port termination logic to purge all take-over registered MAC addresses in the virtual switch's LAN hash table for the network connection being terminated.

When the network connection for the original failing virtual switch recovers, it will register again the MAC addresses that were taken over by other virtual switch. The NIC may be configured not to fail the host registration of these MAC addresses (as a duplicate MAC failure) that were taken over. Rather, the NIC may perform a new MAC address take-back operation. The NIC feature may move the take-over MAC address(es) from its current network connection (the virtual switch that took over frame handling for the failing virtual switch) to the now-recovered virtual switch's network connection attempting to register and take-back the MAC addresses. The MAC address type may be changed from a take-over classification (indicating they have been taken over by a backup virtual switch) to a host-registered MAC address classification. At this point the NIC will notify the virtual switch that temporarily owned the take-over MAC address(es) with a NIC command primitive: Unregister Local MACs command (SETGROUPPARM: UNREGISTER_LOCAL_MAC_ADDRESS request). This will unregister the MAC addresses from the virtual switch to unregister processing of network frames received by the virtual switch and destined for those MAC addresses.

Figure 16:
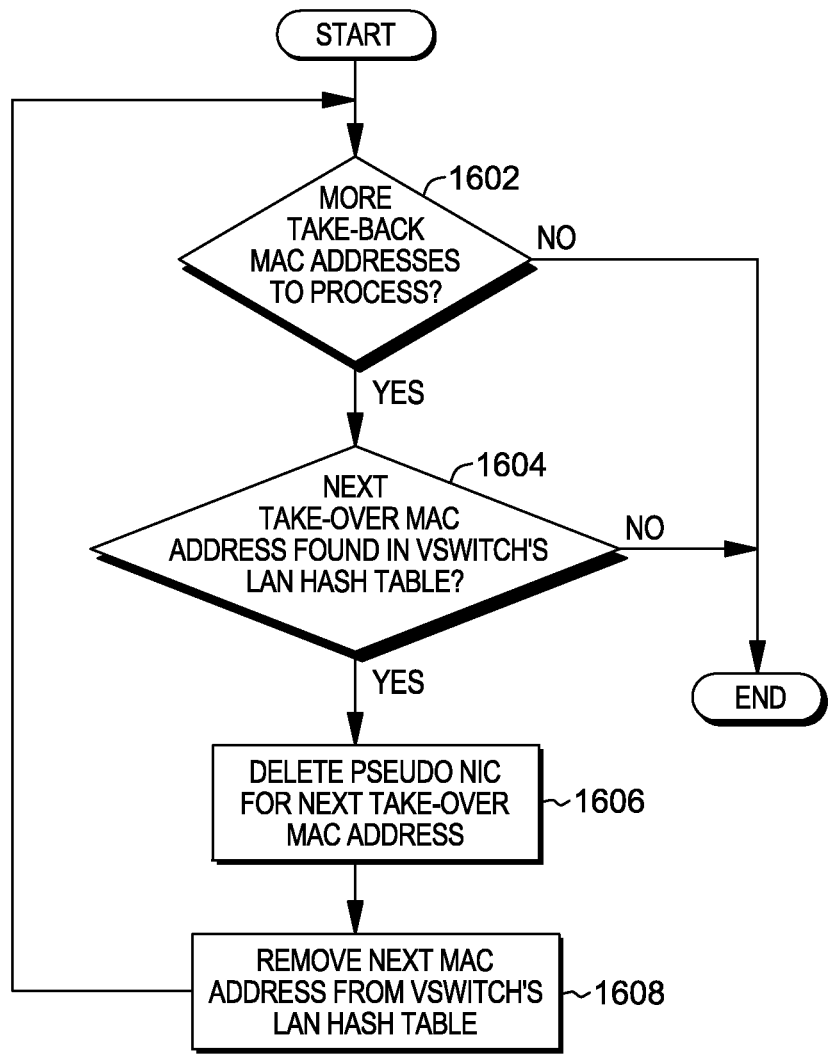
FIG. 16 depicts an example process for handling a request to unregister processing of network frames, in accordance with aspects described herein.

Thus, FIG. 16 depicts an example process for handling a request to unregister processing of network frames, in accordance with aspects described herein. FIG. 16 illustrates LAG management logic for handling an unsolicited NIC command primitive: Unregister Local MACs command for a Multi-VSwitch LAG configuration. In some embodiments, the process of FIG. 16 is performed by the LAG virtualization layer or a hypervisor of an LPAR hosting the virtual switch that receives the request to unregister processing of network frames, though other components of a host system may perform the process of FIG. 16.

The processing of FIG. 16 is initiated based on receiving an Unregister Local MACs command, for instance. The process begins by entering a loop beginning with a determination of whether there are more take-back MAC addresses to process (1602). The take-back MAC addresses are those that were prior registered as take-over MAC addresses but are being taken-back based on, for instance, the network connection that previously failed regaining connectivity.

The take-back MAC addresses may be indicated in the command received from the requesting NIC. Assuming there are one or more take-back MAC addresses (indicated in the command) to process, the process continues by determining whether a next indicated take-back MAC address is found in the virtual switch's LAN hash table as a take-over MAC address (1604). If not, the process ends and may indicate an error. Alternatively, the process may continue back to (1602) to move onto the next indicated take-back MAC address.

If the indicated next take-back MAC address was found in the LAN hash table (1604), the process continues by deleting the pseudo NIC for the next take-over MAC address (1606), and removing the MAC address form the virtual switch's LAN hash table (1608). In a configuration utilizing OSA Express network adapters, the SETGROUPPARMS: UNREGISTER_LOCAL_MAC_ADDRESS command may be received on the controller's READ device and the controller may package the SETGROUPPARMS: UNREGISTER_LOCAL_MAC_ADDRESS request it receives into a new *VSwitch message and send it down to the hypervisor.

After removing the next take-back MAC address from the hash table (1608), the process returns to (1602) to determine whether there are any more take-back MAC addresses to process. In this manner, the process of FIG. 16 repeats to unregister each take-back MAC address indicated by the NIC. If all indicated take-back MAC addresses have been processed, the process ends. At that point, the virtual switch (that received the command) is no longer configured to handle processing of network frames directed to those MAC addresses that were just taken-back.

Inter VSwitch Link (IVL) Data Plane Operations:

An IVL manager supports the transmission of production work load traffic over an IVL data plane. This data plane communication may be used by the Multi-VSwitch LAG in support of a MAC Address Take-Over recovery operation. The IVL is a communications link between the virtual switches. It serves as the means for the LAG virtualization layers within the hypervisors to communicate with each other. As described above, a take-over operation is a condition where one VSwitch takes over the transferring and receiving of production data with the partner physical switch on behalf of another VSwitch configured to share the same NIC feature. The operational role of the IVL manager in a take-over operation is presented below with reference to FIG. 17.

As described above, MAC address take-over may be initiated by the NIC (e.g. OSA-Express feature) whenever a network connection sharing a specific LAG port becomes inoperable. In the case of a network failure, one of the remaining active network connections will take over customer production data transfer operations for the failing VSwitch member through the IVL Data Plane. The following use case presents take-over operations focusing on the IVL manager in concert with the OSA-Express feature. A role of the IVL data plane through the duration of a take-over event may be to provide temporary transport of customer production workload for a shared port group until connectivity is restored for its LAG Port Controller.

VSwitch IVL communications may be encapsulated using a new IVL MPDU structure (MAC Protocol Data Unit). This new protocol may flow between the hypervisor images through an IVL VSwitch and the shared port connection provided by a NIC feature of distinct NIC features connected to an IVL VSwitch.

Figure 17:
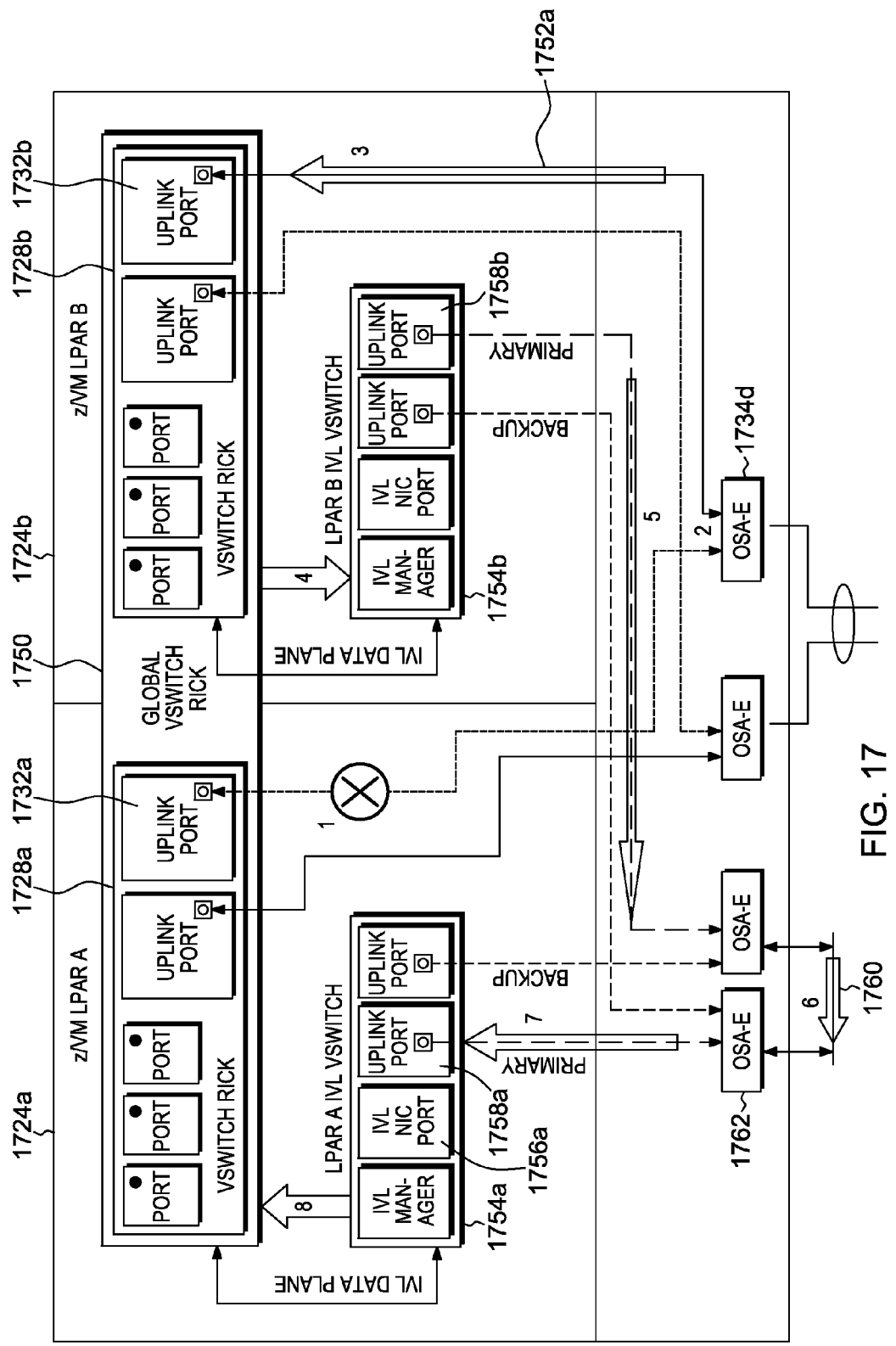
FIG. 17 depicts an example link aggregation group port controller take-over sequence, in accordance with aspects described herein.

An example IVLMPDU format for IVL Manger data plane communication is as follows:

IVL Manager Data Plane Communication
  2 byte PDU Type: x'0001'
  1 byte PDU Operation x'0000' (Encapsulated)
  2 byte PDU Sub-Type: x'0006' (Customer Production Payload)
  1 byte PDU Format: x'00'
  1 byte Reserved
  8 byte EBCDIC VSwitch Global ID
  8 byte EBCDIC z/VM VSwitch Member Name An example LAG Port Controller take-over sequence in accordance with aspects described herein is provided with reference to FIG. 17. The flow described with reference to FIG. 17 is built on the preface that VSwitch RICK.A (1728a) and VSwitch RICK.B (1728b) are members of the same Global VSwitch RICK (1750).

At 1, an unexpected connectivity outage develops between a standby LAG Port Controller (VSwitch Uplink Port 1732a) of VSwitch RICK.A (1728a) and its OSA-Express feature 1734d. Being there is still a functional sharing LAG Port Controller connection (i.e. 1752a) to this OSA-Express feature 1734d, the OSA-Express feature 1734d will not drop the light to (inform) the physical partner switch (not pictured). In this case, the physical partner switch will continue to send inbound data destined for the non-operational LAG Port Controller 1732a of VSwitch RICK.A 1728a.

At 2, this connectivity outage of uplink port 1732a will result in frames directed thereto being dropped by the OSA-Express feature 1734d unless another network connection takes-over handling of frames directed to the MAC addresses being serviced by VSwitch RICK.A 1728a. To mitigate this loss of connectivity (and frame discards) the OSA-Express feature 1734d selects another sharing VSwitch LAG Port Controller to "take-over" for non-operational LAG Port Controller 1732a of Global VSwitch RICK.A 1728a.

At 3, the OSA Express feature selects the sharing LAG Port Controller 1732b on VSwitch RICK.B 1728b by sending a SETGROUPPARMS Register Local MAC Address command to VSwitch RICK.B 1728b indicating the take-over MAC addresses. VSwitch RICK.B 1728b updates its LAN hash table with the take-over MAC addresses, which represent the virtual NICs of VSwitch RICK.A 1728a. Frames targeted for VSwitch RICK.A 1728a will not discarded but instead will be sent by OSA Express feature 1734d to VSwitch RICK.B 1728b to forward to VSwitch RICK.A 1728a.

At 4, VSwitch RICK.B 1728b will, as part of its table HASH look-up, resolve a destination MAC address of a frame received (inbound) from OSA-Express adapter 1734d, and determine that the destination MAC address is not local, but is a "take-over" MAC address. This NDMBK (frame) may be "sent" to the resident IVL VSwitch 1754b for delivery to VSwitch RICK.A 1728a. A new IVL Encapsulation Handler may operate as follows:

The customer production payload NDMBK may be encapsulated (appended) to another NDMBK that contains a new Ethernet Header, and an IVLMPDU.
  IVL PDU type
  PDU Operations Flag→Encapsulated
    PDU Sub-type→Customer Production Payload
    Target VSwitch Name and the unicast MAC address of the hypervisor's IVL Manager (received from OSAExpress feature 1734d through the take-over process)
  The customer portion of the payload may retain its original NDMBK(s), Ethernet header and payload.
    LPAR A's IVL Manager unicast MAC→Destination MAC passed to the IVL Encapsulation Handler is inserted into the Ethernet Header of the prefixed NDMBK block. (IVL VSwitch A 1754a).

At 5, IVL VSwitch logic may place the new NDMBK chain on one of LPAR B's (1724b) IVL VSwitch Uplink Ports (1758b) for provision to VSwitch RICK.A.

At 6, the Ethernet payload may be directly received and delivered by the Primary OSA-Express feature of LPAR A's (1724a) IVL VSwitch 1754a or, as here, may go through a single hop on the wire 1760 to reach another Primary OSA-Express feature 1762.

At 7, once the Ethernet payload is received at uplink port 1758a of IVL VSwitch 1724a, the IVL VSwitch 1754a places the Ethernet payload from the QDIO Input Queue into NDM-BKs. The NDMBKs are sent for transmission to LPAR A's (1724a) IVL Port 1756a.

At 8, after the IVL Dispatcher receives the payload from the IVL NIC Driver, it interrogates the IVLPMDU:

IVL PDU type

PDU Operations Flag indicates encapsulated NDMBK (payload)

Payload is Customer Production Data

Based on the IVLMPDU, the IVL Dispatcher may hand off the payload to the IVL Data Plane Communications Handler's extraction routine, which will use the Source Object Token in the IVLMPDU header to locate VSwitch RICK.A's (1728a) LANBK. The IVL Data Plane Communications Handler may remove and return the prefixed NDMBK block (encapsulation) and restore the first NDMBK of the customer's payload as the header. This payload may be queued (pointer move) in VSwitch RICK.A (1728a) as if it was received by its native uplink port (i.e. 1732a) ready to be delivered to its target guest virtual NIC.

Further details are now provided for MAC address take-over functions using various SETGROUPPARMS commands.

An aspect of a SETGROUPPARMS logical group (shared port group) is its ability to automatically take-over data transfer for a member that unexpectedly leaves the group due to, for instance, a network connection malfunction. If a host network connection (network connection between a virtual switch uplink port and a physical NIC) is made inoperable by, for instance, a Clear Subchannel (CSCH) Instruction, Halt Subchannel (HSCH) instruction, or an unrecoverable error condition detected by the OSA Express feature, for instance, then unicast and multicast MAC addresses currently registered on the failing network connection may be moved by the OSA Express feature to another active network connection within the shared port group.

The above functionality may be controlled by the OSA Express feature. It is up to the OSA Express feature to select any existing shared group member it wants to handle data transfer for the failing network connection. The network connection selected will handle future data transfers for the MAC addresses it took over until a new or an existing network connection in the group registers the take-over MAC addresses via, for instance, a SETVMAC, SETGMAC or a new Block MAC Address Registration (SETBMAC) OSA Express feature primitive. Therefore, it is the OSA Express feature's responsibility to keep track of not only the MAC address but also how the MAC address was registered.

In accordance with aspects described herein, an OSA Express feature registered MAC address can be classified either as a "host" or a "take-over" type MAC address. A MAC address registered by a host on a network connection using either a SETVMAC, SETGMAC or a new Block MAC Address Registration (SETBMAC) primitive is considered to be a "host" registered MAC Address, whereas a MAC address that was registered as a result of a MAC address take-over by the OSA Express feature is considered as a "take-over" type MAC address registration.

MAC Address Take-Over—Whenever a network connection is abnormally terminated by either the host or OSA Express feature, the adapter may change the connection ID associated with the MAC address to a fully operational network connection of its choosing. After the connection ID change is made, the MAC address type may be changed to a "take-over". If the take-over MAC address is a multicast address and it is already registered in the new network connection, then the MAC address type may not be changed in the new network connection.

If there is no other member in the logical group (shared port group) to take-over the MAC address, then the OSA Express feature may skip the take-over operation altogether and perform its normal termination processing. At this point, the logical group may be deleted and the adapter removed from "Group Exclusive" (Port Group Membership Control) mode. When out of Port Group Membership Control Mode, the adapter can be used by other LPARs/hypervisors not participating in the Multi-LAG Port Group function. In some situations, take-over may occur only if there is more than one network connection in a logical group.

Whenever an OSA Express feature changes a MAC address type from "host" to "take-over", it notifies the host taking over the MAC address. The notification is performed by, for instance, using a new adapter initiated layer-2 SETGROUPPARMS: REGISTER_LOCAL_MAC_ADDRESS command. The primary purpose of this new asynchronous notification is to inform the host it must start forwarding Ethernet frames received with this destination MAC address to a different host operation with the following information:

8 Byte Host Name of the failing host

6 Byte Host Unicast MAC Address of the failing host

Failing Device Address and Port Number

Array of Unicast and Multicast Take-over MAC Address

When a virtual switch in a shared LAG receives a SETGROUPPARMS: REGISTER_LOCA_L MAC_ADDRESS command, it may take the list of MAC addresses received and register them into its LAN hash table, as described above with reference to FIG. 14. The hash table entry (NIDBK) for each MAC address registered may point to the IVL VSwitch's IVL Port instead of a guest or logical guest port on the VSwitch (see FIG. 17). Associated with this MAC address may be the 6 byte Host unicast MAC address returned by the SETGROUPPARMS: REGISTER_LOCAL_MAC_ADDRESS command. The unicast MAC address returned may be for the z/VM host where the guest owning the MAC address resides. Once the MAC address is registered, an Ethernet frame received for this destination MAC address may be forwarded directly to this system's IVL Manager instead of guest or logical guest port. The IVL Manager may then encapsulate the frame and send it across the IVL to its appropriate z/VM Host for distribution to the guest, as shows in FIG. 17.

MAC Address Take-Back—Once a MAC address is taken over by another network connection due to an abnormal termination in a SETGROUPPARMS logical group, the host taking over the MAC address may be responsible for forwarding Ethernet frames it receives for that MAC address to the appropriate host for distribution. In embodiments involving z/VMs, the Ethernet frame may be forwarded through a different IVL network connection to an appropriate host for distribution. The network connection may perform this take-over operation until the failing or a different network connection takes back the MAC address.

A host takes back a MAC address by registering it on a network connection using either a SETVMAC, SETGMAC, or a new Block MAC Address Registration (SETBMAC) primitive, as examples. This could be either the same network connection that currently owns the take-over MAC address or another network connection in a SETGROUPPARMS logical group. Typically, it will be the original (failing) network connection, when it reestablishes its network connection after recovering from the failure.

Whenever a host registers a MAC address that is already registered in the OSA Express feature as a "take-over" MAC address, the host may "take-back" data transfer responsibilities for the registered MAC address. This action may cause the OSA Express feature to change the MAC address type from "take-over" to "host" and the connection ID to the network connection registering the MAC address.

Once a host's network connection takes back a MAC address, the OSA Express feature may notify the host that originally took over the MAC address that it is no longer responsible for this MAC address (i.e. processing network frames directed to the take-over MAC address). This may be accomplished by using a new adapter initiated layer 2 SET-GROUPPARMS: UNREGISTER_LOCAL_MAC_ADDRESS, described above. When a z/VM host (as an example) receives this asynchronous notification, it may remove the specified MAC address it took over from its LAN hash table. Now that another VSwitch may be handling data transfer for this MAC address, the take-over host may no longer receive any Ethernet frames for this MAC address. The new SET-GROUPPARMS: UNREGISTER_LOCAL_MAC_ADDRESS notification can provide a way for z/VM to clean up after a recovery action. The following information may be reflected back with a SETGROUPPARMS: UNREGISTER_LOCAL_MAC_ADDRESS whenever an OSA Express feature changes a MAC address Type from "take-over" to "host":

8 Byte Host Name of host taking back the MAC address
6 Byte Host Unicast MAC address of the host taking back the MAC address
Take-back Device Address and Port Number
Array of Unicast and Multicast take-back MAC addresses Host MAC Address Registration Rule Change—The rules for duplicate MAC address detection when a host attempts to register a MAC address that may be already registered in the OSA Express feature can differ depending on how the currently registered MAC address was registered. The following outlines the new actions taken when a host attempts to register a MAC address on a network connection which may be already registered on the same or different network connection on the OSA Express feature:

If the hardware registered MAC address type is Host Registered, and a host attempts to register the same MAC address, a "Duplicate MAC Address" x'2005' may be reflected (as is currently done). If the hardware registered MAC address type is Take-over MAC, then if a host attempts to register the same MAC address, the following can be performed:
1. Change the connection ID for the MAC address to the new network connection.
2. Change the MAC address from "take-over" to "host".
3. Reflect a "Success" Return Code x'0000'
4. Notify the network connection which had the "take-over" MAC address registered that the MAC address has been removed via the adapter initiated VLAN Handling for Take-Over—The network connections making up a logical group may each register their own set of VLANs depending on the configuration of the guests using the virtual switch. Therefore, one network connection may not be registered for the same set of VLANs as another. Under normal operations, OSA may forward VLAN-tagged frames only to connections that have registered that specific VLAN, also taking into consideration whether that network connection has registered the destination MAC address of the frame for unicast and multicast (for a broadcast, OSA may forward the frame if the host has registered the matching VLAN).

In the case of a frame where the destination may be a take-over MAC address, OSA may forward a frame to the take-over connection regardless of the VLAN tag, if any. This may allow the host to encapsulate and forward the VLAN-tagged frame over its IVL to the destination. z/VM (as one example) may take responsibility for VLAN enforcement at the destination z/VM image.

Figure 18:
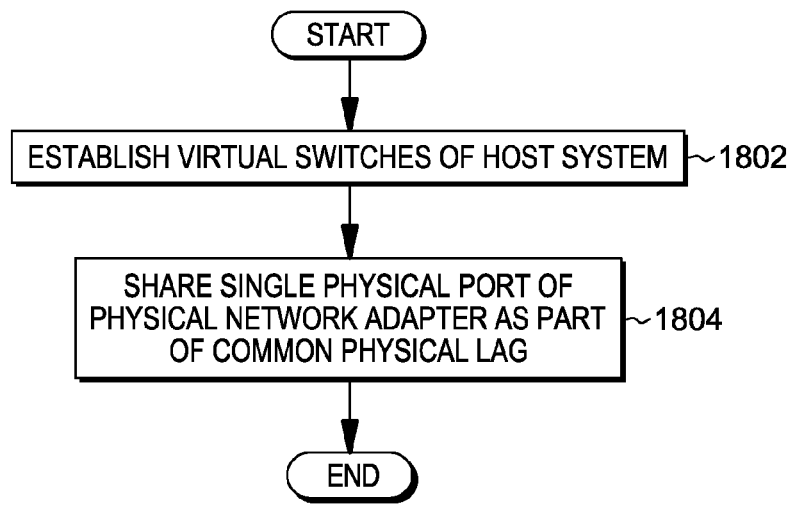
FIG. 18 depicts an example process for configuring and using a link aggregation group in a computing environment, in accordance with aspects described herein.

Described herein are example processes for configuring and using a link aggregation group in a computing environment. FIG. 18 provides an example such process. The process begins by establishing virtual switches of a host system (1802). The virtual switches may be established by, for instance, processor(s) of a host system, such as a central electronics complex. Each virtual switch of the virtual switches may include a respective virtual switch port that is grouped within a shared port group of virtual switch ports. The virtual switch ports of the shared port group may be in communication with a common physical network adapter of the host system. After the virtual switches are established, the virtual switch ports of the shared port group may share a single physical port of the physical network adapter as part of a common physical link aggregation group (1804).

The virtual switches may be dispersed within multiple logical partitions of the host system, for instance. LAG virtualization components, such as an IVL, may be provided within the multiple logical partitions, and the LAG virtualization components of the multiple logical partitions may communicate with each other to facilitate administration LAG-related protocols, for instance link aggregation control protocol (LACP) and LAG marker protocol of the physical LAG. This administration may be facilitated based on shared port group configuration information, which may be available to all virtual switch ports of the shared port group, and further based on virtual switch network connection status information from the physical network adapter.

The physical LAG may be deployed, at least in part, by a virtual switch port of the shared port group, by establishing a network connection to the physical network adapter and initiating transitioning of the physical network adapter into a port group membership control mode in which the shared port group is registered with the physical network adapter for participation within the physical LAG.

A virtual switch port of the shared port group may serve as an active LAG port controller of the single physical port. The active LAG port controller may perform link aggregation control protocol (LACP) management and LAG marker management for the physical LAG on behalf of the shared port group. One or more (or all) other virtual switch ports of the shared port group may serve as standby LAG port controllers for taking over as the active LAG port controller if requested.

Marker management, for instance LAG marker management performed by the active LAG port controller, may include coordinating, by the active LAG port controller in response to receipt of a LAG marker protocol data unit (PDU) communication from the physical network adapter, LAG marker PDU responses sent in response to the LAG marker PDU communication. The LAG marker PDU responses may be sent from the standby LAG port controller(s) of the shared port group, and the standby LAG port controller(s) may provide the LAG marker PDU response(s) to the active LAG port controller. The active LAG port controller may await receipt of a LAG marker PDU response from each standby LAG port controller of the standby LAG port controller(s) of the shared port group. Based on the active LAG port controller receiving a LAG marker PDU response from each standby LAG port controller of the standby LAG port controller(s) of the shared port group, the active LAG port controller may generate and send a LAG marker PDU response to the physical network adapter responding to the LAG marker PDU communication.

The active LAG port controller and the standby LAG port controller(s) may concurrently send and receive data through the single physical port in communicating data of the physical LAG.

Each standby LAG port controller of the standby LAG port controller(s) of the shared port group may receive LACP protocol transmissions from the physical network adapter or from the active LAG port controller and maintain at least some information of the LACP protocol transmissions to facilitate taking over as the active LAG port controller. Based on an indication from the physical network adapter, a standby LAG port controller of the standby LAG port controller(s) may assume responsibility as active LAG port controller for the shared port group, in which the standby LAG port controller becomes the active LAG port controller for the group (i.e. takes over for the current active LAG port controller). Performance of LACP management and LAG marker management for the physical LAG on behalf of the shared port group may transition to the standby LAG port controller that assumes responsibility as the active LAG port controller. Further, the (now) active LAG port controller (the standby LAG port controller that takes over as active LAG port controller) may present to a partner switch to which the physical network adapter is connected a same port identifier as that presented by a previous active LAG port controller (for instance the LAG port controller that was the active LAG port controller for the shared port group just prior to the standby LAG port controller taking over as active LAG port controller), to facilitate transitioning of the LACP management and LAG marker management to the active LAG port controller transparent to the partner switch.

The shared port group may include a first shared port group and the physical network adapter may include a first physical network adapter of the host system. In these situations, a second shared port group may be established that includes other virtual switch ports of the virtual switches. The other virtual switch ports of the second shared port group may be different from the virtual switch ports of the first shared port group, and each virtual switch port of the second shared port group may share a single physical port of a second physical network adapter different from the first physical network adapter, where both the first physical network adapter and the second physical network adapter are part of the common physical LAG.

Figure 19:
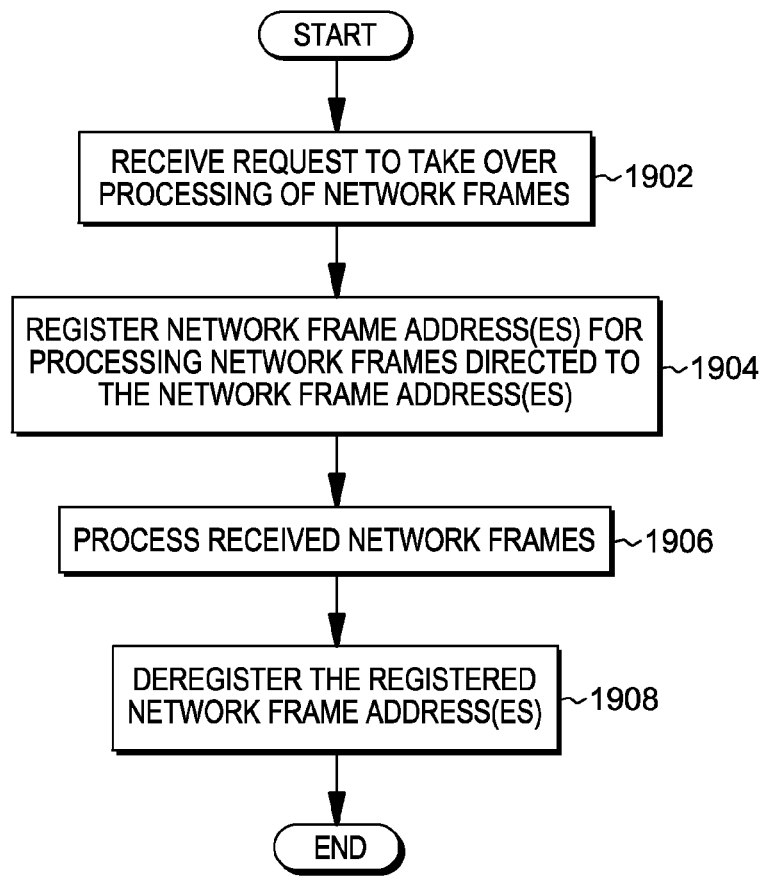
FIG. 19 depicts an example process for handling network frames in a computing environment, in accordance with aspects described herein.

Further described herein are example processes for handling network frames in a computing environment. An example such process is described with reference to FIG. 19. The process begins by receiving a request to take over processing of network frames (1902). The request may be received from a physical network adapter of a computing environment by a first component of the computing environment. The request may be, for instance, a request that the first component take over processing of network frames directed to network frame address(es) associated with a second component of the computing environment. The first component may register the network frame address(es) for processing of network frames directed to the network frame address(es) (1904). Based on the first component receiving from the physical network adapter a network frame directed to a network frame address of the network frame address(es) associated with the second component, the first component may process the received network frame (1906). The processing may include providing the network frame to the second component via an inter-component link between the first component and the second component.

In some examples, the first component includes a first virtual switch and the second component includes a second virtual switch different from the first virtual switch. The first virtual switch and the second virtual switch may share a single physical port of the physical network adapter as part of a common physical link aggregation group. The request may be received by the first virtual switch based on a failure of a network connection between the second virtual switch and the physical network adapter. Processing by the first virtual switch may provide the received network frame to the second virtual switch transparent to a partner switch to which the physical network adapter is connected, the partner switch being a partner switch of a link aggregation group.

The one or more network frame addresses may include media access control (MAC) address(es). In these situations, the registering may include adding the MAC address(es) to a network hash table of the first component and indicating the one or more MAC addresses as being take-over MAC addresses, in which a take-over MAC address indicates that network frames received by the first component are to be directed to another component of the computing environment.

The processing of the received network frame may further include determining whether the network frame address to which the received network frame is directed is registered in a network hash table of the first component and indicated as being a take-over network frame address indicating that the network frame is to be directed to another component of the computing environment. Based on determining that the network frame address is registered in the network hash table and indicated as a take-over network frame address, the providing of the network frame to the second component may be performed.

The first component may be associated with a first hypervisor of a host system of the computing environment and the second component may be associated with a second hypervisor of the host system. In these situations, the inter-component link may include a communication channel between the first hypervisor and the second hypervisor, and the network frame may be provided from the first component to the second component through the first hypervisor and the second hypervisor across the communication channel.

The first component may receive from the physical network adapter a request to cease processing of network frames directed to the one or more network frame addresses associated with the second component. This may be received based on, for instance, a failed network connection between the second component and the physical network adapter returning to a working status. Accordingly, and returning to FIG. 19, based on the first component receiving from the physical network adapter a request to cease processing of network frames directed to the one or more network frame addresses associated with the second component, each network frame address of the network frame address(es) may be deregistered from a network hash table of the first component (1908), and the process may end.

Figure 20A:
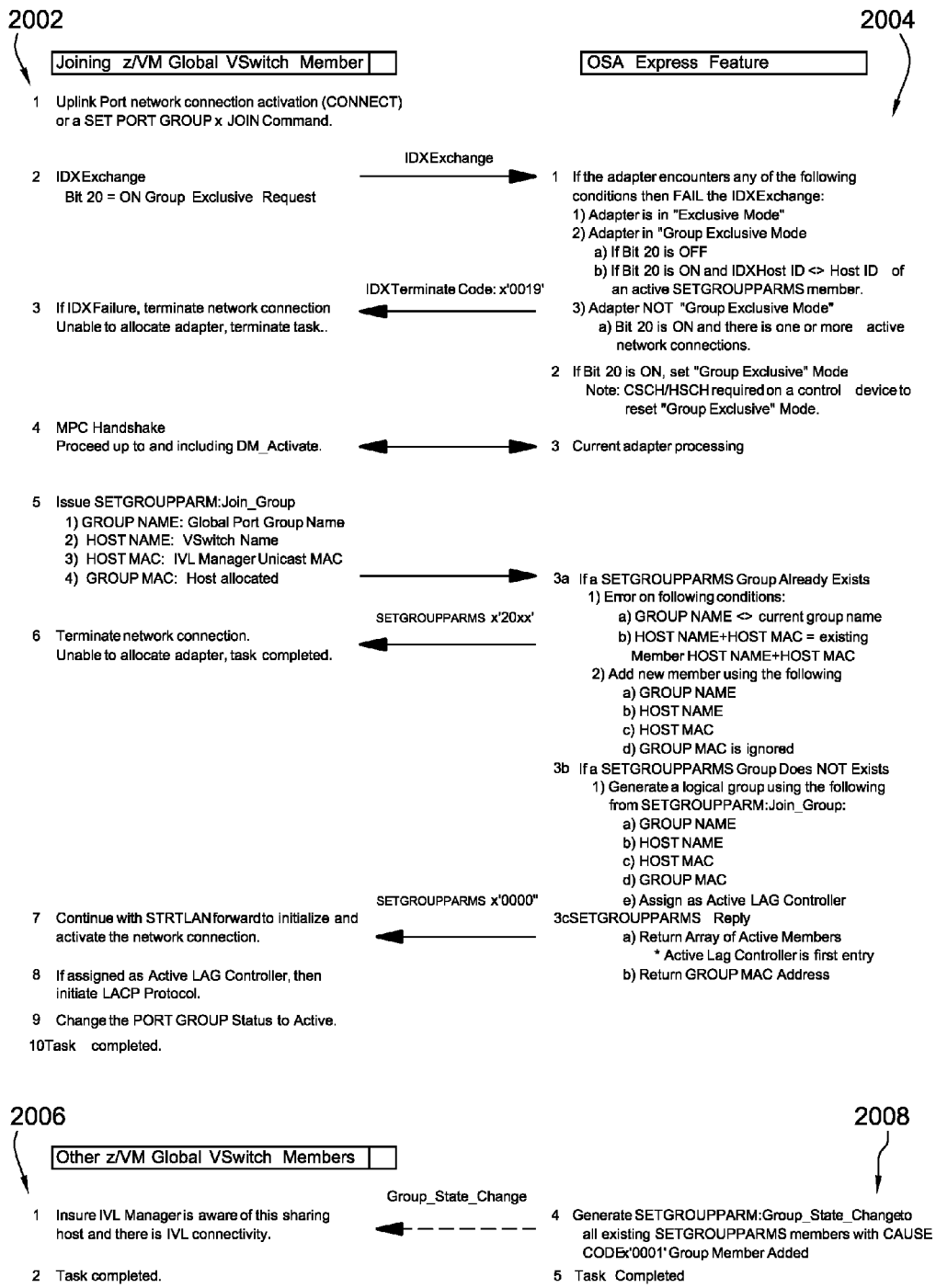
FIG. 20A-20D provide further details of Multi-VSwitch LAG configuration functions, in accordance with aspects described herein.

FIGS. 20A-20D provide further details of Multi-VSwitch LAG configuration functions, in accordance with aspects described herein. FIG. 20A depicts example operational flow and data exchange between a joining z/VM Global VSwitch member joining a virtual LAG and an OSA Express feature. FIG. 20A shows the communications flow used to establish a Multi-VSwitch LAG Port Group between a zVM VSwitch and an OSA adapter. The flow is initiated by the zVM VSwitch, and the OSA adapter verifies the zVM VSwitch attributes. 2002 indicates operational flow of the joining z/VM Global VSwitch member, while 2004 indicates operational flow of the OSA Express feature with respect to the joining Global VSwitch member. FIG. 20A further depicts example operational flow and data exchange between the other z/VM Global VSwitch members of the virtual LAG and the OSA Express feature. 2006 indicates operational flow of each of the other z/VM Global VSwitch members, while 2008 indicates operational flow of the OSA Express feature with respect to these other Global VSwitch members.

Figure 20B:
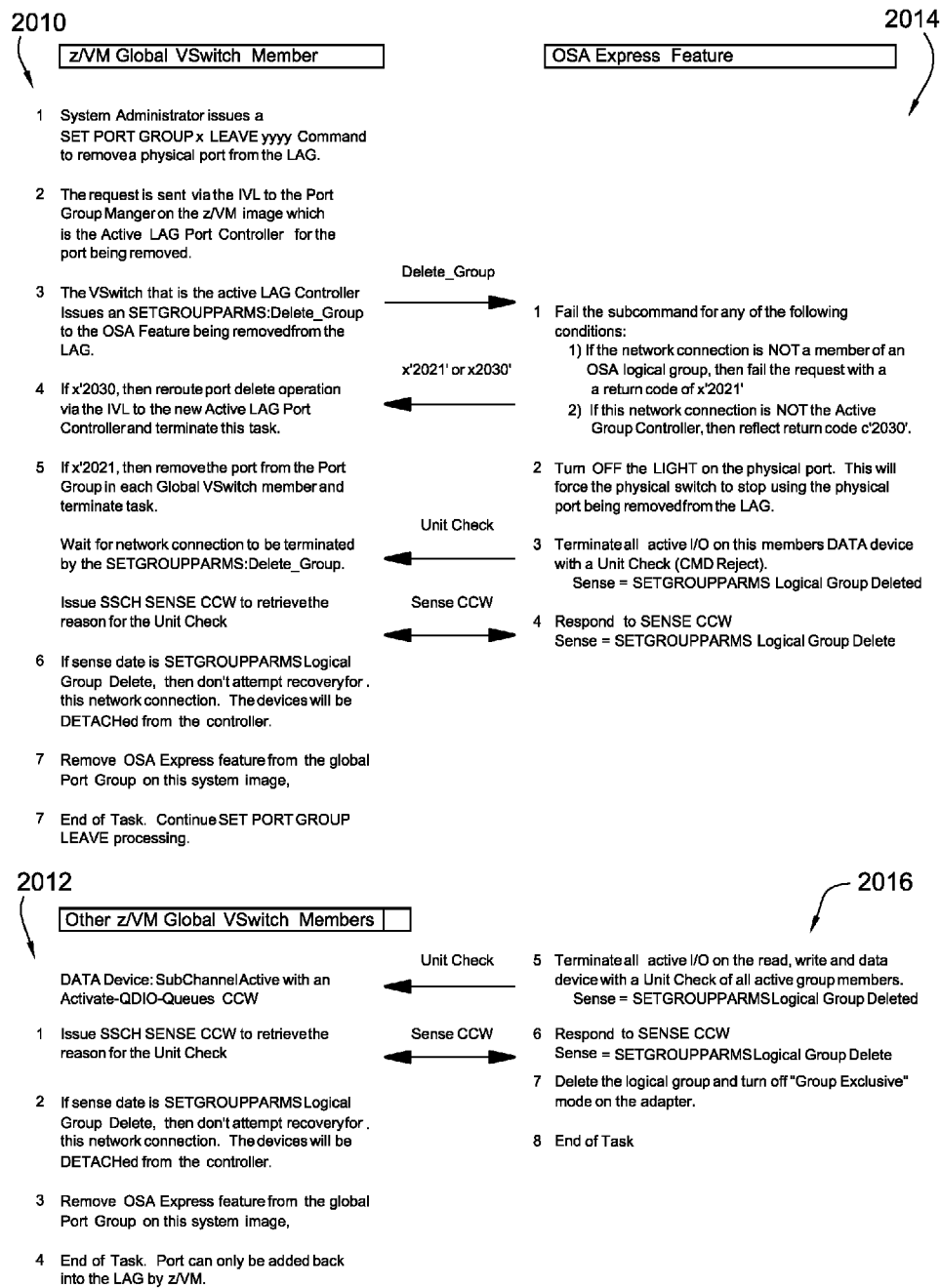

FIG. 20B depicts example operational flow and data exchange between a leaving z/VM Global VSwitch member leaving a virtual LAG and an OSA Express feature. 2010 indicates operational flow of the leaving z/VM Global VSwitch member, while 2014 indicates operational flow of the OSA Express feature with respect to the leaving member. FIG. 20B further depicts example operational flow and data exchange between the other z/VM Global VSwitch members of the virtual LAG and the OSA Express feature. 2012 indicates operational flow of each of the other z/VM Global VSwitch members, while 2016 indicates operational flow of the OSA Express feature with respect to these other members.

Figure 20C:
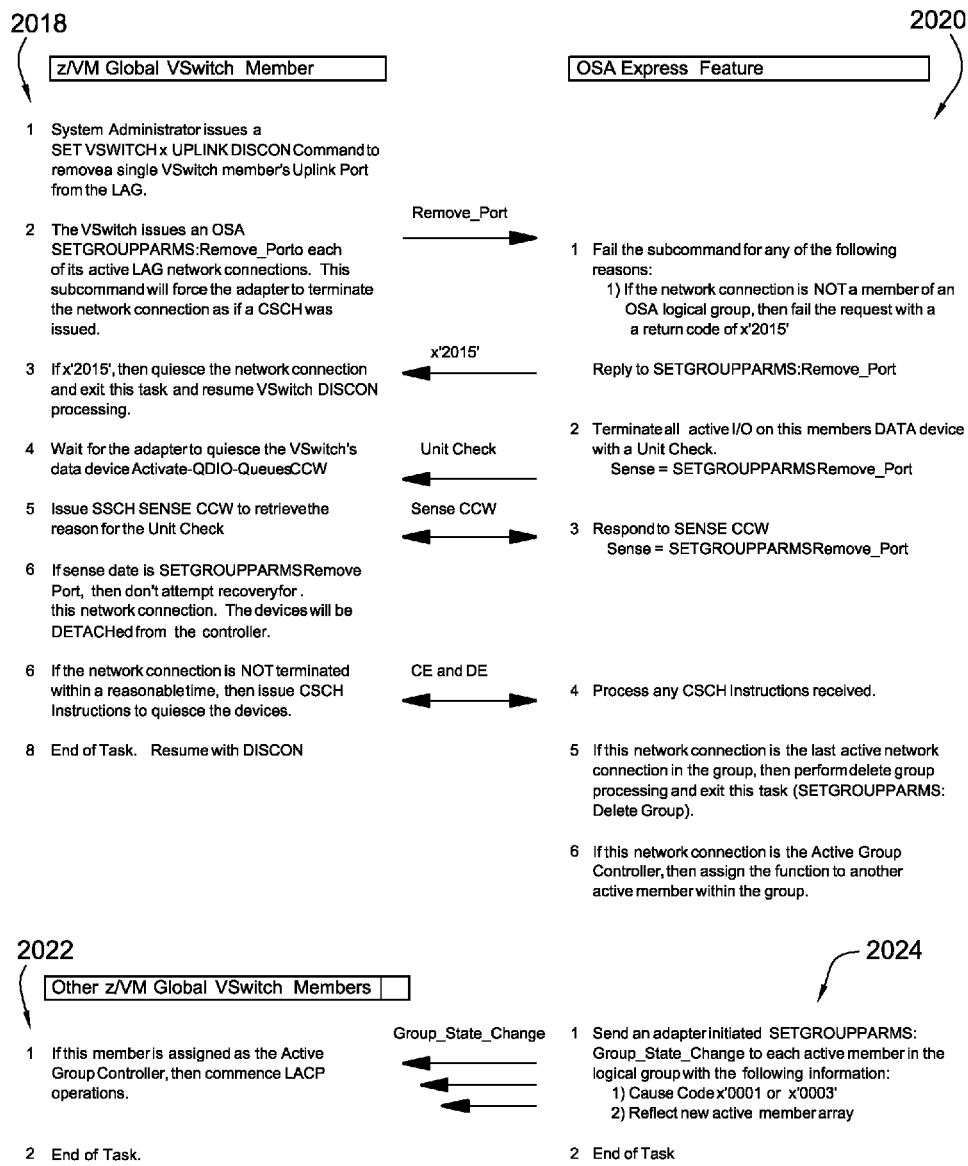

FIG. 20C depicts example operational flow and data exchange between a z/VM Global VSwitch member and the Virtual LAG Controller in the OSA Express feature to disconnect a port on the VSwitch from the LAG. This operation removes all uplink ports (network connections) associated with associated Global VSwitch. 2018 indicates operational flow of the z/VM Global VSwitch member having the disconnecting uplink port, while 2020 indicates operational flow of the OSA Express feature with respect to that Global VSwitch member. FIG. 20C further depicts example operational flow and data exchange between the other z/VM Global VSwitch members of the virtual LAG and the OSA Express feature. 2022 indicates operational flow of each of the other z/VM Global VSwitch members, while 2024 indicates operational flow of the OSA Express feature with respect to these Global VSwitch members.

Figure 20D:
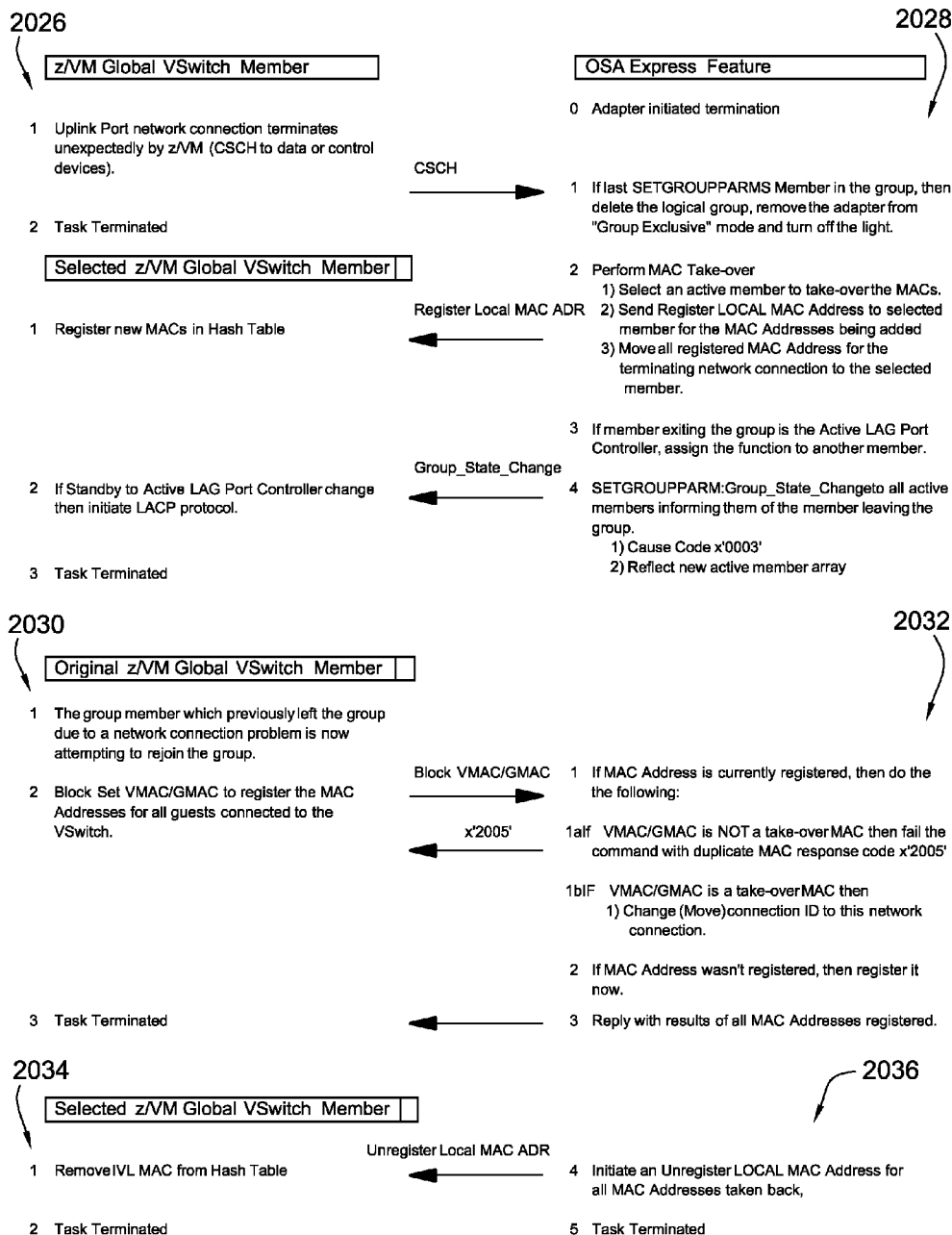

FIG. 20D depicts example operational flow and data exchange between a Virtual LAG Controller in the OSA express feature and a z/VM Global VSwitch for a MAC address take-over and a MAC address bake-back scenario. 2026 indicates operational flow of the z/VM Global VSwitch member having the failing/failed network connection and the z/VM Global VSwitch member selected for take-over, while 2028 indicates operational flow of the OSA Express feature and data exchange with respect to these Global VSwitch members. FIG. 20D further depicts example operational flow and data exchange of these Global VSwitch members and the OSA Express feature after the Global VSwitch member having the failing/failed network connection attempts to rejoin the group. 2030 indicates operational flow of the Global VSwitch member attempting to rejoin the group, while 2032 indicates operational flow of the OSA Express feature with respect to this Global VSwitch member. 2034 indicates operational flow of the Global VSwitch member selected for take-over, while 2036 indicates operational flow of the OSA Express feature with respect to that Global VSwitch member.

Figure 21:
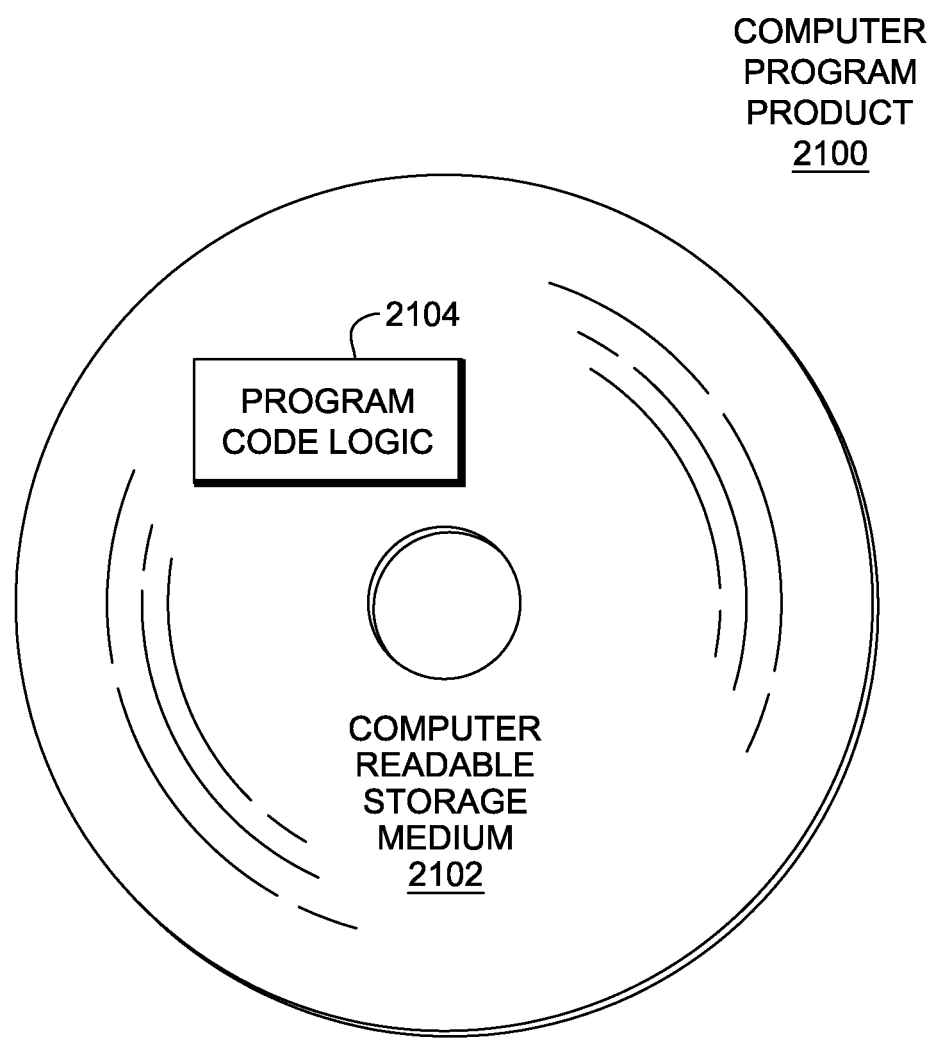
FIG. 21 depicts one embodiment of a computer program product.

The present invention may be a system, a method, and/or a computer program product. The computer program product may include a computer readable storage medium (or media) having computer readable program instructions thereon for causing a processor to carry out aspects of the present invention. Referring to FIG. 21, in one example, a computer program product 2100 includes, for instance, one or more non-transitory computer readable storage media 2102 to store computer readable program code means, logic and/or instructions 2104 thereon to provide and facilitate one or more embodiments.

A computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Yet further, other limits may be provided and/or used in differing ways. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

Figure 22:
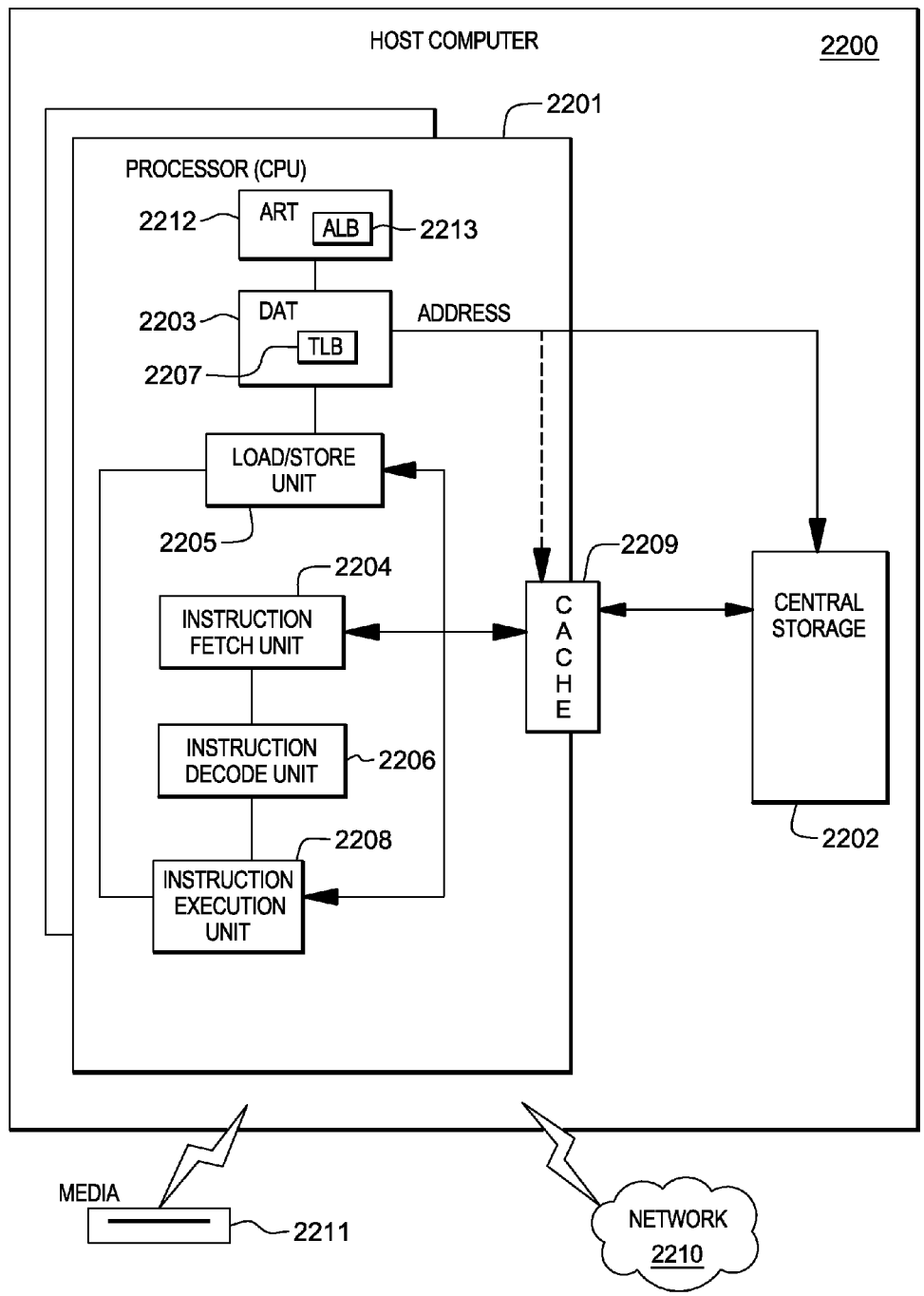
FIG. 22 depicts one embodiment of a host computer system.

Referring to FIG. 22, representative components of a Host Computer system 2200 to implement one or more embodiments are portrayed. The representative host computer 2200 comprises one or more CPUs 2201 in communication with computer memory (i.e., central storage) 2202, as well as I/O interfaces to storage media devices 2211 and networks 2210 for communicating with other computers or SANs and the like. The CPU 2201 is compliant with an architecture having an architected instruction set and architected functionality. The CPU 2201 may have access register translation (ART) 2212, which includes an ART lookaside buffer (ALB) 2213, for selecting an address space to be used by dynamic address translation (DAT) 2203 for transforming program addresses (virtual addresses) into real addresses of memory. A DAT typically includes a translation lookaside buffer (TLB) 2207 for caching translations so that later accesses to the block of computer memory 2202 do not require the delay of address translation. Typically, a cache 2209 is employed between computer memory 2202 and the processor 2201. The cache 2209 may be hierarchical having a large cache available to more than one CPU and smaller, faster (lower level) caches between the large cache and each CPU. In some implementations, the lower level caches are split to provide separate low level caches for instruction fetching and data accesses.

In one embodiment, an instruction is fetched from memory 2202 by an instruction fetch unit 2204 via a cache 2209. The instruction is decoded in an instruction decode unit 2206 and dispatched (with other instructions in some embodiments) to instruction execution unit or units 2208. Typically several execution units 2208 are employed, for example an arithmetic execution unit, a floating point execution unit and a branch instruction execution unit. The instruction is executed by the execution unit, accessing operands from instruction specified registers or memory as needed. If an operand is to be accessed (loaded or stored) from memory 2202, a load/store unit 2205 typically handles the access under control of the instruction being executed. Instructions may be executed in hardware circuits or in internal microcode (firmware) or by a combination of both.

As noted, a computer system includes information in local (or main) storage, as well as addressing, protection, and reference and change recording. Some aspects of addressing include the format of addresses, the concept of address spaces, the various types of addresses, and the manner in which one type of address is translated to another type of address. Some of main storage includes permanently assigned storage locations. Main storage provides the system with directly addressable fast-access storage of data. Both data and programs are to be loaded into main storage (from input devices) before they can be processed.

Main storage may include one or more smaller, faster-access buffer storages, sometimes called caches. A cache is typically physically associated with a CPU or an I/O processor. The effects, except on performance, of the physical construction and use of distinct storage media are generally not observable by the program.

Separate caches may be maintained for instructions and for data operands. Information within a cache is maintained in contiguous bytes on an integral boundary called a cache block or cache line (or line, for short).

Storage is viewed as a long horizontal string of bits. For most operations, accesses to storage proceed in a left-to-right sequence. The string of bits is subdivided into units of eight bits. An eight-bit unit is called a byte, which is the basic building block of all information formats. Each byte location in storage is identified by a unique nonnegative integer, which is the address of that byte location or, simply, the byte address. Adjacent byte locations have consecutive addresses, starting with 0 on the left and proceeding in a left-to-right sequence. Addresses are unsigned binary integers and are 24, 31, or 64 bits.

Information is transmitted between storage and a CPU or a channel subsystem one byte, or a group of bytes, at a time. Unless otherwise specified, in, for instance, the z/Architecture, a group of bytes in storage is addressed by the leftmost byte of the group. The number of bytes in the group is either implied or explicitly specified by the operation to be performed. When used in a CPU operation, a group of bytes is called a field. Within each group of bytes, in, for instance, the z/Architecture, bits are numbered in a left-to-right sequence. In the z/Architecture, the leftmost bits are sometimes referred to as the "high-order" bits and the rightmost bits as the "low-order" bits. Bit numbers are not storage addresses, however. Only bytes can be addressed. To operate on individual bits of a byte in storage, the entire byte is accessed. The bits in a byte are numbered 0 through 7, from left to right (in, e.g., the z/Architecture). The bits in an address may be numbered 8-31 or 40-63 for 24-bit addresses, or 1-31 or 33-63 for 31-bit addresses; they are numbered 0-63 for 64-bit addresses. In one example, bits 8-31 and 1-31 apply to addresses that are in a location (e.g., register) that is 32 bits wide, whereas bits 40-63 and 33-63 apply to addresses that are in a 64-bit wide location. Within any other fixed-length format of multiple bytes, the bits making up the format are consecutively numbered starting from 0. For purposes of error detection, and preferably for correction, one or more check bits may be transmitted with each byte or with a group of bytes. Such check bits are generated automatically by the machine and cannot be directly controlled by the program. Storage capacities are expressed in number of bytes. When the length of a storage-operand field is implied by the operation code of an instruction, the field is said to have a fixed length, which can be one, two, four, eight, or sixteen bytes. Larger fields may be implied for some instructions. When the length of a storage-operand field is not implied but is stated explicitly, the field is said to have a variable length. Variable-length operands can vary in length by increments of one byte (or with some instructions, in multiples of two bytes or other multiples). When information is placed in storage, the contents of only those byte locations are replaced that are included in the designated field, even though the width of the physical path to storage may be greater than the length of the field being stored.

Certain units of information are to be on an integral boundary in storage. A boundary is called integral for a unit of information when its storage address is a multiple of the length of the unit in bytes. Special names are given to fields of 2, 4, 8, 16, and 32 bytes on an integral boundary. A halfword is a group of two consecutive bytes on a two-byte boundary and is the basic building block of instructions. A word is a group of four consecutive bytes on a four-byte boundary. A doubleword is a group of eight consecutive bytes on an eight-byte boundary. A quadword is a group of 16 consecutive bytes on a 16-byte boundary. An octoword is a group of 32 consecutive bytes on a 32-byte boundary. When storage addresses designate halfwords, words, doublewords, quadwords, and octowords, the binary representation of the address contains one, two, three, four, or five rightmost zero bits, respectively. Instructions are to be on two-byte integral boundaries. The storage operands of most instructions do not have boundary-alignment requirements.

On devices that implement separate caches for instructions and data operands, a significant delay may be experienced if the program stores into a cache line from which instructions are subsequently fetched, regardless of whether the store alters the instructions that are subsequently fetched.

In one example, the embodiment may be practiced by software (sometimes referred to licensed internal code, firmware, micro-code, milli-code, pico-code and the like, any of which would be consistent with one or more embodiments). Referring to FIG. 22, software program code which embodies one or more aspects may be accessed by processor 2201 of the host system 2200 from long-term storage media devices 2211, such as a CD-ROM drive, tape drive or hard drive. The software program code may be embodied on any of a variety of known media for use with a data processing system, such as a diskette, hard drive, or CD-ROM. The code may be distributed on such media, or may be distributed to users from computer memory 2202 or storage of one computer system over a network 2210 to other computer systems for use by users of such other systems.

The software program code includes an operating system which controls the function and interaction of the various computer components and one or more application programs. Program code is normally paged from storage media device 2211 to the relatively higher-speed computer storage 2202 where it is available for processing by processor 2201. The techniques and methods for embodying software program code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

Figure 23:
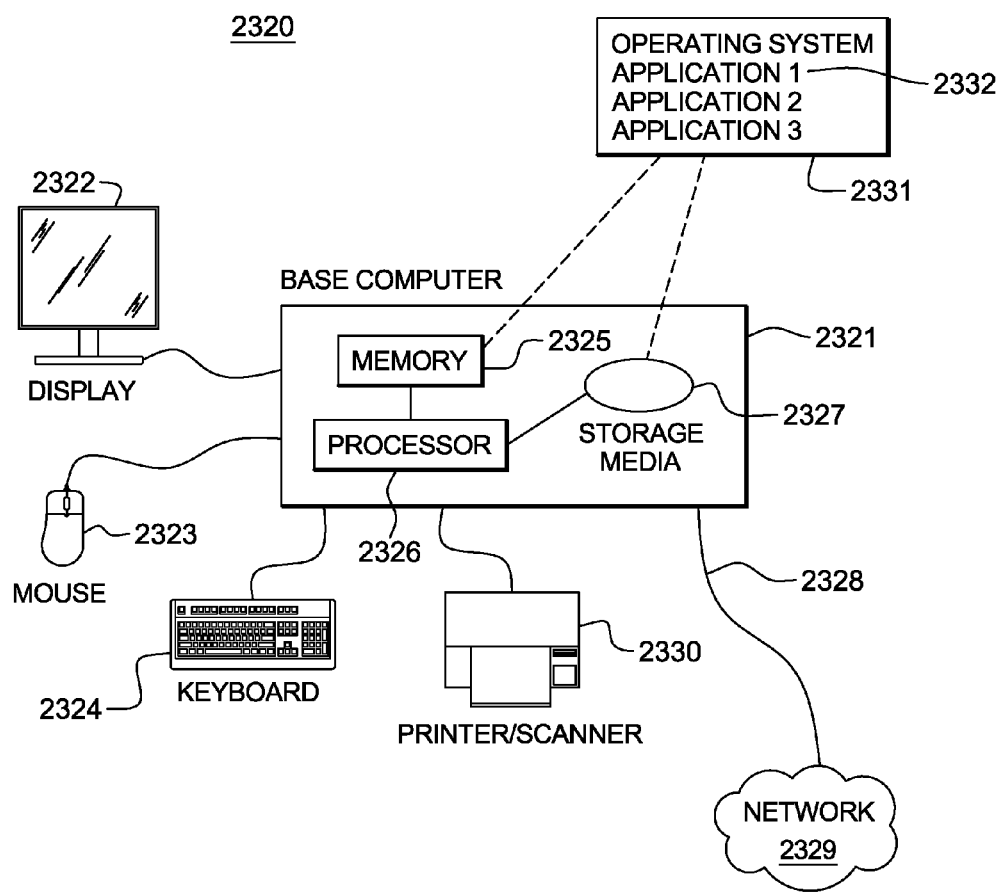
FIG. 23 depicts a further example of a computer system.

FIG. 23 illustrates a representative workstation or server hardware system in which one or more embodiments may be practiced. The system 2320 of FIG. 23 comprises a representative base computer system 2321, such as a personal computer, a workstation or a server, including optional peripheral devices. The base computer system 2321 includes one or more processors 2326 and a bus employed to connect and enable communication between the processor(s) 2326 and the other components of the system 2321 in accordance with known techniques. The bus connects the processor 2326 to memory 2325 and long-term storage 2327 which can include a hard drive (including any of magnetic media, CD, DVD and Flash Memory for example) or a tape drive for example. The system 2321 might also include a user interface adapter, which connects the microprocessor 2326 via the bus to one or more interface devices, such as a keyboard 2324, a mouse 2323, a printer/scanner 2330 and/or other interface devices, which can be any user interface device, such as a touch sensitive screen, digitized entry pad, etc. The bus also connects a display device 2322, such as an LCD screen or monitor, to the microprocessor 2326 via a display adapter.

The system 2321 may communicate with other computers or networks of computers by way of a network adapter capable of communicating 2328 with a network 2329. Example network adapters are communications channels, token ring, Ethernet or modems. Alternatively, the system 2321 may communicate using a wireless interface, such as a CDPD (cellular digital packet data) card. The system 2321 may be associated with such other computers in a Local Area Network (LAN) or a Wide Area Network (WAN), or the system 2321 can be a client in a client/server arrangement with another computer, etc. All of these configurations, as well as the appropriate communications hardware and software, are known in the art.

Figure 24:
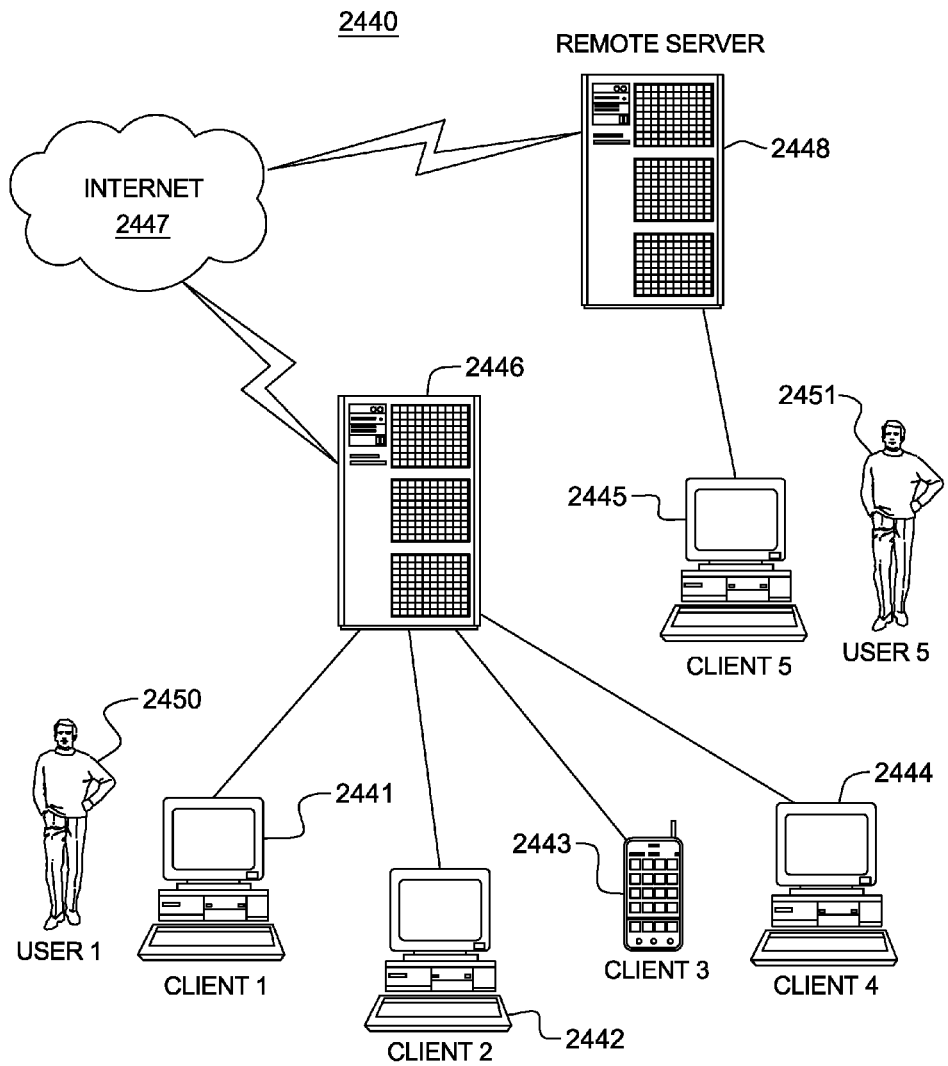
FIG. 24 depicts another example of a computer system comprising a computer network.

FIG. 24 illustrates a data processing network 2440 in which one or more embodiments may be practiced. The data processing network 2440 may include a plurality of individual networks, such as a wireless network and a wired network, each of which may include a plurality of individual workstations 2441, 2442, 2443, 2444. Additionally, as those skilled in the art will appreciate, one or more LANs may be included, where a LAN may comprise a plurality of intelligent workstations coupled to a host processor.

Still referring to FIG. 24, the networks may also include mainframe computers or servers, such as a gateway computer (client server 2446) or application server (remote server 2448 which may access a data repository and may also be accessed directly from a workstation 2445). A gateway computer 2446 serves as a point of entry into each individual network. A gateway is needed when connecting one networking protocol to another. The gateway 2446 may be preferably coupled to another network (the Internet 2447 for example) by means of a communications link. The gateway 2446 may also be directly coupled to one or more workstations 2441, 2442, 2443, 2444 using a communications link. The gateway computer may be implemented utilizing an IBM eServer System z server available from International Business Machines Corporation.

Referring concurrently to FIG. 23 and FIG. 24, software programming code 2331 which may embody one or more aspects may be accessed by the processor 2326 of the system 2320 from long-term storage media 2327, such as a CD-ROM drive or hard drive. The software programming code may be embodied on any of a variety of known media for use with a data processing system, such as a diskette, hard drive, or CD-ROM. The code may be distributed on such media, or may be distributed to users 2450, 2451 from the memory or storage of one computer system over a network to other computer systems for use by users of such other systems.

Alternatively, the programming code may be embodied in the memory 2325, and accessed by the processor 2326 using the processor bus. Such programming code includes an operating system which controls the function and interaction of the various computer components and one or more application programs 2332. Program code is normally paged from storage media 2227 to high-speed memory 23225 where it is available for processing by the processor 2326. The techniques and methods for embodying software programming code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

The cache that is most readily available to the processor (normally faster and smaller than other caches of the processor) is the lowest (L1 or level one) cache and main store (main memory) is the highest level cache (L3 if there are 3 levels). The lowest level cache is often divided into an instruction cache (I-Cache) holding machine instructions to be executed and a data cache (D-Cache) holding data operands.

Figure 25:
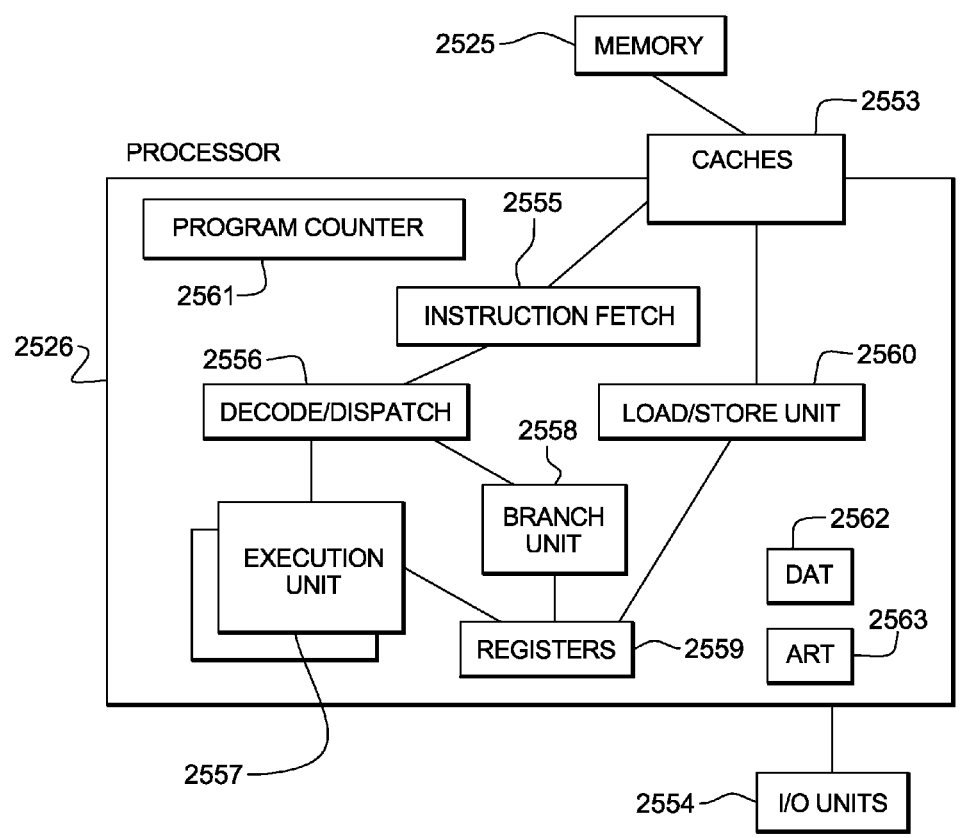
FIG. 25 depicts one embodiment of various elements of a computer system.

Referring to FIG. 25, an exemplary processor embodiment is depicted for processor 2526. Typically one or more levels of cache 2553 are employed to buffer memory blocks in order to improve processor performance. The cache 2553 is a high speed buffer holding cache lines of memory data that are likely to be used. Typical cache lines are 64, 128 or 256 bytes of memory data. Separate caches are often employed for caching instructions than for caching data. Cache coherence (synchronization of copies of lines in memory and the caches) is often provided by various "snoop" algorithms well known in the art. Main memory storage 2525 of a processor system is often referred to as a cache. In a processor system having 4 levels of cache 2553, main storage 2525 is sometimes referred to as the level 5 (L5) cache since it is typically faster and only holds a portion of the non-volatile storage (DASD, tape etc) that is available to a computer system. Main storage 2525 "caches" pages of data paged in and out of the main storage 2525 by the operating system.

A program counter (instruction counter) 2561 keeps track of the address of the current instruction to be executed. A program counter in a z/Architecture processor is 64 bits and can be truncated to 31 or 24 bits to support prior addressing limits. A program counter is typically embodied in a PSW (program status word) of a computer such that it persists during context switching. Thus, a program in progress, having a program counter value, may be interrupted by, for example, the operating system (context switch from the program environment to the operating system environment). The PSW of the program maintains the program counter value while the program is not active, and the program counter (in the PSW) of the operating system is used while the operating system is executing. Typically, the program counter is incremented by an amount equal to the number of bytes of the current instruction. RISC (Reduced Instruction Set Computing) instructions are typically fixed length while CISC (Complex Instruction Set Computing) instructions are typically variable length. Instructions of the IBM z/Architecture are CISC instructions having a length of 2, 4 or 6 bytes. The Program counter 2561 is modified by either a context switch operation or a branch taken operation of a branch instruction for example. In a context switch operation, the current program counter value is saved in the program status word along with other state information about the program being executed (such as condition codes), and a new program counter value is loaded pointing to an instruction of a new program module to be executed. A branch taken operation is performed in order to permit the program to make decisions or loop within the program by loading the result of the branch instruction into the program counter 5061.

Typically an instruction fetch unit 2555 is employed to fetch instructions on behalf of the processor 2526. The fetch unit either fetches "next sequential instructions", target instructions of branch taken instructions, or first instructions of a program following a context switch. Modern Instruction fetch units often employ prefetch techniques to speculatively prefetch instructions based on the likelihood that the prefetched instructions might be used. For example, a fetch unit may fetch 16 bytes of instruction that includes the next sequential instruction and additional bytes of further sequential instructions.

The fetched instructions are then executed by the processor 2526. In an embodiment, the fetched instruction(s) are passed to a dispatch unit 2556 of the fetch unit. The dispatch unit decodes the instruction(s) and forwards information about the decoded instruction(s) to appropriate units 2557, 2558, 2560. An execution unit 2557 will typically receive information about decoded arithmetic instructions from the instruction fetch unit 2555 and will perform arithmetic operations on operands according to the opcode of the instruction. Operands are provided to the execution unit 2557 preferably either from memory 2525, architected registers 2559 or from an immediate field of the instruction being executed. Results of the execution, when stored, are stored either in memory 2525, registers 2559 or in other machine hardware (such as control registers, PSW registers and the like).

Virtual addresses are transformed into real addresses using dynamic address translation 2562 and, optionally, using access register translation 2563.

Figure 26A:
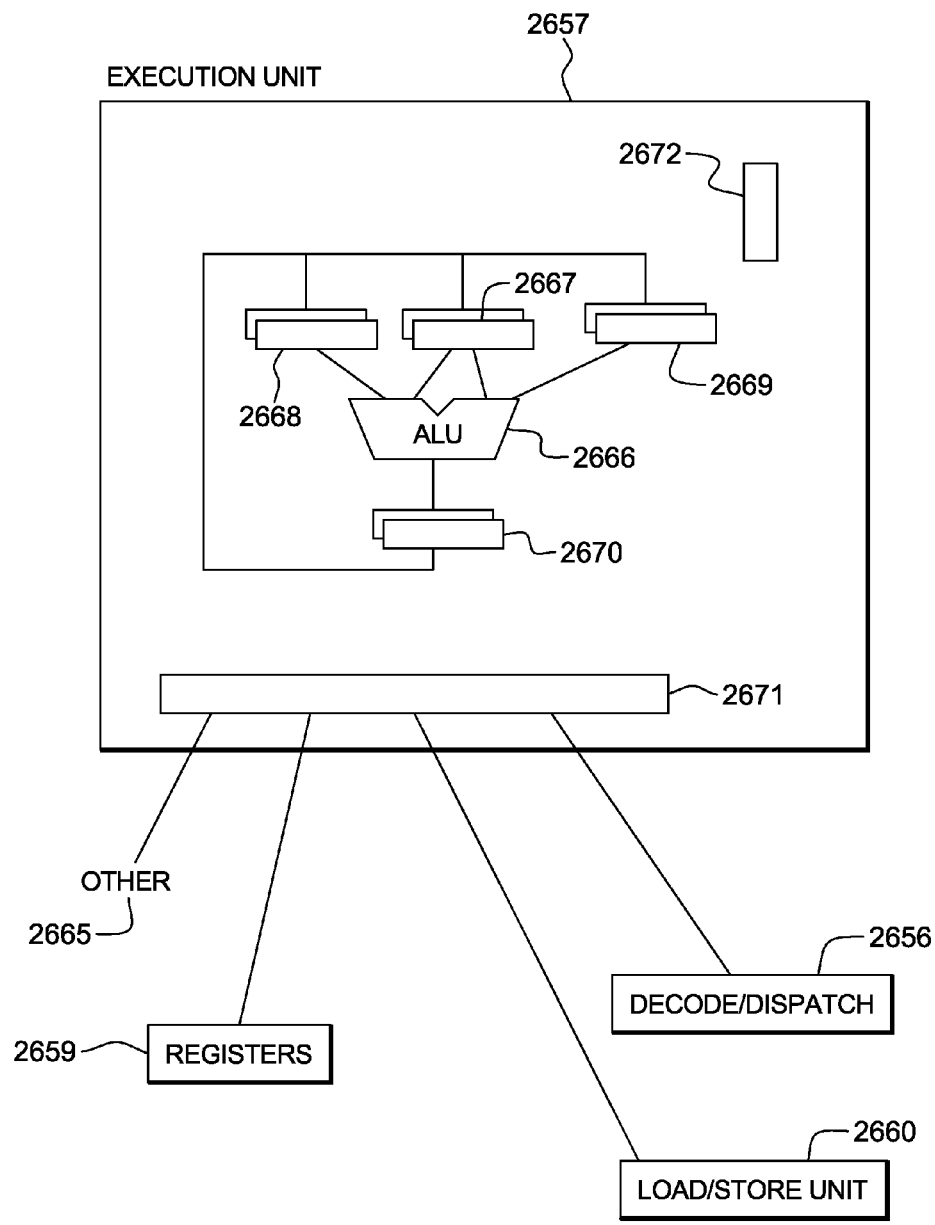
FIG. 26A depicts one embodiment of the execution unit of the computer system of FIG. 25.

A processor 2526 typically has one or more units 2557, 2558, 2560 for executing the function of the instruction. Referring to FIG. 26A, an execution unit 2657 may communicate 2671 with architected general registers 2659, a decode/dispatch unit 2656, a load store unit 2660, and other 2665 processor units by way of interfacing logic 2671. An execution unit 2657 may employ several register circuits 2667, 2668, 2669 to hold information that the arithmetic logic unit (ALU) 2666 will operate on. The ALU performs arithmetic operations such as add, subtract, multiply and divide as well as logical function such as and, or and exclusive-or (XOR), rotate and shift. Preferably the ALU supports specialized operations that are design dependent. Other circuits may provide other architected facilities 2672 including condition codes and recovery support logic for example. Typically the result of an ALU operation is held in an output register circuit 2670 which can forward the result to a variety of other processing functions. There are many arrangements of processor units, the present description is only intended to provide a representative understanding of one embodiment.

An ADD instruction for example would be executed in an execution unit 2657 having arithmetic and logical functionality while a floating point instruction for example would be executed in a floating point execution having specialized floating point capability. Preferably, an execution unit operates on operands identified by an instruction by performing an opcode defined function on the operands. For example, an ADD instruction may be executed by an execution unit 2657 on operands found in two registers 2659 identified by register fields of the instruction.

The execution unit 2657 performs the arithmetic addition on two operands and stores the result in a third operand where the third operand may be a third register or one of the two source registers. The execution unit preferably utilizes an Arithmetic Logic Unit (ALU) 2666 that is capable of performing a variety of logical functions such as Shift, Rotate, And, Or and XOR as well as a variety of algebraic functions including any of add, subtract, multiply, divide. Some ALUs 2666 are designed for scalar operations and some for floating point. Data may be Big Endian (where the least significant byte is at the highest byte address) or Little Endian (where the least significant byte is at the lowest byte address) depending on architecture. The IBM z/Architecture is Big Endian. Signed fields may be sign and magnitude, 1's complement or 2's complement depending on architecture. A 2's complement number is advantageous in that the ALU does not need to design a subtract capability since either a negative value or a positive value in 2's complement requires only an addition within the ALU. Numbers are commonly described in shorthand, where a 12 bit field defines an address of a 4,096 byte block and is commonly described as a 4 Kbyte (Kilo-byte) block, for example.

Figure 26B:
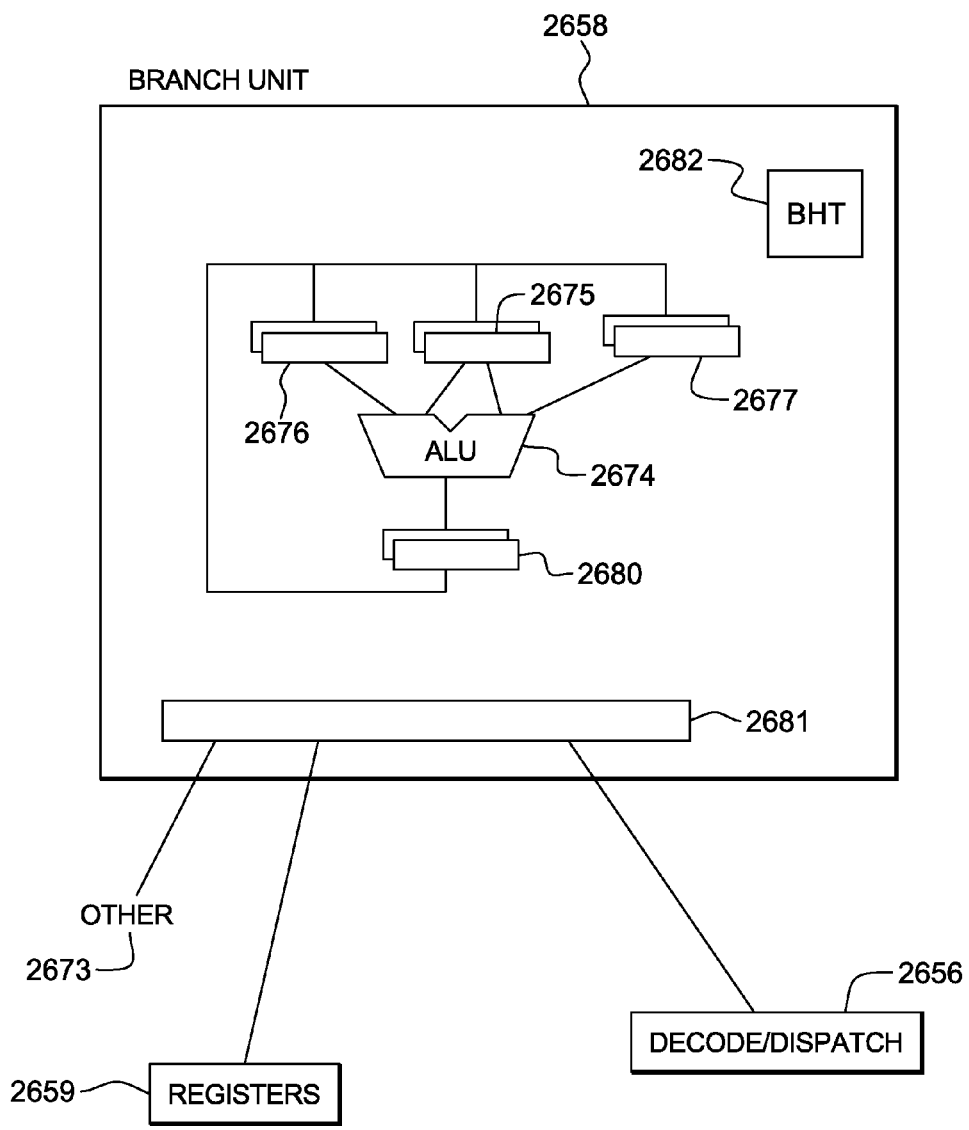
FIG. 26B depicts one embodiment of the branch unit of the computer system of FIG. 25.

Referring to FIG. 26B, branch instruction information for executing a branch instruction is typically sent to a branch unit 2658 which often employs a branch prediction algorithm such as a branch history table 5082 to predict the outcome of the branch before other conditional operations are complete. The target of the current branch instruction will be fetched and speculatively executed before the conditional operations are complete. When the conditional operations are completed the speculatively executed branch instructions are either completed or discarded based on the conditions of the conditional operation and the speculated outcome. A typical branch instruction may test condition codes and branch to a target address if the condition codes meet the branch requirement of the branch instruction, a target address may be calculated based on several numbers including ones found in register fields or an immediate field of the instruction for example. The branch unit 2658 may employ an ALU 2674 having a plurality of input register circuits 2675, 2676, 2677 and an output register circuit 2680. The branch unit 2658 may communicate 2681 with general registers 2659, decode dispatch unit 2656 or other circuits 2673, for example.

The execution of a group of instructions can be interrupted for a variety of reasons including a context switch initiated by an operating system, a program exception or error causing a context switch, an I/O interruption signal causing a context switch or multi-threading activity of a plurality of programs (in a multi-threaded environment), for example. Preferably a context switch action saves state information about a currently executing program and then loads state information about another program being invoked. State information may be saved in hardware registers or in memory for example.

State information preferably comprises a program counter value pointing to a next instruction to be executed, condition codes, memory translation information and architected register content. A context switch activity can be exercised by hardware circuits, application programs, operating system programs or firmware code (microcode, pico-code or licensed internal code (LIC)) alone or in combination.

A processor accesses operands according to instruction defined methods. The instruction may provide an immediate operand using the value of a portion of the instruction, may provide one or more register fields explicitly pointing to either general purpose registers or special purpose registers (floating point registers for example). The instruction may utilize implied registers identified by an opcode field as operands. The instruction may utilize memory locations for operands. A memory location of an operand may be provided by a register, an immediate field, or a combination of registers and immediate field as exemplified by the z/Architecture long displacement facility wherein the instruction defines a base register, an index register and an immediate field (displacement field) that are added together to provide the address of the operand in memory for example. Location herein typically implies a location in main memory (main storage) unless otherwise indicated.

Figure 26C:
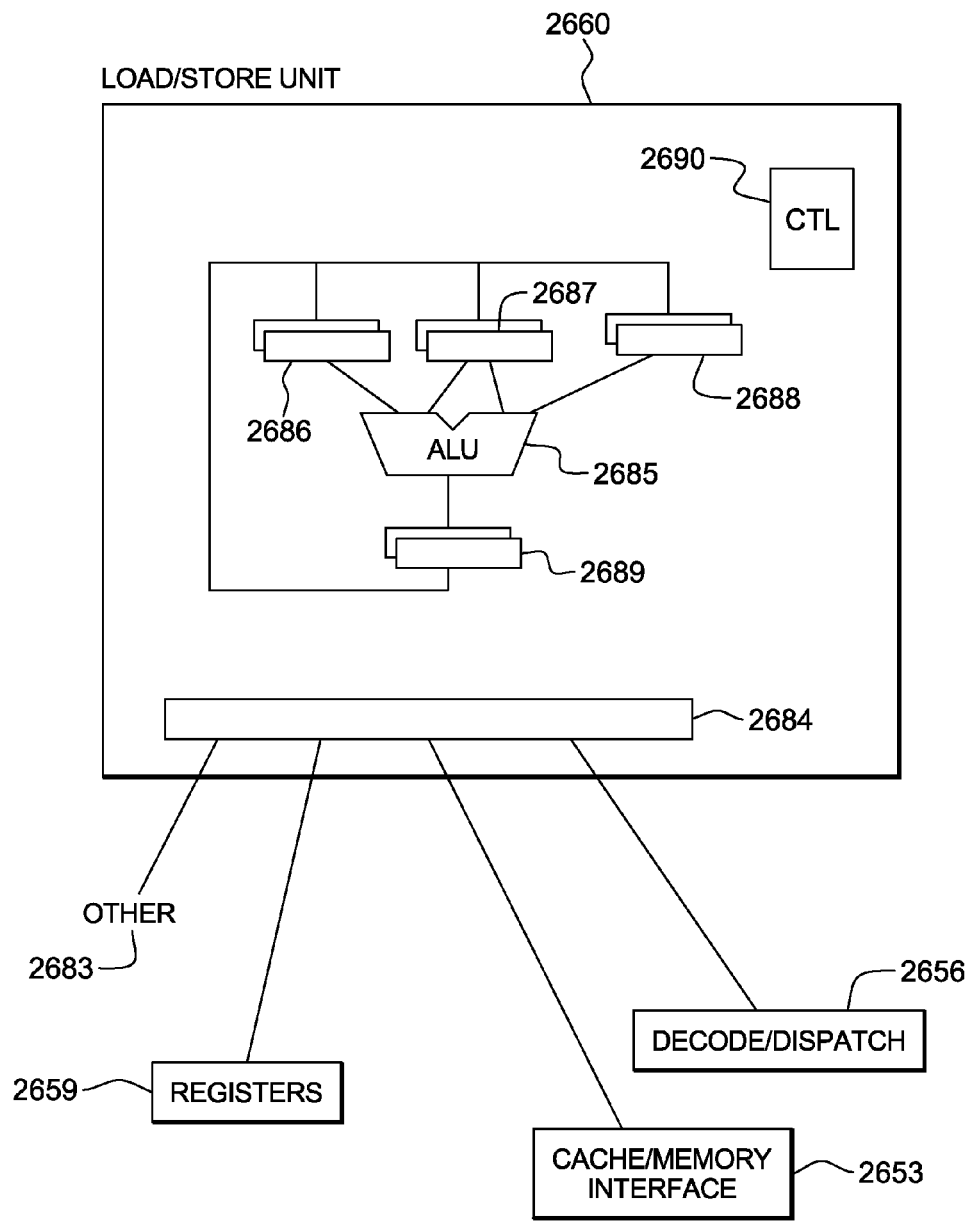
FIG. 26C depicts one embodiment of the load/store unit of the computer system of FIG. 25.

Referring to FIG. 26C, a processor accesses storage using a load/store unit 2660. The load/store unit 2660 may perform a load operation by obtaining the address of the target operand in memory 2653 and loading the operand in a register 2659 or another memory 2653 location, or may perform a store operation by obtaining the address of the target operand in memory 2653 and storing data obtained from a register 2659 or another memory 2653 location in the target operand location in memory 2653. The load/store unit 2660 may be speculative and may access memory in a sequence that is out-of-order relative to instruction sequence, however the load/store unit 2660 is to maintain the appearance to programs that instructions were executed in order. A load/store unit 2660 may communicate 2684 with general registers 2659, decode/dispatch unit 2656, cache/memory interface 2653 or other elements 2683 and comprises various register circuits 2686, 2687, 2688 and 2689, ALUs 2685 and control logic 2690 to calculate storage addresses and to provide pipeline sequencing to keep operations in-order. Some operations may be out of order but the load/store unit provides functionality to make the out of order operations to appear to the program as having been performed in order, as is well known in the art.

Preferably addresses that an application program "sees" are often referred to as virtual addresses. Virtual addresses are sometimes referred to as "logical addresses" and "effective addresses". These virtual addresses are virtual in that they are redirected to physical memory location by one of a variety of dynamic address translation (DAT) technologies including, but not limited to, simply prefixing a virtual address with an offset value, translating the virtual address via one or more translation tables, the translation tables preferably comprising at least a segment table and a page table alone or in combination, preferably, the segment table having an entry pointing to the page table. In the z/Architecture, a hierarchy of translation is provided including a region first table, a region second table, a region third table, a segment table and an optional page table. The performance of the address translation is often improved by utilizing a translation lookaside buffer (TLB) which comprises entries mapping a virtual address to an associated physical memory location. The entries are created when the DAT translates a virtual address using the translation tables. Subsequent use of the virtual address can then utilize the entry of the fast TLB rather than the slow sequential translation table accesses. TLB content may be managed by a variety of replacement algorithms including LRU (Least Recently used).

In the case where the processor is a processor of a multi-processor system, each processor has responsibility to keep shared resources, such as I/O, caches, TLBs and memory, interlocked for coherency. Typically, "snoop" technologies will be utilized in maintaining cache coherency. In a snoop environment, each cache line may be marked as being in any one of a shared state, an exclusive state, a changed state, an invalid state and the like in order to facilitate sharing.

I/O units 2554 (FIG. 25) provide the processor with means for attaching to peripheral devices including tape, disc, printers, displays, and networks for example. I/O units are often presented to the computer program by software drivers. In mainframes, such as the System z from IBM®, channel adapters and open system adapters are I/O units of the mainframe that provide the communications between the operating system and peripheral devices.

Further, other types of computing environments can benefit from one or more aspects. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more embodiments, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

More particularly, in a mainframe, architected machine instructions are used by programmers, usually today "C" programmers, often by way of a compiler application. These instructions stored in the storage medium may be executed natively in a z/Architecture IBM® Server, or alternatively in machines executing other architectures. They can be emulated in the existing and in future IBM® mainframe servers and on other machines of IBM® (e.g., Power Systems servers and System×Servers). They can be executed in machines running Linux on a wide variety of machines using hardware manufactured by IBM®, Intel®, AMD, and others. Besides execution on that hardware under a z/Architecture, Linux can be used as well as machines which use emulation by Hercules, UMX, or FSI (Fundamental Software, Inc), where generally execution is in an emulation mode. In emulation mode, emulation software is executed by a native processor to emulate the architecture of an emulated processor.

The native processor typically executes emulation software comprising either firmware or a native operating system to perform emulation of the emulated processor. The emulation software is responsible for fetching and executing instructions of the emulated processor architecture. The emulation software maintains an emulated program counter to keep track of instruction boundaries. The emulation software may fetch one or more emulated machine instructions at a time and convert the one or more emulated machine instructions to a corresponding group of native machine instructions for execution by the native processor. These converted instructions may be cached such that a faster conversion can be accomplished. Notwithstanding, the emulation software is to maintain the architecture rules of the emulated processor architecture so as to assure operating systems and applications written for the emulated processor operate correctly. Furthermore, the emulation software is to provide resources identified by the emulated processor architecture including, but not limited to, control registers, general purpose registers, floating point registers, dynamic address translation function including segment tables and page tables for example, interrupt mechanisms, context switch mechanisms, Time of Day (TOD) clocks and architected interfaces to I/O subsystems such that an operating system or an application program designed to run on the emulated processor, can be run on the native processor having the emulation software.

A specific instruction being emulated is decoded, and a subroutine is called to perform the function of the individual instruction. An emulation software function emulating a function of an emulated processor is implemented, for example, in a "C" subroutine or driver, or some other method of providing a driver for the specific hardware as will be within the skill of those in the art after understanding the description of the preferred embodiment. Various software and hardware emulation patents including, but not limited to U.S. Pat. No. 5,551,013, entitled "Multiprocessor for Hardware Emulation", by Beausoleil et al.; and U.S. Pat. No. 6,009,261, entitled "Preprocessing of Stored Target Routines for Emulating Incompatible Instructions on a Target Processor", by Scalzi et al; and U.S. Pat. No. 5,574,873, entitled "Decoding Guest Instruction to Directly Access Emulation Routines that Emulate the Guest Instructions", by Davidian et al; and U.S. Pat. No. 6,308,255, entitled "Symmetrical Multiprocessing Bus and Chipset Used for Coprocessor Support Allowing Non-Native Code to Run in a System", by Gorishek et al; and U.S. Pat. No. 6,463,582, entitled "Dynamic Optimizing Object Code Translator for Architecture Emulation and Dynamic Optimizing Object Code Translation Method", by Lethin et al; and U.S. Pat. No. 5,790,825, entitled "Method for Emulating Guest Instructions on a Host Computer Through Dynamic Recompilation of Host Instructions", by Eric Traut, each of which is hereby incorporated by reference herein in its entirety; and many others, illustrate a variety of known ways to achieve emulation of an instruction format architected for a different machine for a target machine available to those skilled in the art.

Figure 27:
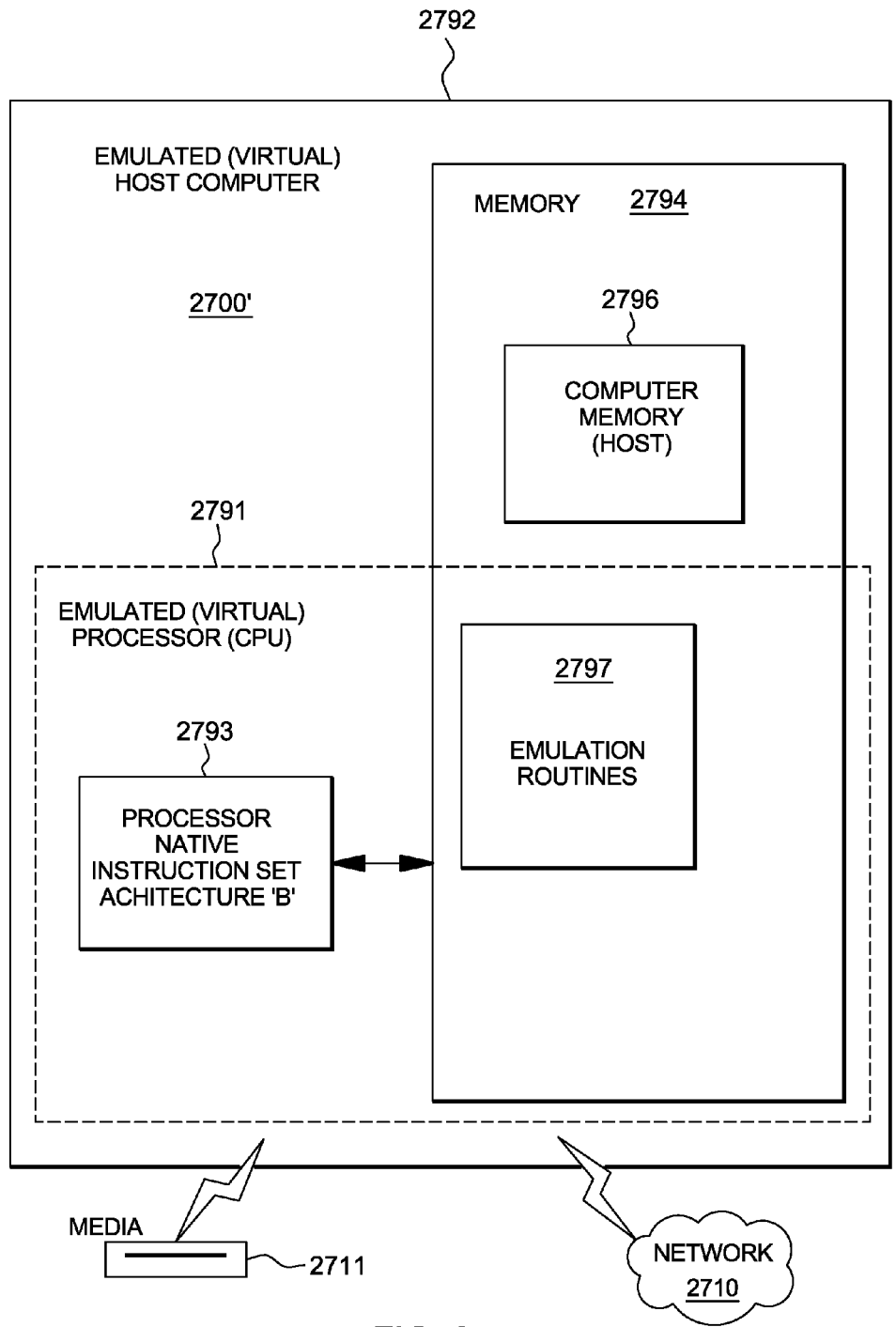
FIG. 27 depicts one embodiment of an emulated host computer system.

In FIG. 27, an example of an emulated host computer system 2792 is provided that emulates a host computer system 2700' of a host architecture. In the emulated host computer system 2792, the host processor (CPU) 2791 is an emulated host processor (or virtual host processor) and comprises an emulation processor 2793 having a different native instruction set architecture than that of the processor 2791 of the host computer 2700'. The emulated host computer system 2792 has memory 2794 accessible to the emulation processor 2793. In the example embodiment, the memory 2794 is partitioned into a host computer memory 2796 portion and an emulation routines 2797 portion. The host computer memory 2796 is available to programs of the emulated host computer 2792 according to host computer architecture. The emulation processor 2793 executes native instructions of an architected instruction set of an architecture other than that of the emulated processor 2791, the native instructions obtained from emulation routines memory 2797, and may access a host instruction for execution from a program in host computer memory 2796 by employing one or more instruction(s) obtained in a sequence & access/decode routine which may decode the host instruction(s) accessed to determine a native instruction execution routine for emulating the function of the host instruction accessed. Other facilities that are defined for the host computer system 2700' architecture may be emulated by architected facilities routines, including such facilities as general purpose registers, control registers, dynamic address translation and I/O subsystem support and processor cache, for example. The emulation routines may also take advantage of functions available in the emulation processor 2793 (such as general registers and dynamic translation of virtual addresses) to improve performance of the emulation routines. Special hardware and off-load engines may also be provided to assist the processor 2793 in emulating the function of the host computer 2700'.

In a further embodiment, one or more aspects relate to cloud computing. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 28:
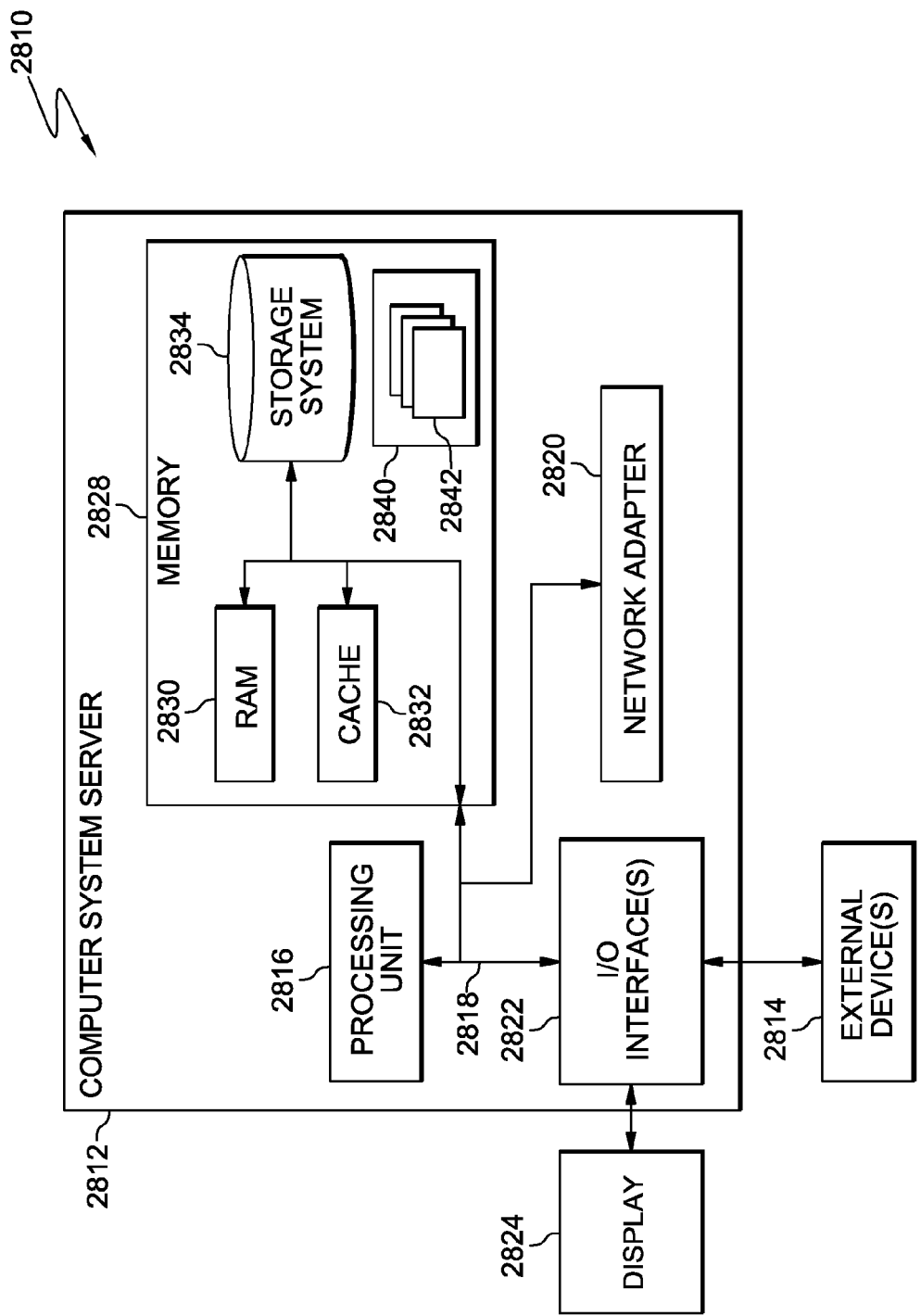
FIG. 28 depicts one embodiment of a cloud computing node.

Referring now to FIG. 28, a schematic of an example of a cloud computing node is shown. Cloud computing node 2810 is only one example of a suitable cloud computing node and is not intended to suggest any limitation as to the scope of use or functionality of embodiments of the invention described herein. Regardless, cloud computing node 2810 is capable of being implemented and/or performing any of the functionality set forth hereinabove.

In cloud computing node 2810 there is a computer system/server 2812, which is operational with numerous other general purpose or special purpose computing system environments or configurations. Examples of well-known computing systems, environments, and/or configurations that may be suitable for use with computer system/server 2812 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 2812 may be described in the general context of computer system executable instructions, such as program modules, being executed by a computer system. Generally, program modules may include routines, programs, objects, components, logic, data structures, and so on that perform particular tasks or implement particular abstract data types. Computer system/server 2812 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 28, computer system/server 2812 in cloud computing node 2810 is shown in the form of a general-purpose computing device. The components of computer system/server 2812 may include, but are not limited to, one or more processors or processing units 2816, a system memory 2828, and a bus 2818 that couples various system components including system memory 2828 to processor 2816.

Bus 2818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 2812 typically includes a variety of computer system readable media. Such media may be any available media that is accessible by computer system/server 2812, and it includes both volatile and non-volatile media, removable and non-removable media.

System memory 2828 can include computer system readable media in the form of volatile memory, such as random access memory (RAM) 2830 and/or cache memory 2832. Computer system/server 2812 may further include other removable/non-removable, volatile/non-volatile computer system storage media. By way of example only, storage system 2834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 2818 by one or more data media interfaces. As will be further depicted and described below, memory 2828 may include at least one program product having a set (e.g., at least one) of program modules that are configured to carry out the functions of embodiments of the invention.

Program/utility 2840, having a set (at least one) of program modules 2842, may be stored in memory 2828 by way of example, and not limitation, as well as an operating system, one or more application programs, other program modules, and program data. Each of the operating system, one or more application programs, other program modules, and program data or some combination thereof, may include an implementation of a networking environment. Program modules 2842 generally carry out the functions and/or methodologies of embodiments of the invention as described herein.

Computer system/server 2812 may also communicate with one or more external devices 2814 such as a keyboard, a pointing device, a display 2824, etc.; one or more devices that enable a user to interact with computer system/server 2812; and/or any devices (e.g., network card, modem, etc.) that enable computer system/server 2812 to communicate with one or more other computing devices. Such communication can occur via Input/Output (I/O) interfaces 2822. Still yet, computer system/server 2812 can communicate with one or more networks such as a local area network (LAN), a general wide area network (WAN), and/or a public network (e.g., the Internet) via network adapter 2820. As depicted, network adapter 2820 communicates with the other components of computer system/server 2812 via bus 2818. It should be understood that although not shown, other hardware and/or software components could be used in conjunction with computer system/server 2812. Examples, include, but are not limited to: microcode, device drivers, redundant processing units, external disk drive arrays, RAID systems, tape drives, and data archival storage systems, etc.

Figure 29:
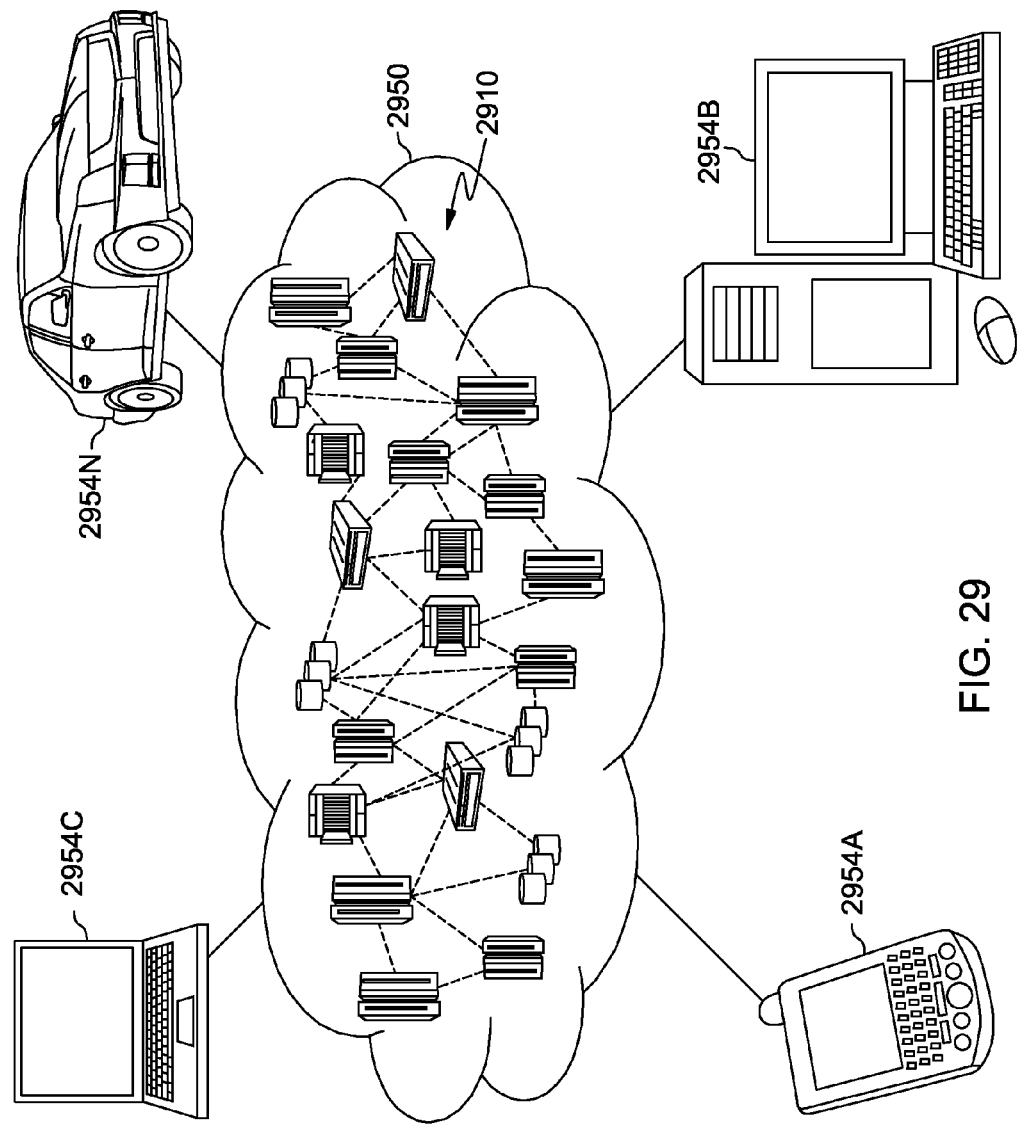
FIG. 29 depicts on embodiment of a cloud computing environment.

Referring now to FIG. 29, illustrative cloud computing environment 2950 is depicted. As shown, cloud computing environment 2950 comprises one or more cloud computing nodes 2910 with which local computing devices used by cloud consumers, such as, for example, personal digital assistant (PDA) or cellular telephone 2954A, desktop computer 2954B, laptop computer 2954C, and/or automobile computer system 2954N may communicate. Nodes 2910 may communicate with one another. They may be grouped (not shown) physically or virtually, in one or more networks, such as Private, Community, Public, or Hybrid clouds as described hereinabove, or a combination thereof. This allows cloud computing environment 2950 to offer infrastructure, platforms and/or software as services for which a cloud consumer does not need to maintain resources on a local computing device. It is understood that the types of computing devices 2954A-N shown in FIG. 29 are intended to be illustrative only and that computing nodes 2910 and cloud computing environment 2950 can communicate with any type of computerized device over any type of network and/or network addressable connection (e.g., using a web browser).

Figure 30:
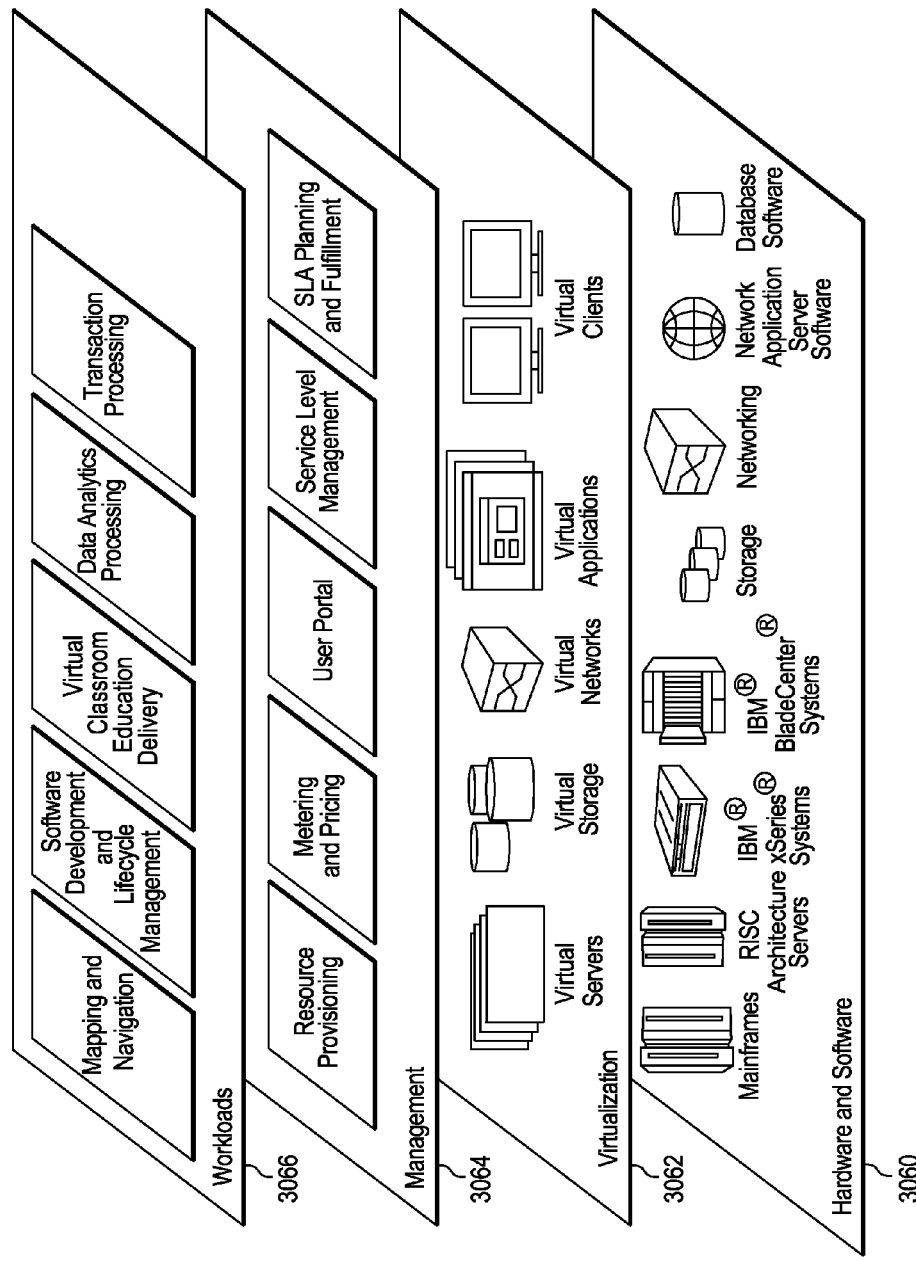
FIG. 30 depicts one example of abstraction model layers.

Referring now to FIG. 30, a set of functional abstraction layers provided by cloud computing environment 2950 (FIG. 29) is shown. It should be understood in advance that the components, layers, and functions shown in FIG. 30 are intended to be illustrative only and embodiments of the invention are not limited thereto. As depicted, the following layers and corresponding functions are provided:

Hardware and software layer 3060 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 3062 provides an abstraction layer from which the following examples of virtual entities may be provided: virtual servers; virtual storage; virtual networks, including virtual private networks; virtual applications and operating systems; and virtual clients.

In one example, management layer 3064 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 3066 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product, comprising:
   a computer readable storage medium readable by a processing circuit and storing instructions for execution by the processing circuit for performing a method comprising:
   establishing a plurality of virtual switches in a host system of a computing environment, each virtual switch of the plurality of virtual switches comprising a respective virtual switch port grouped within a shared port group of virtual switch ports, wherein the virtual switch ports of the shared port group are in communication with a common physical network adapter of multiple physical network adapters of the host system; and sharing, by the virtual switch ports of the shared port group, a single physical port of the physical network adapter as part of a common physical link aggregation group (LAG) comprising the multiple physical network adapters of the host system as members of the common physical LAG.

2. The computer program product of claim 1, wherein the plurality of virtual switches are dispersed within multiple logical partitions of the host system, and wherein the method further comprises providing LAG virtualization components within the multiple logical partitions, wherein the LAG virtualization components of the multiple logical partitions communicate with each other to facilitate administration of a link aggregation control protocol (LACP) and LAG marker protocol of the physical LAG based on shared port group configuration information and based on virtual switch network connection status information from the physical network adapter.

3. The computer program product of claim 1, wherein the method further comprises deploying, at least in part by a virtual switch port of the shared port group, the physical LAG by establishing a network connection to the physical network adapter and initiating transitioning of the physical network adapter into a port group membership control mode in which the shared port group is registered with the physical network adapter for participation within the physical LAG.

4. The computer program product of claim 1, wherein a virtual switch port of the shared port group serves as an active LAG port controller of the single physical port, the active LAG port controller performing link aggregation control protocol (LACP) management and LAG marker management for the physical LAG on behalf of the shared port group, and wherein one or more other virtual switch ports of the shared port group serve as one or more standby LAG port controllers for taking over as the active LAG port controller if requested.

5. The computer program product of claim 4, wherein the LAG marker management comprises coordinating, by the active LAG port controller in response to receipt of a LAG marker protocol data unit (PDU) communication from the physical network adapter, LAG marker PDU responses sent in response to the LAG marker PDU communication, the LAG marker PDU responses being sent from the one or more standby LAG port controllers of the shared port group, wherein the one or more standby LAG port controllers provide the LAG marker PDU responses to the active LAG port controller and the active LAG port controller awaits receipt of a LAG marker PDU response from each standby LAG port controller of the one or more standby LAG port controllers of the shared port group.

6. The computer program product of claim 5, wherein the method further comprises, based on the active LAG port controller receiving a LAG marker PDU response from each standby LAG port controller of the one or more standby LAG port controllers of the shared port group, generating and sending, by the active LAG port controller, a LAG marker PDU response to the physical network adapter responding to the LAG marker PDU communication.

7. The computer program product of claim 4, wherein the active LAG port controller and the one or more standby LAG port controllers concurrently send and receive data through the single physical port in communicating data of the physical LAG.

8. The computer program product of claim 4, wherein each standby LAG port controller of the one or more standby LAG port controllers of the shared port group receives LACP protocol transmissions from the physical network adapter or from the active LAG port controller and maintains at least some information of the LACP protocol transmissions to facilitate taking over as the active LAG port controller.

9. The computer program product of claim 8, wherein the method further comprises, based on an indication from the physical network adapter:

assuming responsibility, by a standby LAG port controller of the one or more standby LAG port controllers, as active LAG port controller for the shared port group, wherein the standby LAG port controller becomes the active LAG port controller for the group, and wherein performance of LACP management and LAG marker management for the physical LAG on behalf of the shared port group transitions to the standby LAG port controller that assumes responsibility as the active LAG port controller; and presenting, by the active LAG port controller, to a partner switch to which the physical network adapter is connected, a same port identifier as that presented by the previous active LAG port controller, to facilitate transitioning of the LACP management and LAG marker management to the active LAG port controller transparent to the partner switch.

10. The computer program product of claim 1, wherein the shared port group comprises a first shared port group and the physical network adapter comprises a first physical network adapter of the multiple physical network adapters of the host system, and wherein the method further comprises establishing a second shared port group comprising other virtual switch ports of the plurality of virtual switches, different from the virtual switch ports of the first shared port group, wherein each virtual switch port of the second shared port group shares a single physical port of a second physical network adapter of the multiple physical network adapters, the second physical network adapter being different from the first physical network adapter, and wherein the first physical network adapter and the second physical network adapter are part of the common physical LAG.

11. A system comprising:
a memory; and
a processor in communications with the memory, wherein the system is configured to perform a method, the method comprising:

establishing a plurality of virtual switches in a host system of a computing environment, each virtual switch of the plurality of virtual switches comprising a respective virtual switch port grouped within a shared port group of virtual switch ports, wherein the virtual switch ports of the shared port group are in communication with a common physical network adapter of multiple physical network adapters of the host system; and sharing, by the virtual switch ports of the shared port group, a single physical port of the physical network adapter as part of a common physical link aggregation group (LAG) comprising the multiple physical network adapters of the host system as members of the common physical LAG.

12. The system of claim 11, wherein the plurality of virtual switches are dispersed within multiple logical partitions of the host system, and wherein the method further comprises providing LAG virtualization components within the multiple logical partitions, wherein the LAG virtualization components of the multiple logical partitions communicate with each other to facilitate administration of a link aggregation control protocol (LACP) and LAG marker protocol of the physical LAG based on shared port group configuration information and based on virtual switch network connection status information from the physical network adapter.

13. The system of claim 11, wherein the method further comprises deploying, at least in part by a virtual switch port of the shared port group, the physical LAG by establishing a network connection to the physical network adapter and initiating transitioning of the physical network adapter into a port group membership control mode in which the shared port group is registered with the physical network adapter for participation within the physical LAG.

14. The system of claim 11, wherein a virtual switch port of the shared port group serves as an active LAG port controller of the single physical port, the active LAG port controller performing link aggregation control protocol (LACP) management and LAG marker management for the physical LAG on behalf of the shared port group, and wherein one or more other virtual switch ports of the shared port group serve as one or more standby LAG port controllers for taking over as the active LAG port controller if requested.

15. The system of claim 14, wherein the LAG marker management comprises coordinating, by the active LAG port controller in response to receipt of a LAG marker protocol data unit (PDU) communication from the physical network adapter, LAG marker PDU responses sent in response to the LAG marker PDU communication, the LAG marker PDU responses being sent from the one or more standby LAG port controllers of the shared port group, wherein the one or more standby LAG port controllers provide the LAG marker PDU responses to the active LAG port controller and the active LAG port controller awaits receipt of a LAG marker PDU response from each standby LAG port controller of the one or more standby LAG port controllers of the shared port group.

16. The system of claim 15, wherein the method further comprises, based on the active LAG port controller receiving a LAG marker PDU response from each standby LAG port controller of the one or more standby LAG port controllers of the shared port group, generating and sending, by the active LAG port controller, a LAG marker PDU response to the physical network adapter responding to the LAG marker PDU communication.

17. The system of claim 14, wherein each standby LAG port controller of the one or more standby LAG port controllers of the shared port group receives LACP protocol transmissions from the physical network adapter or from the active LAG port controller and maintains at least some information of the LACP protocol transmissions to facilitate taking over as the active LAG port controller, and wherein the method further comprises, based on an indication from the physical network adapter:

assuming responsibility, by a standby LAG port controller of the one or more standby LAG port controllers, as active LAG port controller for the shared port group, wherein the standby LAG port controller becomes the active LAG port controller for the group, and wherein performance of LACP management and LAG marker management for the physical LAG on behalf of the shared port group transitions to the standby LAG port controller that assumes responsibility as the active LAG port controller; and presenting, by the active LAG port controller, to a partner switch to which the physical network adapter is connected, a same port identifier as that presented by the previous active LAG port controller, to facilitate transitioning of the LACP management and LAG marker management to the active LAG port controller transparent to the partner switch.

18. The computer program product of claim 1, wherein the common physical LAG remains compatible with an Institute of Electrical and Electronics Engineers (IEEE) link aggregation group specification.

19. The system of claim 11, wherein the common physical LAG remains compatible with an Institute of Electrical and Electronics Engineers (IEEE) link aggregation group specification.

* * * * *